(12) United States Patent
Odenwalder et al.

(10) Patent No.: US 6,480,521 B1
(45) Date of Patent: *Nov. 12, 2002

(54) METHOD AND APPARATUS FOR TRANSMITTING HIGH SPEED DATA IN A SPREAD SPECTRUM COMMUNICATIONS SYSTEM

(75) Inventors: Joseph P. Odenwalder, Del Mar; Edward G. Tiedemann, Jr.; Yu-Cheun Jou, both of San Diego, all of CA (US)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,815

(22) Filed: Mar. 26, 1997

(51) Int. Cl.⁷ .................................................. A61F 2/06
(52) U.S. Cl. ....................................................... 375/130
(58) Field of Search ................................ 375/200, 206, 375/208, 201, 347, 346, 316, 223, 202, 222, 225, 219, 224, 309, 295; 370/342, 209, 252, 441, 310, 208, 203, 319, 316, 315, 335, 468, 320, 465, 479, 464, 241, 431, 347, 345; 380/34, 9, 33; 455/422, 522, 517, 507, 500, 39; 1/1

(56) References Cited

U.S. PATENT DOCUMENTS

| | | | |
|---|---|---|---|
| 4,135,059 A | 1/1979 | Schmidt | 179/15 |
| 4,220,821 A | 9/1980 | Lucas | 370/110 |
| 4,256,925 A | 3/1981 | Goode | 370/104 |
| 4,291,406 A | 9/1981 | Banl et al. | 371/44 |
| 4,298,979 A | 11/1981 | Dobyns et al. | 370/104 |
| 4,319,353 A | 3/1982 | Alvarez, III et al. | 370/104 |

(List continued on next page.)

FOREIGN PATENT DOCUMENTS

| | | |
|---|---|---|
| WO | 9501032 | 1/1995 |
| WO | 9708864 | 3/1997 |
| WO | 9745976 | 12/1997 |

OTHER PUBLICATIONS

TIA/EIA Interim Standard 95: Mobile Station–Base Station Compatibility Standard for Dual Mode Wideband Spread Spectrum Cellular Standard, Jun. 1993.*
TR45 Data Standard, RLP Section (Medium Rate Data Version) Dec. 18, 1996.
QUALCOMM Incorporated Slide Show Presentation "Near–Term Medium Data Rate Forward Link in the IS–95 Bandwidth" Creation Date per computer database: Jan. 14, 1997, pp. 1–13.
QUALCOMM Incorporated Slide Show Presentation "US 3G Air Interface Meeting Notes", Chicago IL, Mar. 26, 1997, pp. 1–12.

*Primary Examiner*—William Luther
(74) *Attorney, Agent, or Firm*—Philip R. Wadsworth; Kent D. Baker; Bruce W. Greenhaus

(57) ABSTRACT

The present invention is a novel and improved method and apparatus for transmitting high speed digital data in a spread spectrum communications system. In particular, the present invention provides methods for transmitting forward link and reverse link high speed digital data. For both forward link and reverse link transmissions, the present invention describes a method for processing the data for transmission in a 1.2288 Mcps band and in a 3.6268 Mcps band. In addition, the present invention describes a method for transmitting forward link and reverse link data of both rate set 1 digital data and rate set 2 digital data. Rate set 1 digital data comprises variable rate data at rates defined as Mux Option 1 in the IS-95 standard. Rate set 2 digital data comprises variable rate data at rates defined as Mux Option 2 in the appendix to the IS-95 standard. In addition the present invention describes methods of transmitting the data for applications using packet switched technology and circuit switched technology.

12 Claims, 30 Drawing Sheets

U.S. PATENT DOCUMENTS

| | | | |
|---|---|---|---|
| 4,322,845 A | 3/1982 | Fennel, Jr. et al. | 370/104 |
| 4,339,818 A | 7/1982 | Gruenberg | 370/112 |
| 4,369,434 A | 1/1983 | Mueller | 340/347 |
| 4,373,151 A | 2/1983 | Houdard et al. | 329/104 |
| 4,383,315 A | 5/1983 | Torng | 370/89 |
| 4,424,417 A | 1/1984 | Chavey et al. | 179/2 |
| 4,445,213 A | 4/1984 | Baugh et al. | 370/94 |
| 4,455,649 A | 6/1984 | Esteban et al. | 370/80 |
| 4,477,900 A | 10/1984 | Gruenberg | 370/112 |
| 4,491,947 A | 1/1985 | Frank | 370/94 |
| 4,494,232 A | 1/1985 | Dambrackas et al. | 370/80 |
| 4,547,880 A | 10/1985 | De Vita et al. | 370/91 |
| 4,562,572 A | 12/1985 | Goldman et al. | 370/80 |
| 4,587,652 A | 5/1986 | Goldman | 370/110.1 |
| 4,594,476 A | 6/1986 | Freeman | 179/6.08 |
| 4,726,014 A | 2/1988 | Goldman et al. | 370/58 |
| 4,839,892 A | 6/1989 | Sasaki | 370/95 |
| 4,870,642 A | 9/1989 | Nohara et al. | 370/75 |
| 4,876,698 A | 10/1989 | Boisson et al. | 375/25 |
| 4,899,337 A | 2/1990 | Hirai | 370/80 |
| 4,901,307 A * | 2/1990 | Gilhousen et al. | 370/18 |
| 4,930,118 A | 5/1990 | Sugihara | 370/16 |
| 4,965,796 A | 10/1990 | Petty | 370/112 |
| 4,970,648 A | 11/1990 | Capots | 364/424.06 |
| 5,003,534 A | 3/1991 | Gerhardt et al. | 370/94.1 |
| 5,103,459 A * | 4/1992 | Gilhousen et al. | 375/1 |
| 5,107,377 A | 4/1992 | Ballard | 360/40 |
| 5,109,390 A * | 4/1992 | Gilhousen et al. | 375/1 |
| 5,121,383 A | 6/1992 | Golestani | 370/60 |
| 5,168,575 A | 12/1992 | Cizek et al. | 455/33.1 |
| 5,172,375 A | 12/1992 | Kou | 370/95.3 |
| 5,179,549 A | 1/1993 | Joos et al. | 370/17 |
| 5,216,503 A | 6/1993 | Paik et al. | 358/133 |
| 5,276,730 A | 1/1994 | Cimini, Jr. et al. | 379/60 |
| 5,293,640 A | 3/1994 | Gunmar et al. | 455/33.1 |
| 5,305,308 A | 4/1994 | English et al. | 370/32.1 |
| 5,349,580 A | 9/1994 | Hester et al. | 370/84 |
| 5,396,516 A * | 3/1995 | Padovani et al. | 375/225 |
| 5,414,796 A * | 5/1995 | Jacobs et al. | 395/2.3 |
| 5,504,773 A * | 4/1996 | Padovani et al. | 375/200 |
| 5,604,730 A * | 2/1997 | Tiedemann, Jr. | 370/252 |

* cited by examiner

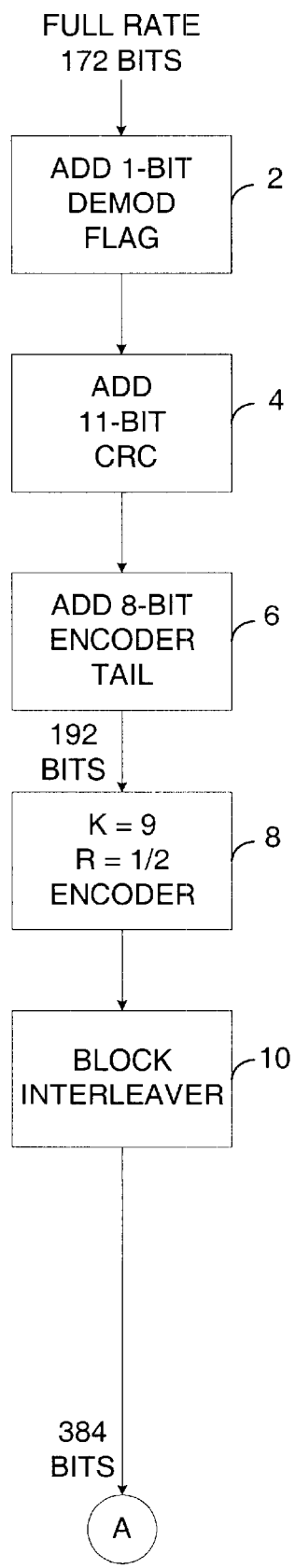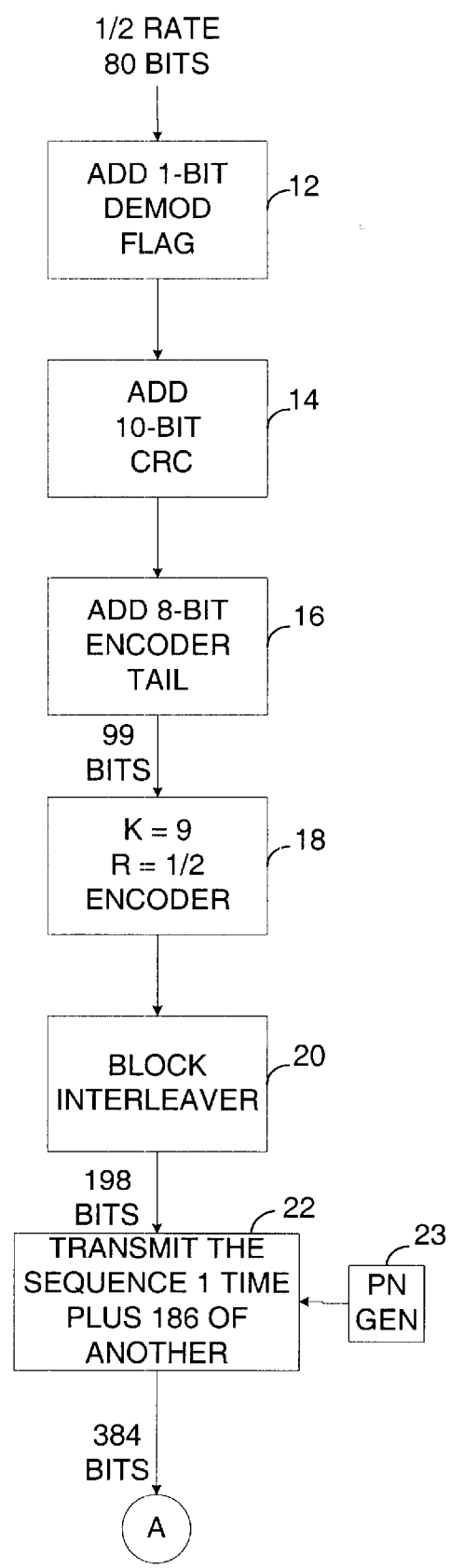
FIG. 2A  FIG. 2B

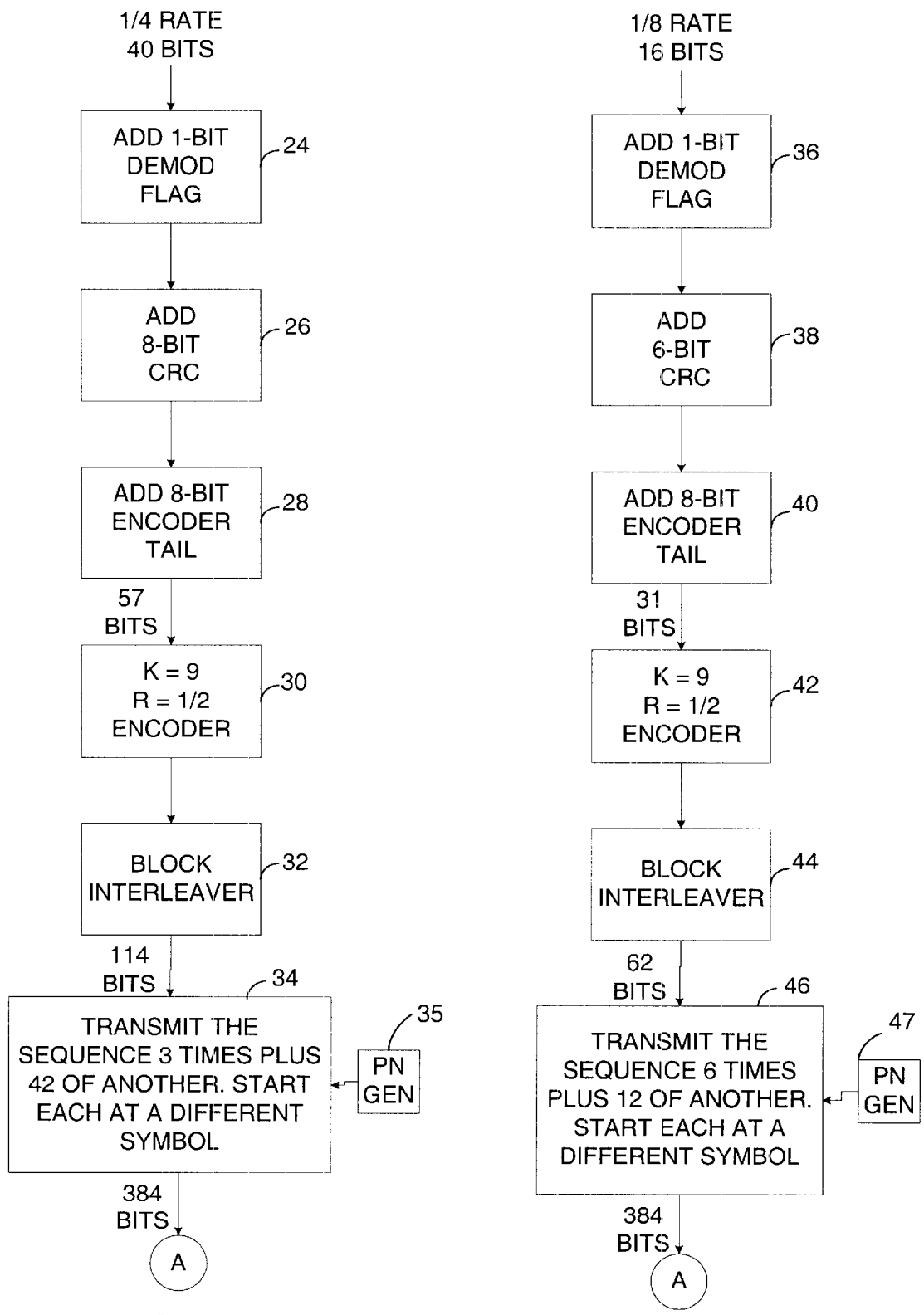

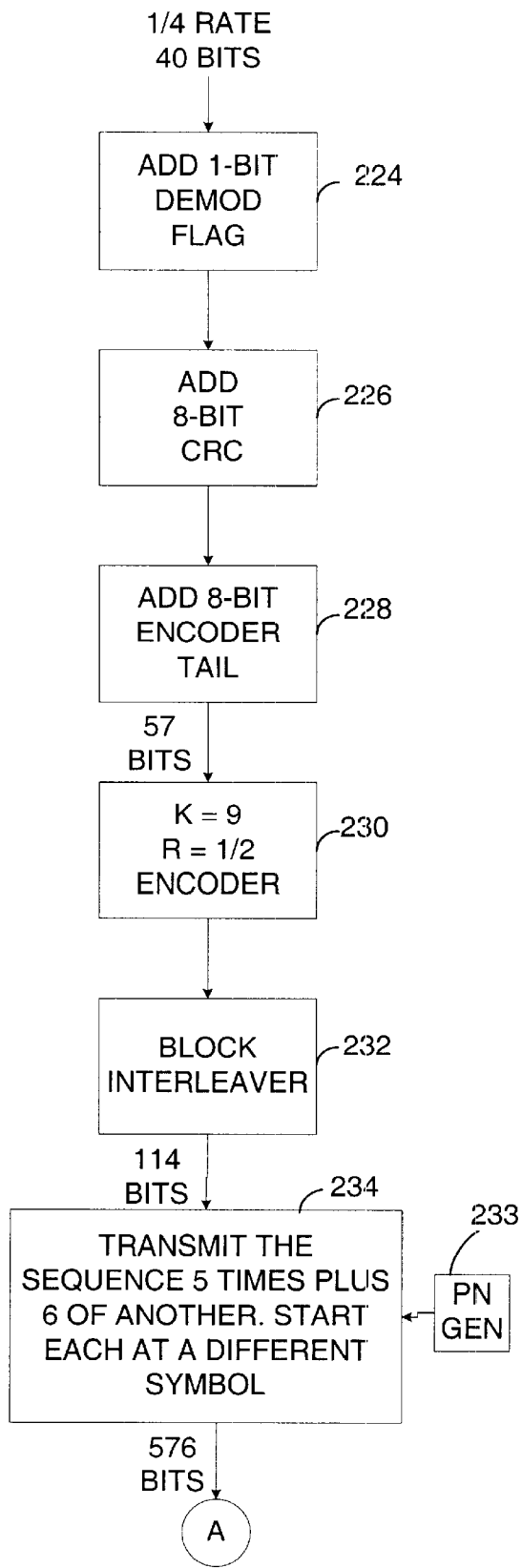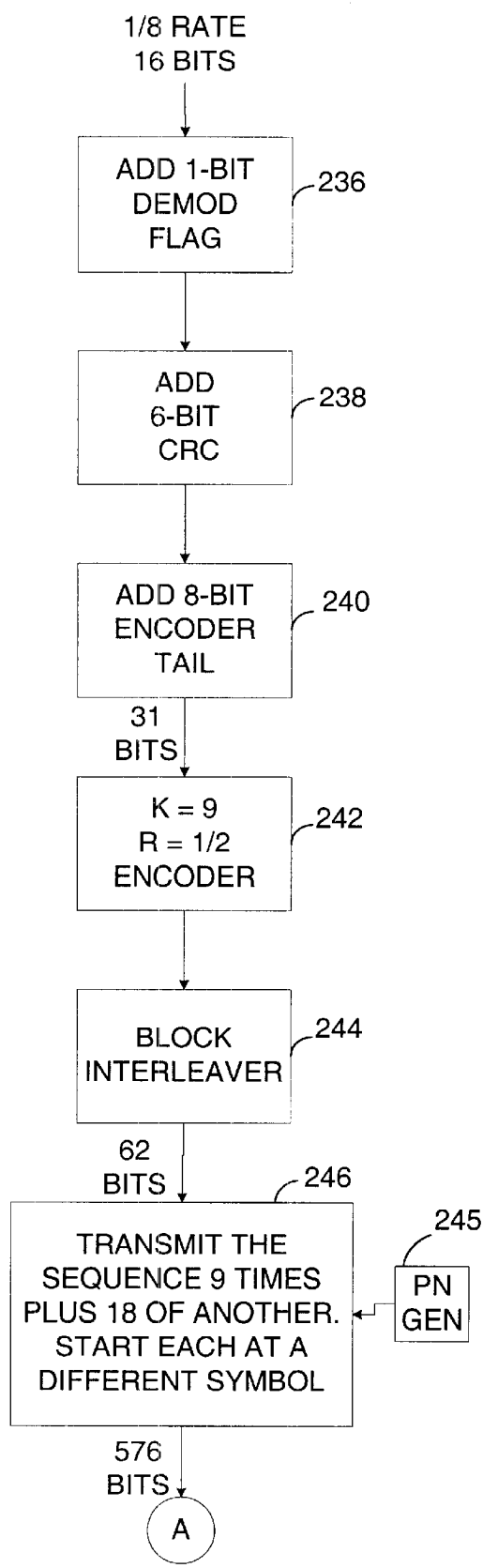
FIG. 4C
FIG. 4D

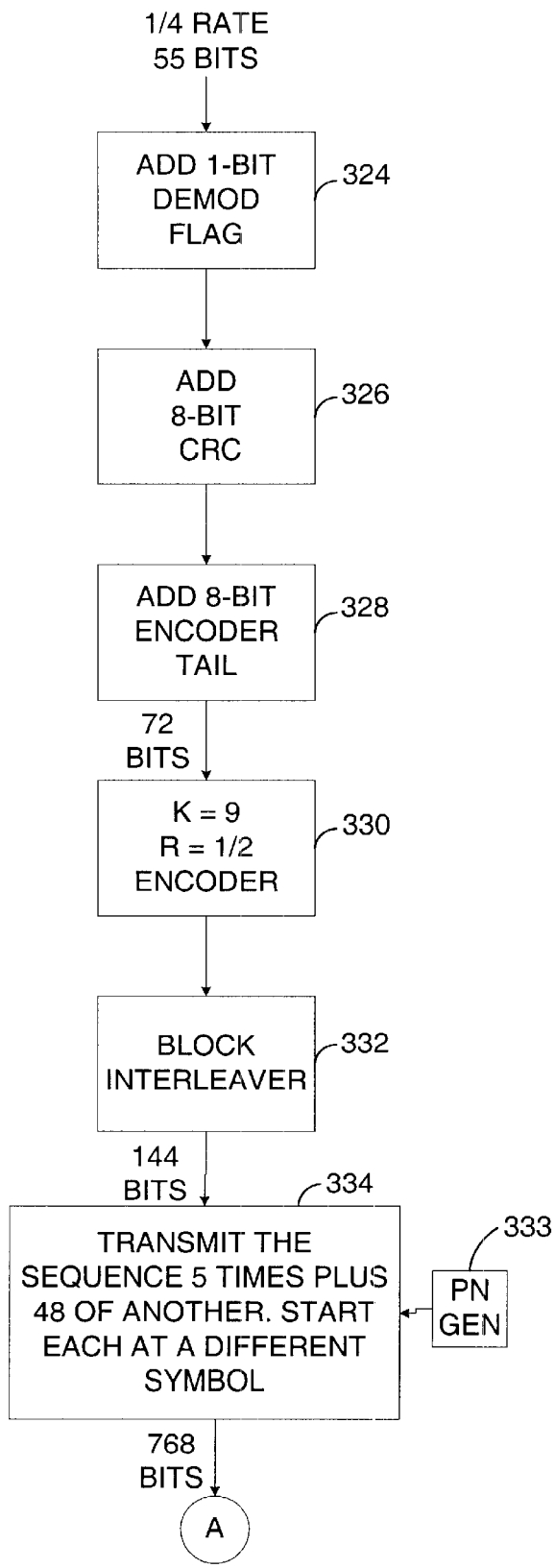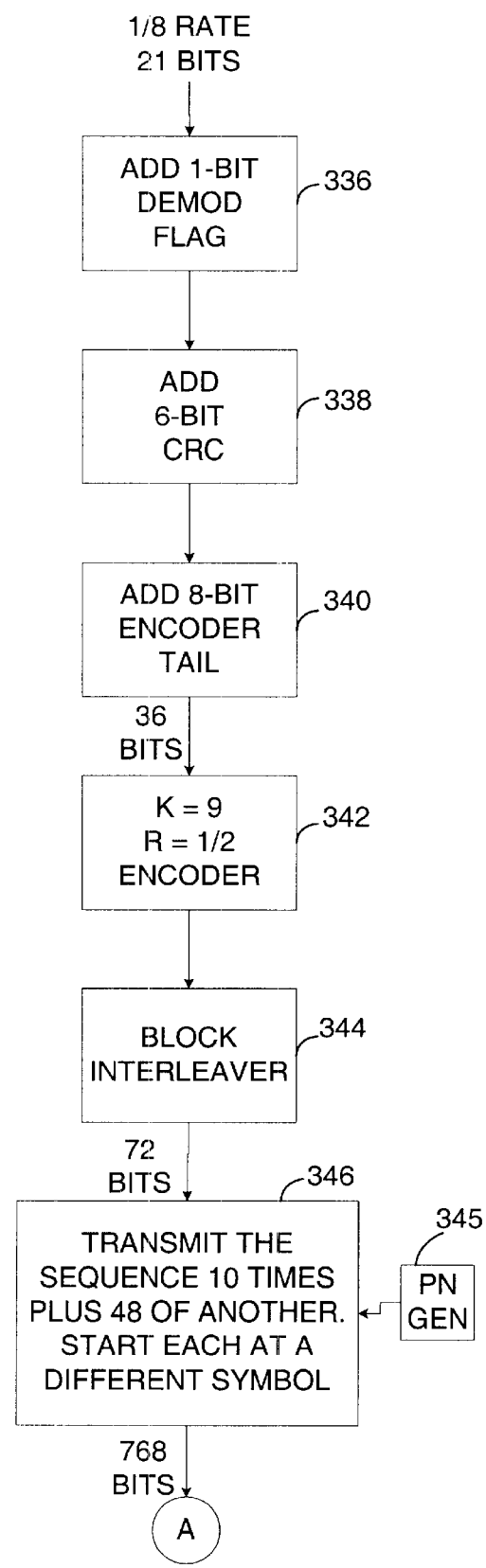
FIG. 5C
FIG. 5D

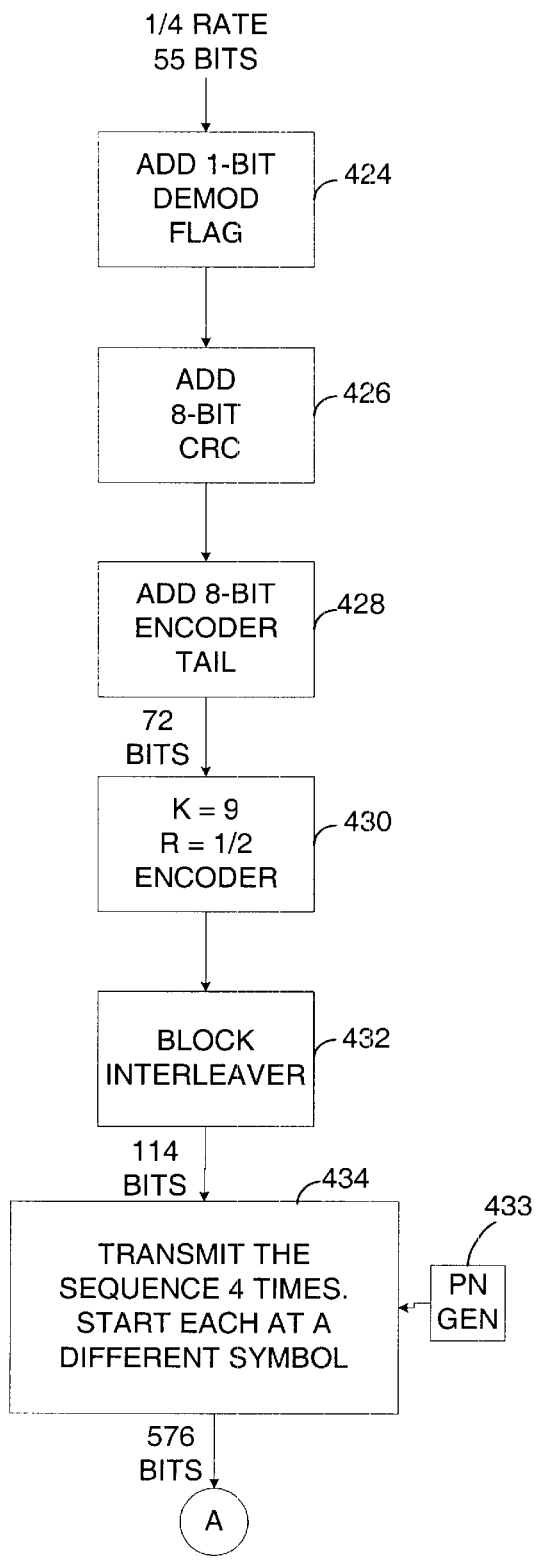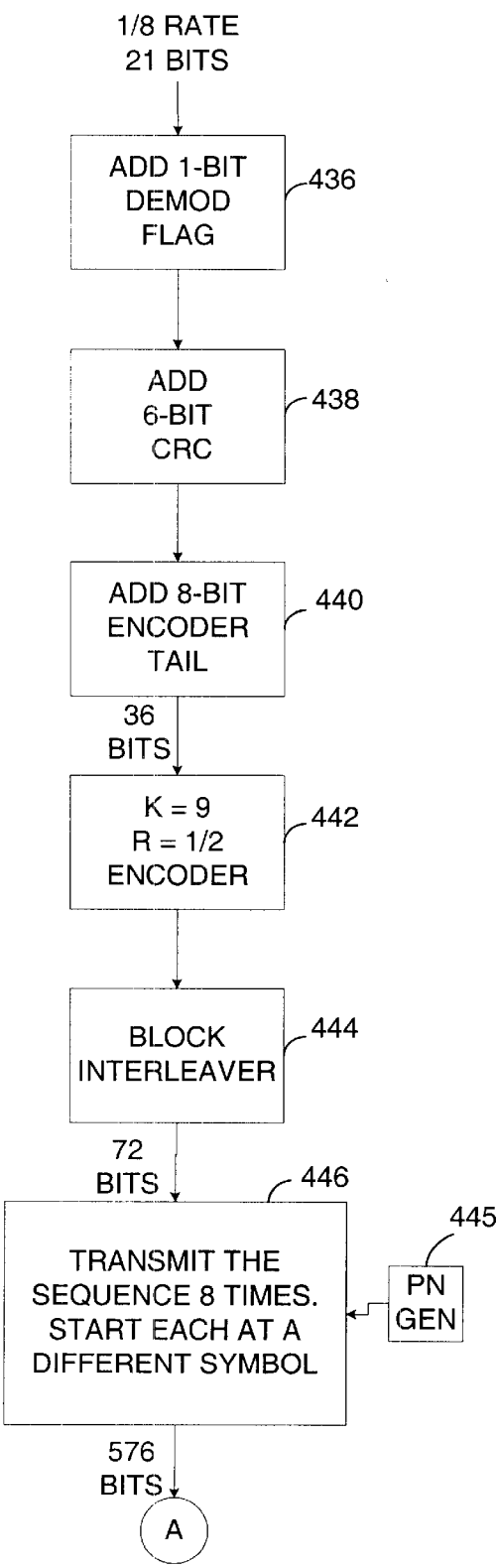
FIG. 6C
FIG. 6D

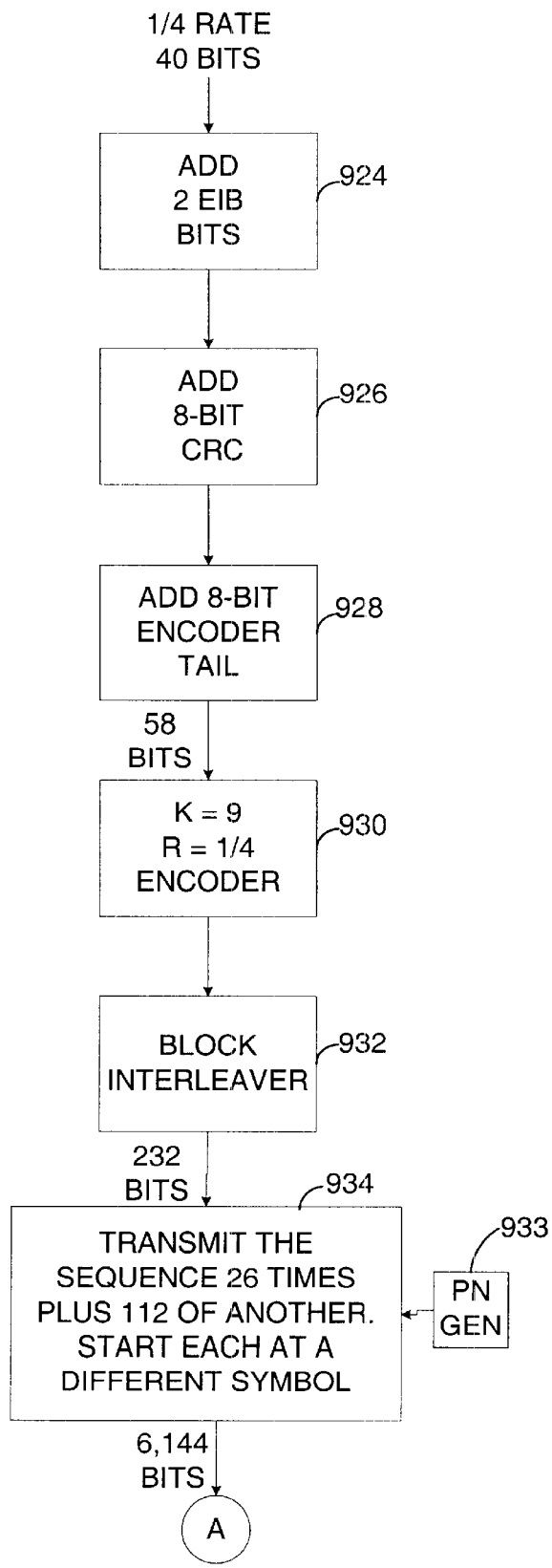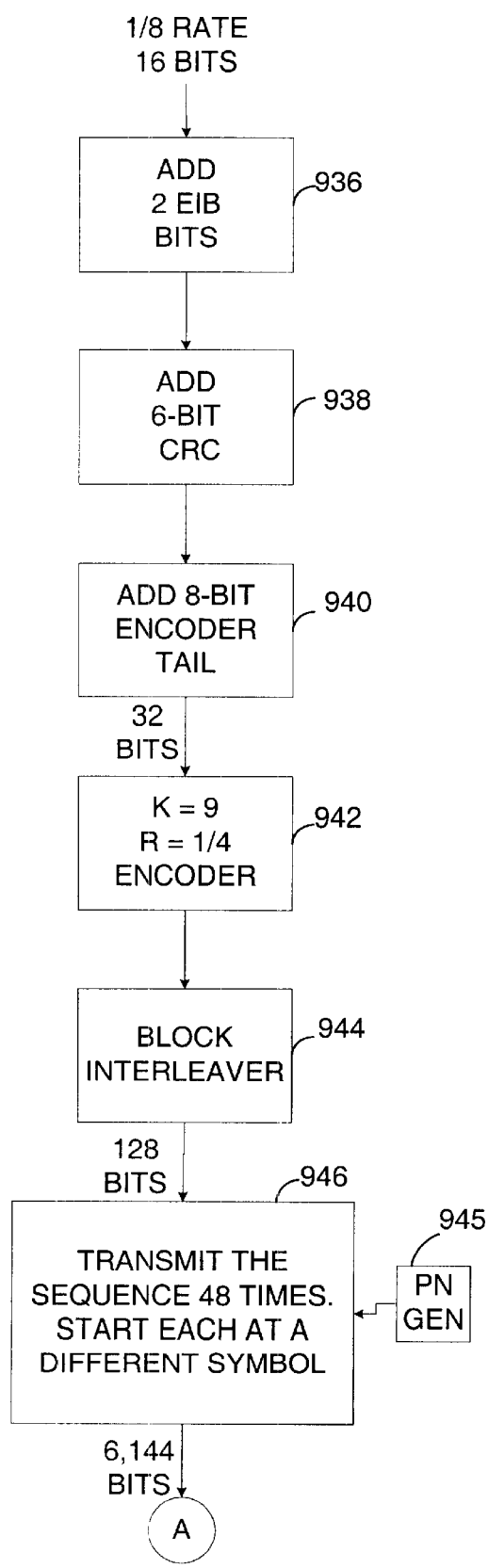
FIG. 12C
FIG. 12D

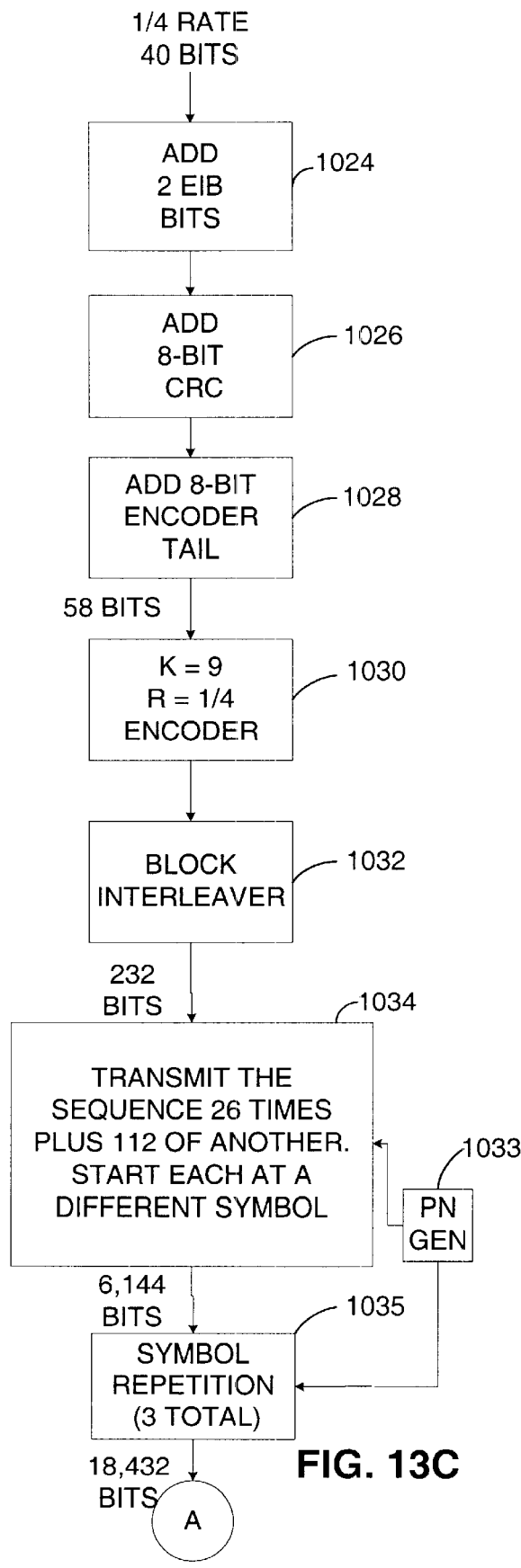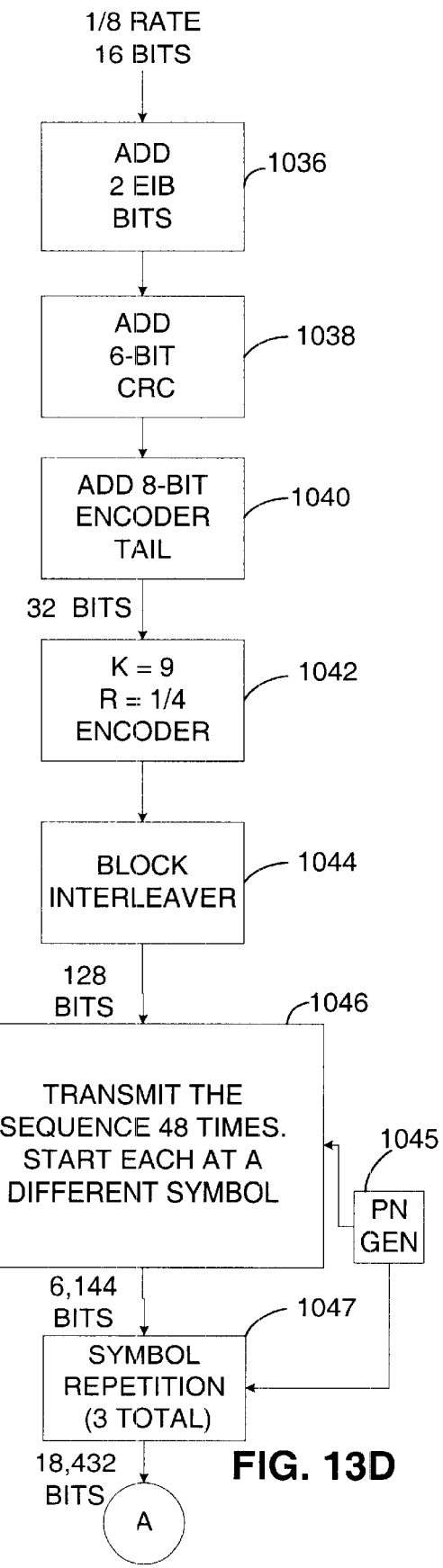
FIG. 13C
FIG. 13D

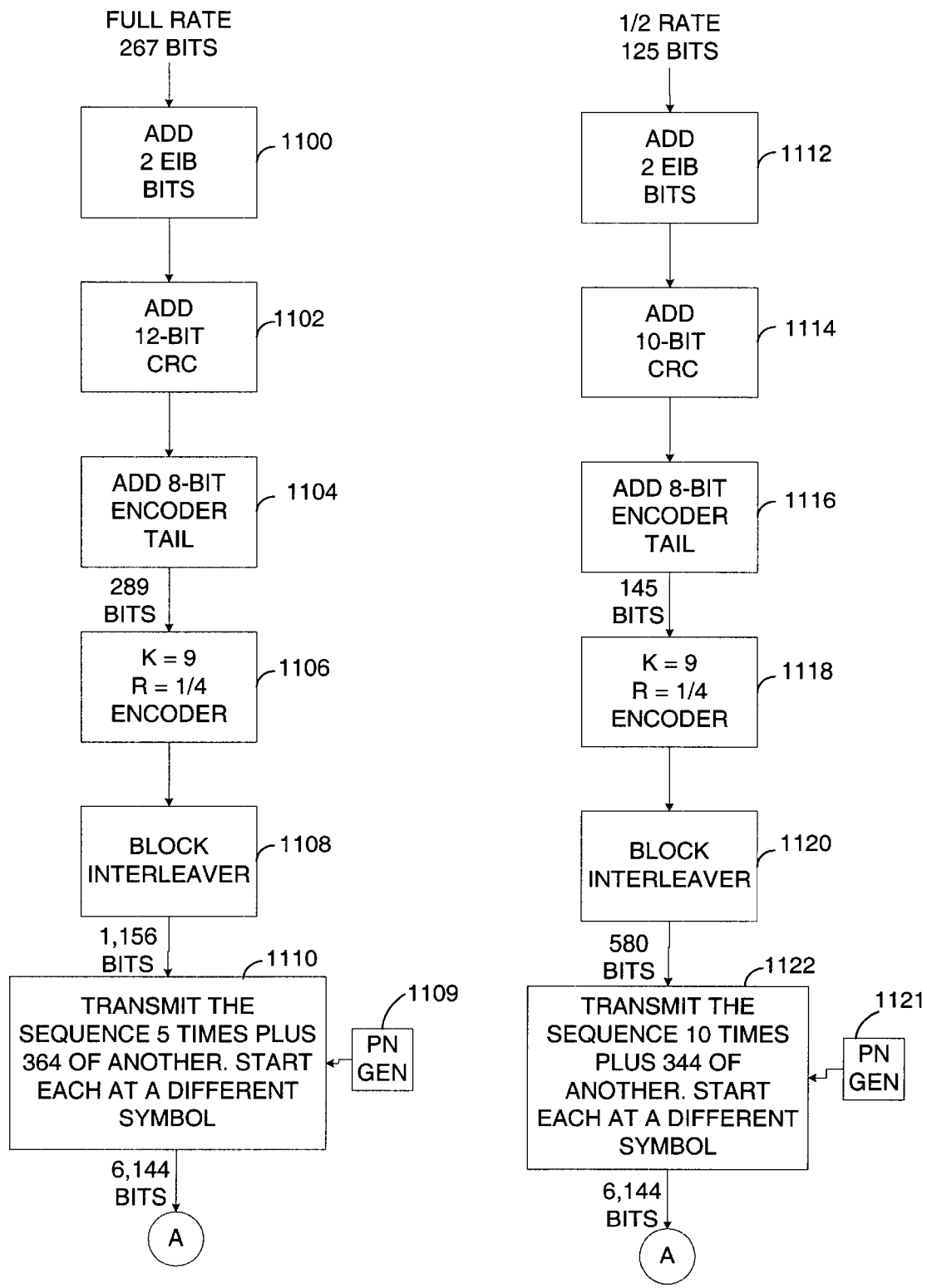
FIG. 14A　　FIG. 14B

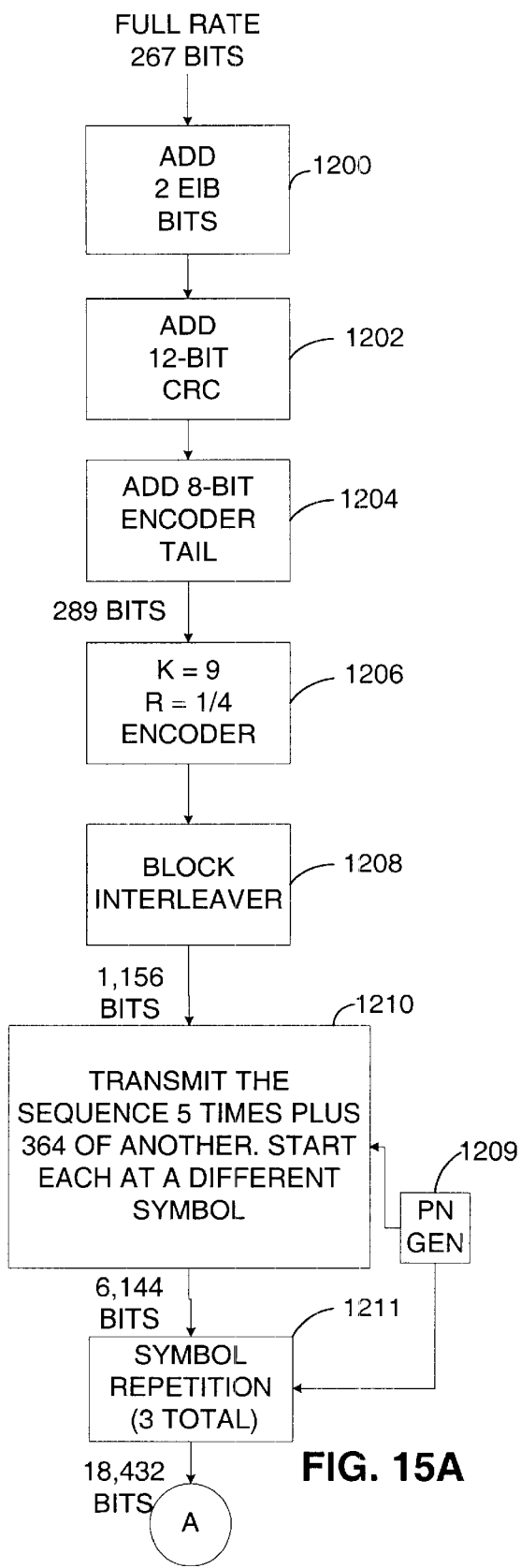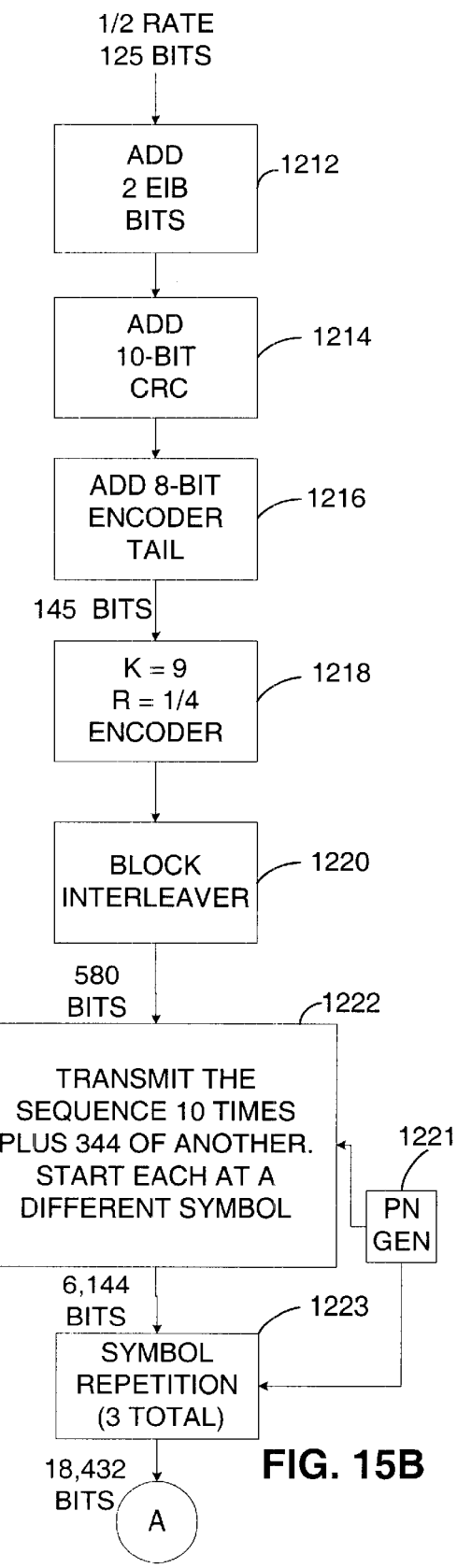
FIG. 15A
FIG. 15B

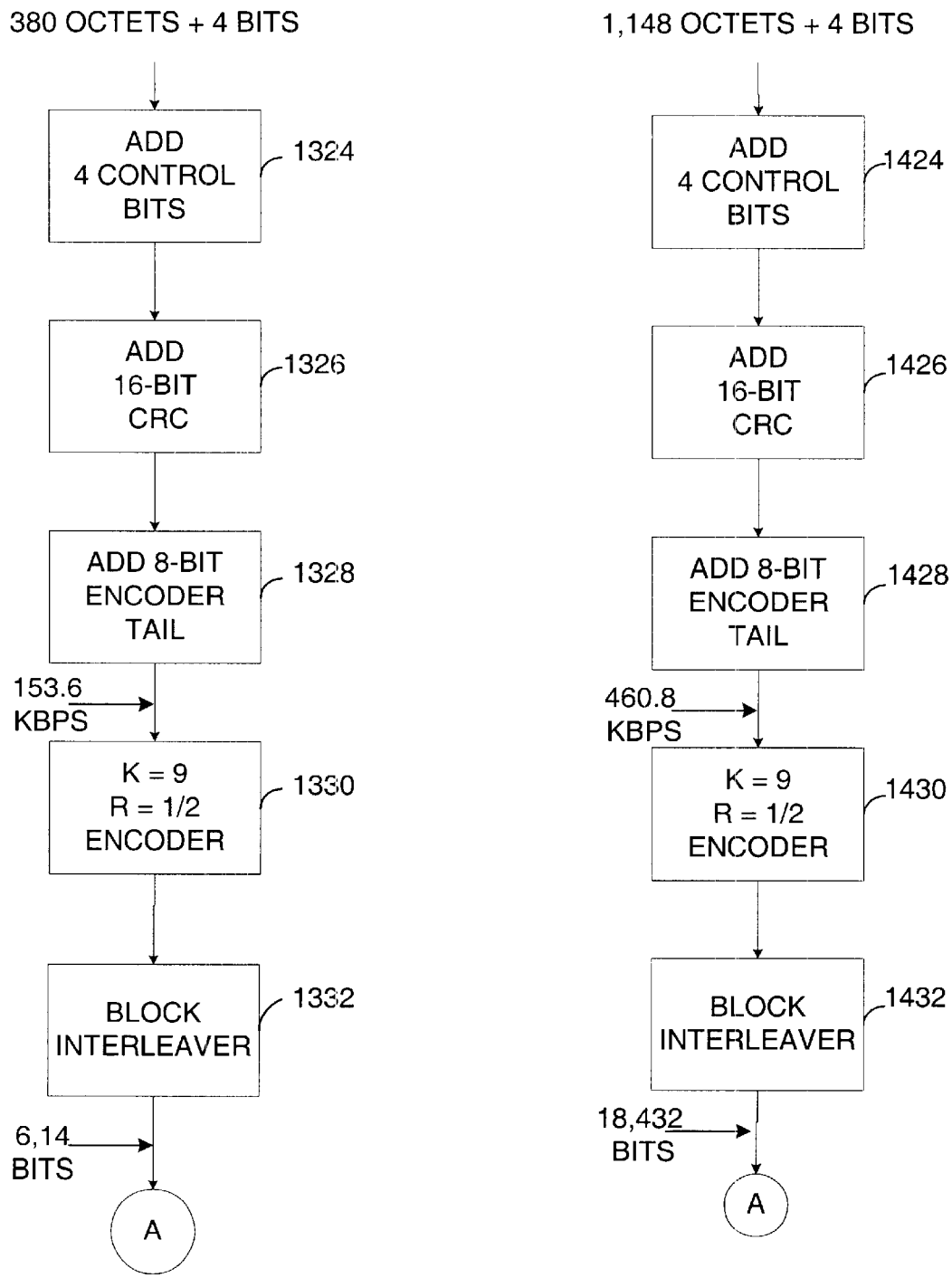

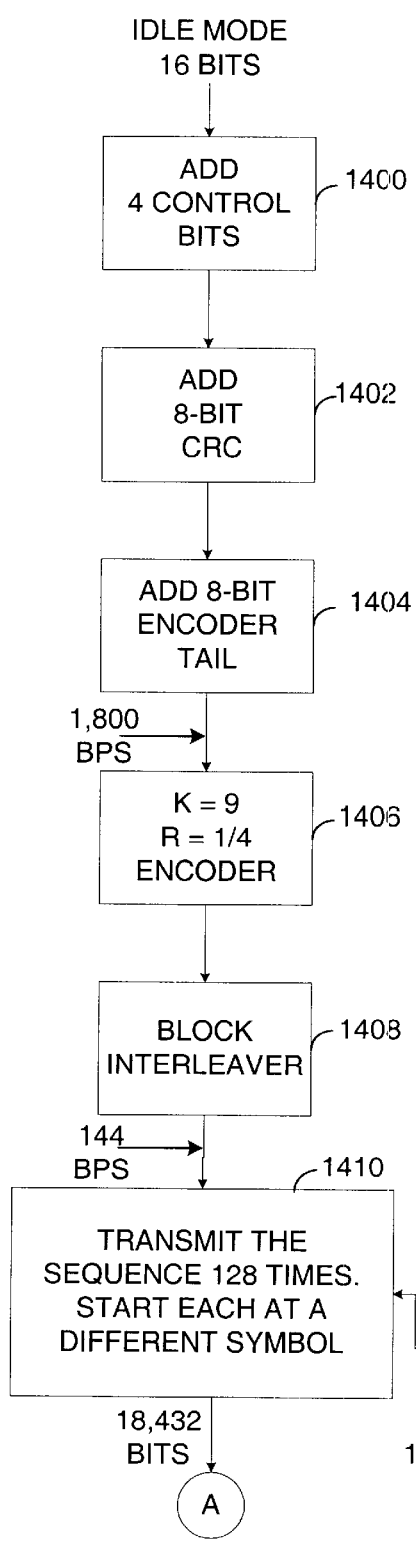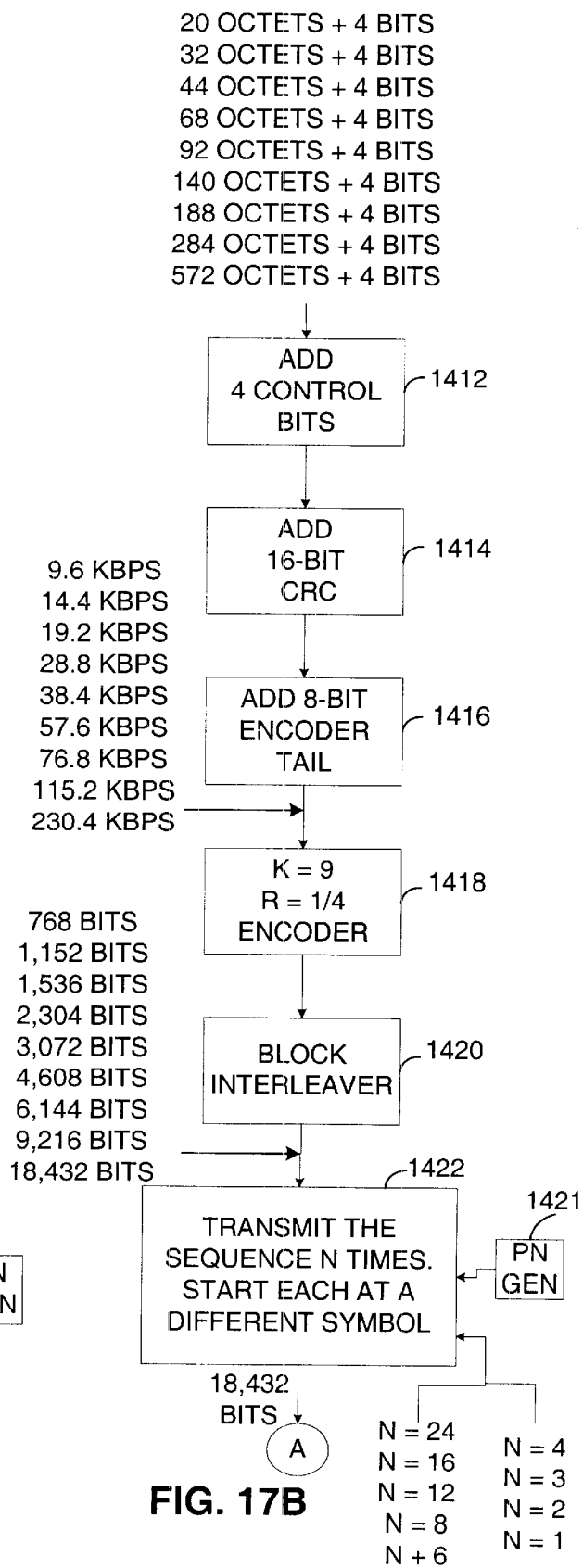
FIG. 17A
FIG. 17B

METHOD AND APPARATUS FOR TRANSMITTING HIGH SPEED DATA IN A SPREAD SPECTRUM COMMUNICATIONS SYSTEM

BACKGROUND OF THE INVENTION

I. Field of the Invention

The present invention relates to communications systems. More particularly, the present invention relates to a novel and improved for processing data for transmission in a high speed spread spectrum communications system.

II. Description of the Related Art

The present invention is concerned with multiple users sharing a communications resource such as in a cellular CDMA system. The use of code division multiple access (CDMA) modulation techniques is one of several techniques for facilitating communications in which a large number of system users are present. Other multiple access communication techniques, such as time division multiple access (TDMA), frequency division multiple access (FDMA) and AM modulation schemes such as amplitude companded single sideband (ACSSB) are known in the art. However, the spread spectrum modulation technique of CDMA has significant advantages over these other modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Path diversity is obtained by exploiting the multipath environment through spread spectrum processing by allowing a signal arriving with different propagation delays to be received and processed separately. Furthermore, space or path diversity is obtained by providing multiple signal paths through simultaneous links between a mobile user and two or more base stations. Examples of the utilization of path diversity are illustrated in U.S. Pat. No. 5,109,390 entitled "DIVERSITY RECEIVER IN A CDMA CELLULAR TELEPHONE SYSTEM", and U.S. Pat. No. 5,101,501 entitled "SOFT HANDOFF IN A CDMA CELLULAR TELEPHONE SYSTEM", both assigned to the assignee of the present invention and incorporated by reference herein.

An additional technique that may be used to increase the efficiency of the allocation of the communication resource is to allow the users of the resource to provide data at varying rates thereby using only the minimum amount of the communication resource to meet their service needs. An example of variable rate data source is a variable rate vocoder which is detailed in U.S. Pat. No. 5,414,796, entitled "VARIABLE RATE VOCODER," assigned to the assignee of the present invention and incorporated herein by reference. Since speech inherently contains periods of silence, i.e. pauses, the amount of data required to represent these periods can be reduced. Variable rate vocoding most effectively exploits this fact by reducing the data rate for these silent periods.

A variable rate speech encoder provides speech data at full rate when the talker is actively speaking, thus using the full capacity of the transmission frames. When a variable rate speech coder is providing speech data at a less than maximum rate, there is excess capacity in the transmission frames. A method for transmitting additional data in transmission frames of a fixed size, wherein the data source is providing data at a variable rate is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. In the above mentioned patent application a method and apparatus is disclosed for combining data of differing types from different sources in a data packet for transmission.

Recently, the transmission of digital data over wireless networks has become increasingly important. For example the transmission of image, video or other digital data over wireless networks has become of great importance. Digital networks were designed to provide optimal performance for the transmission of speech data. Other forms of digital data require significantly higher data rates for proper performance.

One method of providing high speed forward link data in a spread spectrum communication system is to provide multiple orthogonal channels to carry the data to a single high speed user. A method for transmitting high speed digital data on multiple orthogonal channels is described in detail in copending U.S. patent application Ser. No. 08/431,180, entitled "METHOD AND APPARATUS FOR PROVIDING VARIABLE RATE DATA IN A COMMUNICATION SYSTEM USING STATISTICAL MULTIPLEXING", filed Apr. 28, 1995, which is assigned to the assignee of the present invention and incorporated by reference herein.

One aspect of transmitting high speed variable rate data is that the remote station must demodulate multiple channels. Demodulating multiple channels uses battery power which is important in mobile applications. One method of reducing the unnecessary demodulation of data channels, when no high speed data is present, is to schedule the use of the additional channels to alert the remote station of forthcoming high speed data. A method and apparatus for scheduling the high speed transmissions is described in detail in copending U.S. patent application Ser. No. 08/656,649, entitled "METHOD AND APPARATUS FOR PROVIDING RATE SCHEDULED DATA IN A SPREAD SPECTRUM COMMUNICATION SYSTEM", filed May 31, 1996, which is assigned to the assignee of the present invention and is incorporated by reference herein.

An alternative to transmitting data on a plurality of supplemental channels is to transmit high speed data on a single supplemental channel capable of carrying higher data rates than a single common channel. These high data rate channels can be provided by combining the orthogonal modulation of a plurality of traffic channels.

One method for transmitting high speed data on the reverse link is to generate a plurality of subchannels at the remote station wherein each subchannel is distinguished from the other subchannels by means of an orthogonal coding. A method of providing high speed data on the reverse link using a plurality of subchannels is described in detail in copending U.S. patent application Ser. No. 08/654, 443, filed May 28, 1996, entitled "HIGH DATA RATE CDMA WIRELESS COMMUNICATION SYSTEM" and in copending U.S. patent application Ser. No. 08/660,438, filed Jun. 7, 1996, entitled "REDUCED PEAK TO AVERAGE TRANSMIT POWER HIGH DATA RATE CDMA WIRELESS COMMUNICATION SYSTEM", both of which are assigned to the assignee of the present invention and incorporated by reference herein.

SUMMARY OF THE INVENTION

The present invention is a novel and improved method and apparatus for transmitting high speed digital data in a spread spectrum communications system. In particular, the present invention provides methods for transmitting forward link and reverse link high speed digital data. For both forward link and reverse link transmissions, the present invention describes a method for processing the data for transmission in a 1.2288 Mcps band and in a 3.6268 Mcps band. In addition, the present invention describes a method for transmitting forward link and reverse link data of both rate set 1 digital data and rate set 2 digital data. Rate set 1 digital data comprises variable rate data at rates defined as Mux Option 1 in the IS-95 standard. Rate set 2 digital data comprises variable rate data at rates defined as Mux Option 2 in the appendix to the IS-95 standard. In addition the present invention describes methods of transmitting the data for applications using packet switched technology and circuit switched technology.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 2a–2e illustrate the initial and intermediate processing of forward link digital data consisting of rate set 1 digital data packets for transmission in a 1.2288 Mhz band;

FIGS 4a–4e illustrate the initial and intermediate processing of forward link digital data consisting of rate set 1 digital data packets for transmission in a 3.6864 Mhz band;

FIGS. 5a–5e illustrate the initial and intermediate processing of forward link digital data consisting of rate set 2 digital data packets for transmission in a 1.2288 Mhz band;

FIGS. 6a–6e illustrate the initial and intermediate processing of forward link digital data consisting of rate set 2 digital data packets for transmission in a3.6864 Mhz band;

FIGS. 12a–12d illustrate the initial processing of reverse link digital data consisting of rate set 1 digital data packets for transmission in a 1.2288 Mcps band;

FIGS. 13a–13d illustrate the initial processing of reverse link digital data consisting of rate set 1 digital data packets for transmission in a 3.6864 Mcps band;

FIGS. 14a–14d illustrate the initial processing of reverse link digital data consisting of rate set 2 digital data packets for transmission in a 1.2288 Mcps band;

FIGS. 15a–15d illustrate the initial processing of reverse link digital data consisting of rate set 2 digital data packets for transmission in a 3.6864 Mcps band;

FIGS. 16a–16c illustrate the initial processing of reverse link digital data consisting of rate set 2 digital data packets for transmission in a 1.2288 Mcps band circuit switched applications; and FIGS. 17a–17c illustrate the initial processing of reverse link digital data consisting of rate set 2 digital data packets for transmission in a 3.6864 Mcps band for circuit switched applications.

DETAILED DESCRIPTION OF THE PREFERRED EMBODIMENTS

I. Introduction

Figure 1:
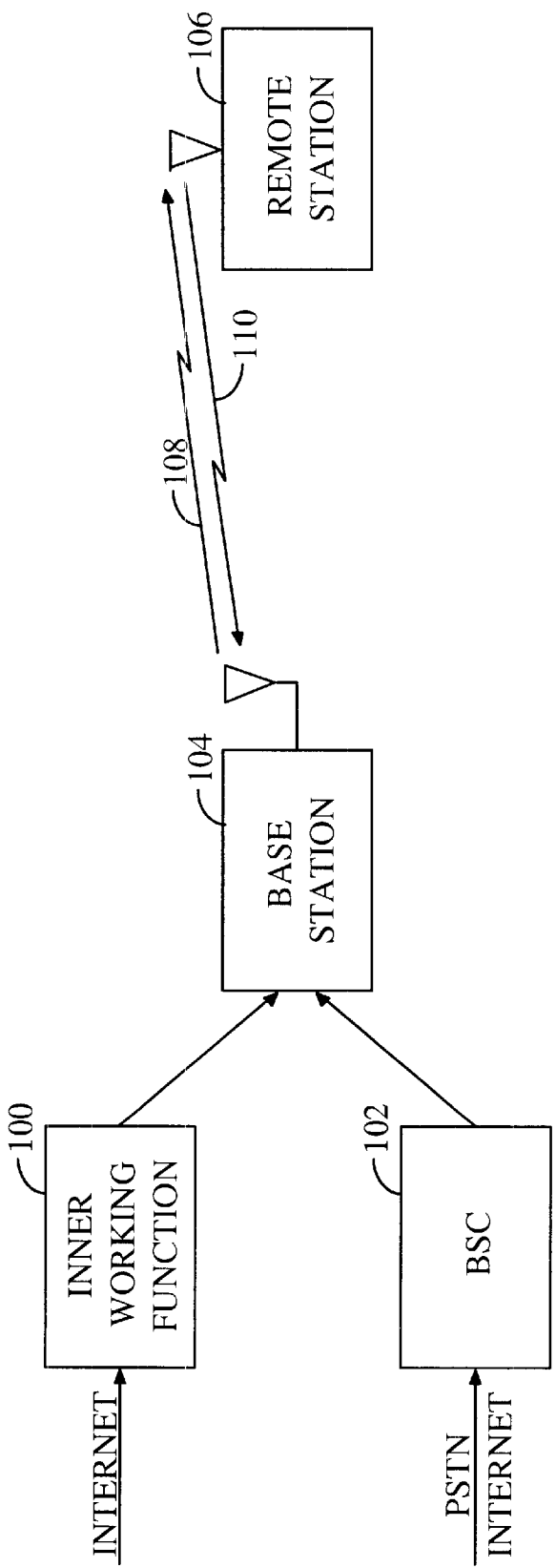
FIG. 1 is an overview of the high speed data communication environment.

Referring to FIG. 1, base station 104 receives high speed digital data from a base station controller (BSC) 102 or from an inner working function 100. BSC 102 provides the interface between the high speed digital services such as the Internet or from a public switched telephone network (PSTN). Inner working function 100 is a digital interface to the Internet. It is designed to serve a limited function, which avoids complexity required in BSC 102.

Base station 104 transmits the digital data to remote station 106 on forward link 108. In the present invention, each remote station is allocated a primary channel which is capable of carrying voice or digital information. The primary channel is allocated for use by remote station 106 for the duration of service. When the data rate required for transmission to remote station 106 exceeds the capacity of the primary channel, a supplemental channel is temporarily allocated for use by remote station 106.

The use of a supplemental channel for carrying high speed data to a remote station is described in detail in copending U.S. patent application Ser. No. 08/656,649, filed May 31, 1996, entitled "Method and Apparatus for Providing Rate Scheduled Data in a Spread Spectrum Communication System", in copending U.S. patent application Ser. No. 08/431,180, filed Apr. 28, 1995, entitled "Method and Apparatus for Providing Variable Rate Data In Communications System Using Statistical Multiplexing", and in copending U.S. patent application Ser. No. 08/395,960, filed Feb. 28, 1995, entitled "Method and Apparatus for Providing Variable Rate Data In Communications System Using Non Orthogonal Overflow Channels", all of which are assigned to the assignee of the present invention and incorporated by reference herein.

II. Initial Processing of Forward Link Data Rate Set One for Transmission in a 1.2288 Mcps Band FIGS. 2A–2D illustrate the initial processing of variable rate data on the primary channel. In the exemplary embodiment, there are four rates referred to herein as full rate, half rate, quarter rate and eighth rate. A method for generating variable rate speech data compatible with the present invention is disclosed in U.S. Pat. No. 5,414,796, entitled "Variable Rate Vocoder", assigned to the assignee of the present invention and incorporated by reference herein. It should be noted that the present invention contemplates speech data or data or a combination of the two being carried on the primary channel.

FIG. 2A illustrates the initial processing of full rate data for transmission, on the primary channel. The data, in the exemplary embodiment, which comprises 172 bits is provided to demodulation flag generator (DEMOD FLAG) 2. Demodulation flag generator 2 generates a flag (e.g. a "demod flag bit") that indicates whether a frame a predetermined number of frames in the future will include data transmitted on accompanying supplemental channel or channels. In the exemplary embodiment, the demod flag bit indicates whether two frames in the future the base station 104 will transmit data to remote station 106 on the supplemental channel. If the demodulation flag shows that there will be no supplemental data on a frame, the mobile can save power by not demodulating and decoding that data.

The 173 bits are then provided to cyclic redundancy check (CRC) generator 4 which generates a set of check bits in a manner similar to parity bits. The implementation of CRC bit check generators is well known in the art and an exemplary implementation is described in detail in the Telecommunications Industry Association Standard TIA/EIA/IS-95-A entitled *Mobile Station-Base Station Compatibility Standard for Dual Mode Wideband Spread Spectrum Cellular System*. In the exemplary embodiment, CRC generator 4 generates an 11-bit CRC for the frame. The frame is then provided to tail bit generator 6 which appends to the frame a set of tail bits. In the exemplary embodiment, the tail bit generator 6 appends an eight bit all 0 tail to the frame.

The 192 bits (172 information bits, demod flag, 11 CRC bits and 8 tail bits) from tail bit generator 6 are provided to encoder 8. In the exemplary embodiment, encoder 8 is a rate ½ convolutional encoder with constraint length 9. In alternative embodiments, encoder 8 could be a Reed Solomon encoder or other encoders. In addition, alternative constraint lengths can be used with corresponding changes made to the number of tail bits. The encoded symbols are then provided to interleaver 10 which reorders the encoded symbols in accordance with a predetermined interleaving format. In the exemplary embodiment, interleaver 10 is a block interleaver in which data is read into a buffer in rows and read out of the buffer in columns. In alternative embodiments, interleaver 10 could be a bit reversal interleaver or a convolutional interleaver.

FIG. 2B illustrates the initial processing of half rate data for transmission on the primary channel. The data, in the exemplary embodiment, comprises 80 bits is provided to demodulation flag generator (DEMOD FLAG) 12. As described with respect to demodulation flag generator 2, to demodulation flag generator (DEMOD FLAG) 12 generates a flag that indicates whether a frame a predetermined number of frames in the future will include data transmitted on the supplemental channel or channels. In the exemplary embodiment, the demod flag bit indicates whether two frames in the future the base station 104 will transmit data to remote station 106 on the supplemental channel.

The 81 bits are then provided to cyclic redundancy check (CRC) generator 14 which generates a set of check bits in a manner similar to parity bits as described above with respect to CRC generator 4. In the exemplary embodiment, CRC generator 14 generates an 10-bit CRC for the frame. The frame is then provided to tail bit generator 16 which appends to the frame a set of tail bits. In the exemplary embodiment, the tail bit generator 16 appends an eight bit all 0 tail to the frame.

The 99 bits (80 information bits, demod flag, 10 CRC bits and 8 tail bits) from tail bit generator 16 are provided to encoder 18. In the exemplary embodiment, encoder 18 is a rate ½ convolutional encoder. In alternative embodiments, encoder 18 could be a Reed Solomon encoder or other error correction/detection encoder. The encoded symbols are then provided to interleaver 20 which reorders the encoded symbols in accordance with a predetermined interleaving format as described above with respect to interleaver 10.

The reordered symbol data is then provided to repetition generator 22. The function of repetition generator 22 is to assure that regardless of the rate of the data the output rate remains constant. For example, in FIGS. 1a–1d the output of the initial processing contains 384 bits regardless of the input data rate. As is well known in the art, the transmission power can be decreased when repetition is present because the receiver system can combine the repeated symbols to provide improved estimates of the transmitted data. The repetition also provides time diversity that improves performance in fading channel conditions.

The 198 encoded bits are provided from interleaver 20 to repetition generator 22. Repetition generator 22 repeats 186 of the encoded symbols and adds the repeated symbols to the frames. In the exemplary embodiment, the repetition process selects the starting point of the repetitions in accordance with a pseudorandomly selected starting point. In the exemplary embodiment, pseudorandom generator 23 selects a starting point for the repetition process and provides that information to repetition generator 22. For example, if pseudorandom generator 23 selects the starting point of the frame to be the 100th symbol of the 198 encoded symbols, then the repetition generator would select symbols 100–198 and symbols 1–87. Similarly, the pseudorandomly selected starting points can be extended to complete repetitions within the frame.

FIG. 2C illustrates the initial processing of quarter rate data for transmission on the primary channel. The quarter rate data packet, in the exemplary embodiment, comprising 40 information bits is provided to demodulation flag generator (DEMOD FLAG) 24. As described with respect to demodulation flag generator 2, demodulation flag generator (DEMOD FLAG) 24 generates a flag that indicates whether a frame a predetermined number of frames in the future will include data transmitted on the supplemental channel or channels. In the exemplary embodiment, the demod flag bit indicates whether two frames in the future the base station 104 will transmit data to remote station 106 on the supplemental channel.

The 41 bit packet is then provided to cyclic redundancy check (CRC) generator 26 which generates a set of check bits in a manner similar to parity bits as described above with respect to CRC generator 4. In the exemplary embodiment, CRC generator 26 generates an 8-bit CRC for the frame. The frame is then provided to tail bit generator 28 which appends to the frame a set of tail bits. In the exemplary embodiment, the tail bit generator 28 appends an eight bit all 0 tail to the frame.

The 57 bits (40 information bits, demod flag, 8 CRC bits and 8 tail bits) from tail bit generator 28 are provided to encoder 30. In the exemplary embodiment, encoder 30 is a rate ½ convolutional encoder. In alternative embodiments, encoder 30 could be a Reed Solomon encoder or other error correction/detection encoder. The encoded symbols are then provided to interleaver 32 which reorders the encoded symbols in accordance with a predetermined interleaving format as described above with respect to interleaver 10.

The reordered symbol data is then provided to repetition generator 34. The function of repetition generator 34 as described with respect to repetition generator 22 is to assure that regardless of the rate of information bits the output rate remains constant. Repetition generator 34 repeats the 114 bits three time within the output packet and then repeats 42 of the 114 encoded symbols. As described above, in the exemplary embodiment, the repetitions are provided in accordance with a pseudorandomly selected starting point provided by pseudonoise generator 35.

FIG. 2D illustrates the initial processing of eighth rate data for transmission on the primary channel. The eighth rate data packet, in the exemplary embodiment, comprising 16 information bits is provided to demodulation flag generator (DEMOD FLAG) 36. As described with respect to demodulation flag generator 2, demodulation flag generator (DEMOD FLAG) 36 generates a flag that indicates whether a frame a predetermined number of frames in the future will include data transmitted on the supplemental channel or channels.

The 17 bit packet is then provided to cyclic redundancy check (CRC) generator 38 which generates a set of check bits in a manner similar to parity bits as described above with respect to CRC generator 4. In the exemplary embodiment, CRC generator 38 generates a 6-bit CRC for the frame. The frame is then provided to tail bit generator 40 which appends to the frame a set of tail bits. In the exemplary embodiment, the tail bit generator 40 appends an eight bit all 0 tail to the frame.

The 31 bits (16 information bits, demod flag, 6 CRC bits and 8 tail bits) from tail bit generator 40 are provided to encoder 42. In the exemplary embodiment, encoder 42 is a rate ½ convolutional encoder. In alternative embodiments, encoder 42 could be a Reed Solomon encoder or other error correction/detection encoder. The encoded symbols are then provided to interleaver 44 which reorders the encoded symbols in accordance with a predetermined interleaving format as described above with respect to interleaver 10.

The reordered symbol data is then provided to repetition generator 46. The function of repetition generator 46 as described with respect to repetition generator 22 is to assure that regardless of the rate of information bits the output rate remains constant. Repetition generator 46 repeats the 62 bits six time within the output packet and then repeats 12 of the encoded symbols. As described above, in the exemplary embodiment, the repetitions are provided in accordance with a starting point provided by pseudonoise generator 47.

Figure 2E:
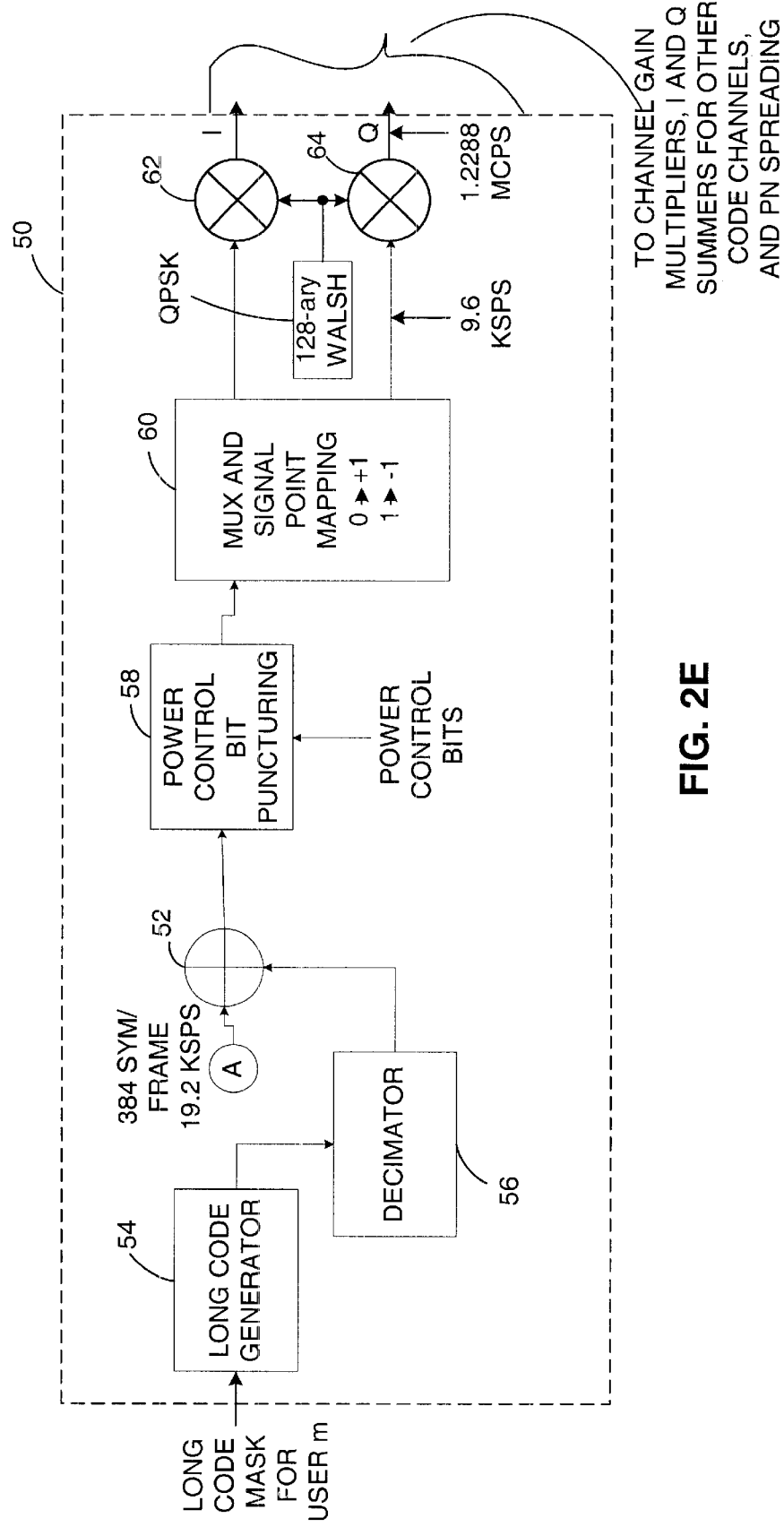

FIG. 2E illustrates the intermediate processing of the frame of data for transmission in accordance with the present invention. The output packets for full rate, half rate, quarter rate and eighth rate, as described with respect to FIGS. 2A, 2B, 2C and 2D respectively, are provided to a first input of exclusive-OR 52. Long code generator 54 generates a spreading code in accordance with a long code mask for the user to which the data is being transmitted. The design and implementation of long code generator 54 is well known in the art and is described in detail in the aforementioned IS-95 standard. Long code generator 54, in the exemplary embodiment, provides the long code at a rate of 1.2288 Mcs, Decimator 56 cuts down the rate of the PN sequence to 19.2 ksps (kilo symbols per second). In the exemplary embodiment, decimator 56 performs this operation by selecting the first chip of each symbol period.

The reduced rate PN sequence from decimator 56 is provided to a second input of exclusive-OR means 52. The scrambled packet is then provided to power control bit puncturing element 58. Bits indicating adjustments for transmission power of remote station 106 are punctured into the scrambled packet by puncturing methods well known in the art. The packet is then provided to multiplexer/mapping means 60. In the exemplary embodiment, multiplexer/mapping means 60 maps a scrambled 0 symbol to a value of +1 and maps a scrambled 1 symbol to a value of −1. Multiplexer/mapping means 60 then alternative outputs the mapped symbols to the I and Q outputs.

The outputs from multiplexer/mapping means 60 are provided to first inputs of multipliers 62 and 64. The second input of multipliers 62 and 64 are provide a 128 bit Walsh sequence comprising values of ±1. The Walsh sequence is orthogonal to all other Walsh covering sequences as is known in the art and is used by the mobile station to differentiate signals transmitted to it from signals transmitted to other remote stations in the area.

III. Final Processing Forward Link Data

Figure 3:
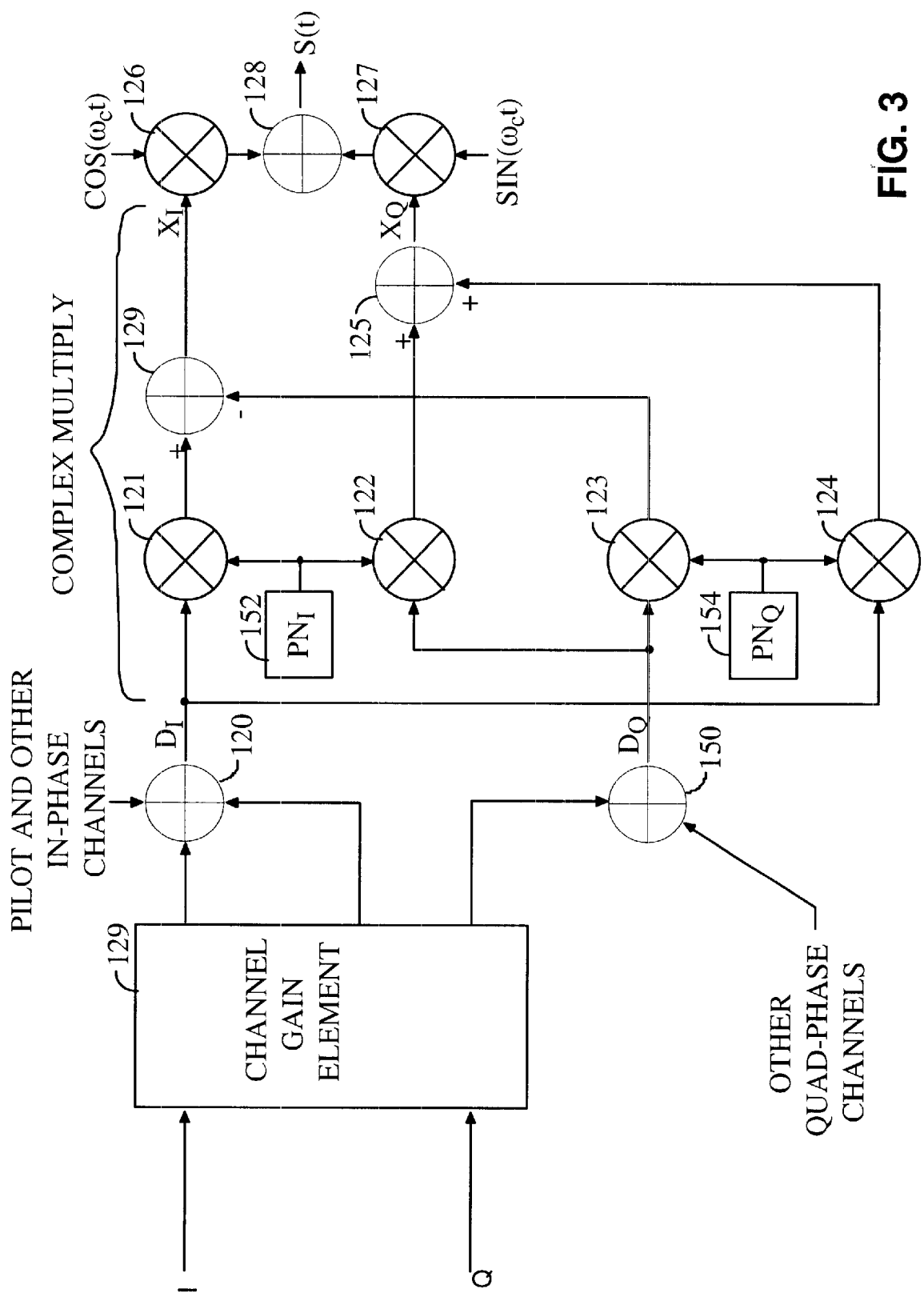
FIG. 3 illustrates the final processing of forward link data for transmission.

FIG. 3 illustrates the final stage of signal processing of the present invention. The I and Q outputs of multipliers 62 and 64 are provided to channel gain element 129. Channel gain element 129 provides gain to the signals that is optimized to close the link between base station 104 and remote station 106. The present invention anticipates a closed loop power control system such as that described in U.S. Pat. No. 5,056,109, entitled "Method and Apparatus for Controlling Transmission Power in a CDMA Cellular Mobile Telephone System", assigned to the assignee of the present invention and incorporated by reference herein. In a closed loop power control system, the remote station transmits back to the base station an indication of the quality of the signal received by the remote station which adjust the power of its transmission to the remote station in accordance with the signal quality indications from the remote station.

The gain adjusted I signal is provided to summing means 120 which combine the gain adjusted I signal with the gain adjusted I signals for transmission to other remote stations in communication with the base station and with the pilot signal to be used for coherent demodulation of transmitted signal. The output of summing means 120 is provided to a first input of multipliers 121 and 124. The second input to multiplier 121 is the output of short PN generator ($PN_I$) 152. The short PN code provided by PN generator 152 is a PN sequence with an offset associated with the base station 104. Other base stations will use a different PN offset in the generation of the short PN sequence. The second input to multiplier 124 is the output of short PN generator ($PN_Q$) 154. The short PN code provided by PN generator 154 is a PN sequence with an offset associated with the base station 104. The generation of short PN sequences is well known in the art and described in detail in aforementioned U.S. Pat. No. 5,103,459 and in the IS-95 standard.

The gain adjusted Q signal is provided to summing means 150 which combines the gain adjusted Q signal with the gain adjusted Q signals for transmission to other remote stations in communication with the base station and with the pilot signal to be used for coherent demodulation of transmitted signal. In alternative embodiment, the pilot signal may be transmitted solely on either the I or Q channels. The output of summing means 150 is provided to a first input of multipliers 122 and 123. The second input to multiplier 122 is the output of short PN generator ($PN_I$) 152. The second input to multiplier 124 is the output of short PN generator ($PN_Q$) 154.

The outputs of multipliers 121 and 123 are provided to subtracting means 129 which subtracts the output of multiplier 123 from the output of multiplier 121. The outputs of multipliers 122 and 124 are provided to summing means 125 which adds the output of multiplier 122 from the output of multiplier 124. The output of subtracting means 129 is provided to multiplier 126 which multiplies the signal by the I-component carrier signal, $\cos(\omega_c t)$ and provides the result to summing means 128. The output of summing means 125 is provided to multiplier 127 which multiplies the signal by the Q-component carrier signal, $\sin(\omega_c t)$ and provides the result to summing means 128. Summing means 128 sums the upconverted component signals and outputs the signal for transmission.

IV. Initial and Intermediate Processing Forward Link Data Rate Set One for Transmission in a 3.6864 Mcps Band FIGS. 4A–4D illustrate an alternative embodiment of the initial processing of variable rate data of rate set 1 on a primary channel which is transmitted in a signal bandwidth of 3.6864 Mcps. In the exemplary embodiment, there are four rates referred to herein as full rate, half rate, quarter rate and eighth rate.

Figures 4A, 4B:
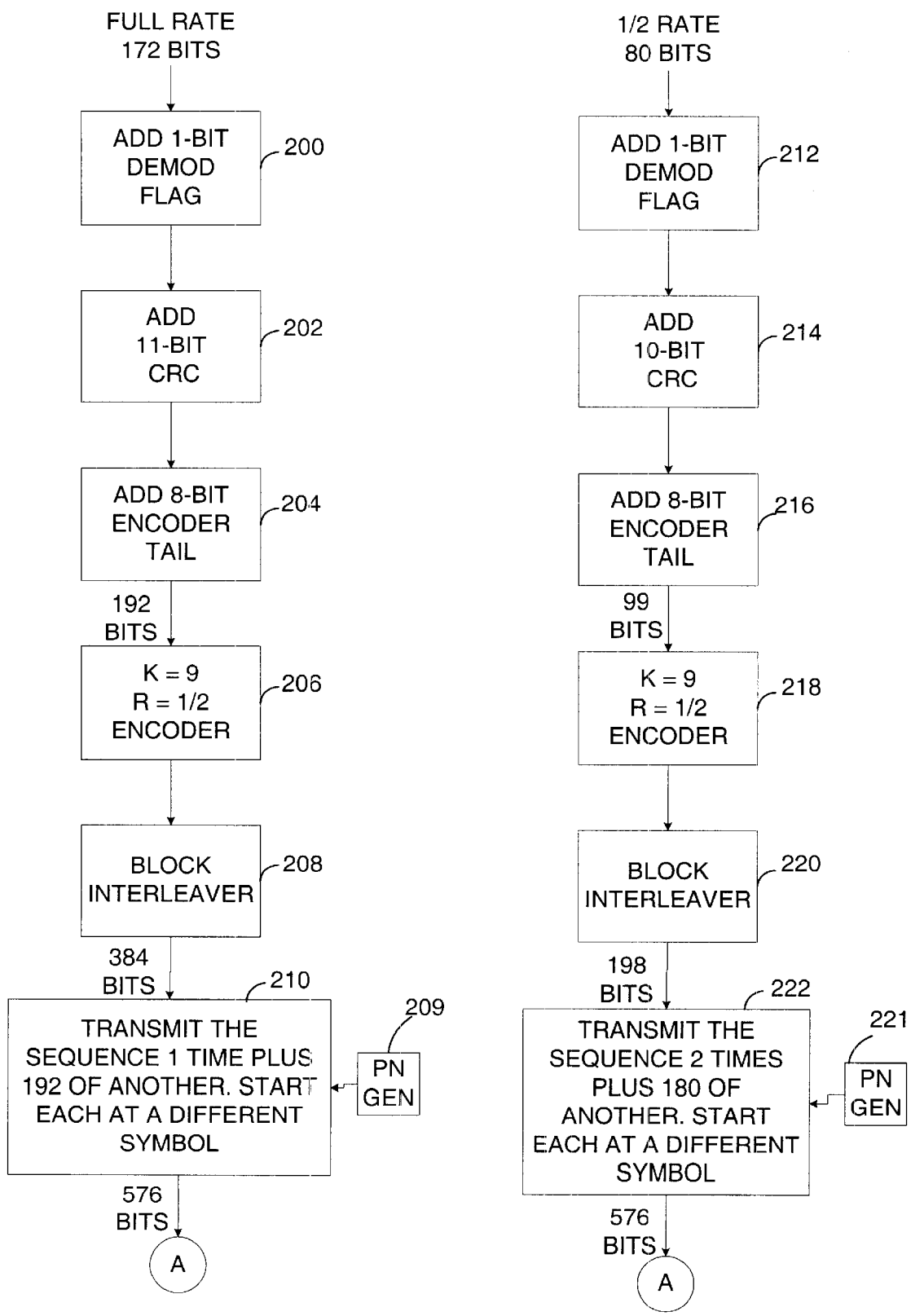

FIG. 4A illustrates the initial processing of full rate data for transmission on the primary channel in a 3.6864 band. The data, in the exemplary embodiment, comprises 172 bits is provided to demodulation flag generator (DEMOD FLAG) 200. Demodulation flag generator 200 generates a flag that indicates whether a frame a predetermined number of frames in the future will include data transmitted on the supplemental channel or channels. In the exemplary embodiment, the demod flag bit indicates whether two frames in the future the base station 104 will transmit data to remote station 106 on the supplemental channel.

The 173 bits are then provided to cyclic redundancy check (CRC) generator 202 which generates a set of check bits in a manner similar to parity bits. The implementation of CRC bit check generators is well known in the art and an exemplary implementation is described in detail in the Telecommunications Industry Association Standard TIA/EIA/IS-95-A entitled *Mobile Station-Base Station Compatibility Standard for Dual Mode Wideband Spread Spectrum Cellular System*. In the exemplary embodiment, CRC generator 202 generates an 11-bit CRC for the frame. The frame is then provided to tail bit generator 204 which appends to the frame a set of tail bits. In the exemplary embodiment, the tail bit generator 204 appends an eight bit all 0 tail to the frame.

The 192 bits (172 information bits, demod flag, 11 CRC bits and 8 tail bits) from tail bit generator 204 are provided to encoder 206. In the exemplary embodiment, encoder 206 is a rate ½ convolutional encoder. In alternative embodiments, encoder 206 could be a Reed Solomon encoder or other error correction/detection encoder. The encoded symbols are then provided to interleaver 208 which reorder the encoded symbols in accordance with a predetermined interleaving format. In the exemplary embodiment, interleaver 208 is a block interleaver in which data is read into a buffer in rows and read out of the buffer in columns. In alternative embodiments, interleaver 208 could be a bit reversal interleaver or a convolutional interleaver.

The output of interleaver 208 is provided to repetition generator 210. The function of repetition generator 208 is to assure that regardless of the number of information bits in the packet, the output rate remains constant. For example, in FIGS. 4A–4D, the output of the initial processing contains 576 bits regardless of the input data rate. As is well known in the art, the transmission power can be decreased when repetition is present because the receiver system can combine the repeated symbols to provide improved estimates of the transmitted data.

The 384 encoded bits are provided from interleaver 208 to repetition generator 210. Repetition generator 210 generates a packet containing the original 384 encoded symbols and an additionally repeated 192 encoded symbols. In the exemplary embodiment, starts the repetition generator 210 selects the starting point of the repetitions in accordance with a pseudorandomly selected starting point. In the exemplary embodiment, pseudorandom generator 209 selects a starting point for the repetition process and provides that information to repetition generator 210.

FIG. 4B illustrates the initial processing of half rate data for transmission on the primary channel in a 3.6864 Mcps band. The data, in the exemplary embodiment, comprises 80 bits is provided to demodulation flag generator (DEMOD FLAG) 212. As described with respect to demodulation flag generator 200, to demodulation flag generator (DEMOD FLAG) 212 generates a flag that indicates whether a frame a predetermined number of frames in the future will include data transmitted on the supplemental channel or channels.

The 81 bits are then provided to cyclic redundancy check (CRC) generator 214 which generates a set of check bits in a manner similar to parity bits as described above with respect to CRC generator 202. In the exemplary embodiment, CRC generator 214 generates an 10-bit CRC for the frame. The frame is then provided to tail bit generator 216 which appends to the frame a set of tail bits. In the exemplary embodiment, the tail bit generator 216 appends an eight bit all 0 tail to the frame.

The 99 bits (80 information bits, demod flag, 10 CRC bits and 8 tail bits) from tail bit generator 216 are provided to encoder 218. In the exemplary embodiment, encoder 218 is a rate ½ convolutional encoder. In alternative embodiments, encoder 218 could be a Reed Solomon encoder or other error correction/detection encoder. The encoded symbols are then provided to interleaver 220 which reorders the encoded symbols in accordance with a predetermined interleaving format as described above with respect to interleaver 10.

The reordered symbol data is then provided to repetition generator 222. The function of repetition generator 222 is to assure that regardless of the rate of the data the output rate remains constant. The 198 encoded bits are provided from interleaver 220 to repetition generator 222. Repetition generator 222 repeats 186 of the encoded symbols and adds the repeated symbols to the frames. In the exemplary embodiment, starts the repetition process selects the starting point of the repetition in accordance with a pseudorandomly selected starting point. In the exemplary embodiment, pseudorandom generator 221 selects a starting point for the repetition process and provides that information to repetition generator 222.

FIG. 4C illustrates the initial processing of quarter rate data for transmission on the primary channel. The quarter rate data packet, in the exemplary embodiment, comprising 40 information bits is provided to demodulation flag generator (DEMOD FLAG) 224. As described with respect to demodulation flag generator 200, demodulation flag generator (DEMOD FLAG) 224 generates a flag that indicates whether a frame a predetermined number of frames in the future will include data transmitted on the supplemental channel or channels.

The 41 bit packet is then provided to cyclic redundancy check (CRC) generator 226 which generates a set of check bits in a manner similar to parity bits as described above with respect to CRC generator 202. In the exemplary embodiment, CRC generator 226 generates an 8-bit CRC for the frame. The frame is then provided to tail bit generator 228 which appends to the frame a set of tail bits. In the exemplary embodiment, the tail bit generator 228 appends an eight bit all 0 tail to the frame.

The 57 bits (40 information bits, demod flag, 8 CRC bits and 8 tail bits) from tail bit generator 228 are provided to encoder 230. In the exemplary embodiment, encoder 230 is a rate ½ convolutional encoder. In alternative embodiments, encoder 230 could be a Reed Solomon encoder or other error correction/detection encoder. The encoded symbols are then provided to interleaver 232 which reorders the encoded symbols in accordance with a predetermined interleaving format as described above with respect to interleaver 208.

The reordered symbol data is then provided to repetition generator 234. The function of repetition generator 234 as described with respect to repetition generator 210 is to assure that, regardless of the rate of information bits, the output rate remains constant. Repetition generator 234 repeats the 114 bits five times within the output packet and then repeats 6 of the encoded symbols. As described above, in the exemplary embodiment, the 6 bits of the packet to be repeated are selected by a pseudorandomly selected starting point which is determined in accordance with a pseudorandom starting point provided by pseudonoise generator 233.

FIG. 4D illustrates the initial processing of eighth rate data for transmission on the primary channel. The eighth rate data packet, in the exemplary embodiment, comprising 16 information bits is provided to demodulation flag generator (DEMOD FLAG) 236. As described with respect to demodulation flag generator 200, demodulation flag generator (DEMOD FLAG) 236 generates a flag that indicates whether a frame a predetermined number of frames in the future will include data transmitted on the supplemental channel or channels.

The 17 bit packet is then provided to cyclic redundancy check (CRC) generator 238 which generates a set of check bits in a manner similar to parity bits as described above with respect to CRC generator 202. In the exemplary embodiment, CRC generator 238 generates a 6-bit CRC for the frame. The frame is then provided to tail bit generator 240 which appends to the frame a set of tail bits. In the exemplary embodiment, the tail bit generator 240 appends an eight bit all 0 tail to the frame.

The 31 bits (16 information bits, demod flag, 6 CRC bits and 8 tail bits) from tail bit generator 240 are provided to encoder 242. In the exemplary embodiment, encoder 242 is a rate ½ convolutional encoder. In alternative embodiments, encoder 242 could be a Reed Solomon encoder or other error correction/detection encoder. The encoded symbols are then provided to interleaver 244 which reorders the encoded symbols in accordance with a predetermined interleaving format as described above with respect to interleaver 208.

The reordered symbol data is then provided to repetition generator 246. The function of repetition generator 246 as described with respect to repetition generator 210 is to assure that regardless of the rate of information bits the output rate remains constant. Repetition generator 246 repeats the 62 symbols nine time within the output packet and then repeats 18 of the encoded symbols. As described above, in the exemplary embodiment, the starting points of the repetitions are selected by a pseudorandomly selected starting point provided by pseudonoise generator 245.

Figure 4E:
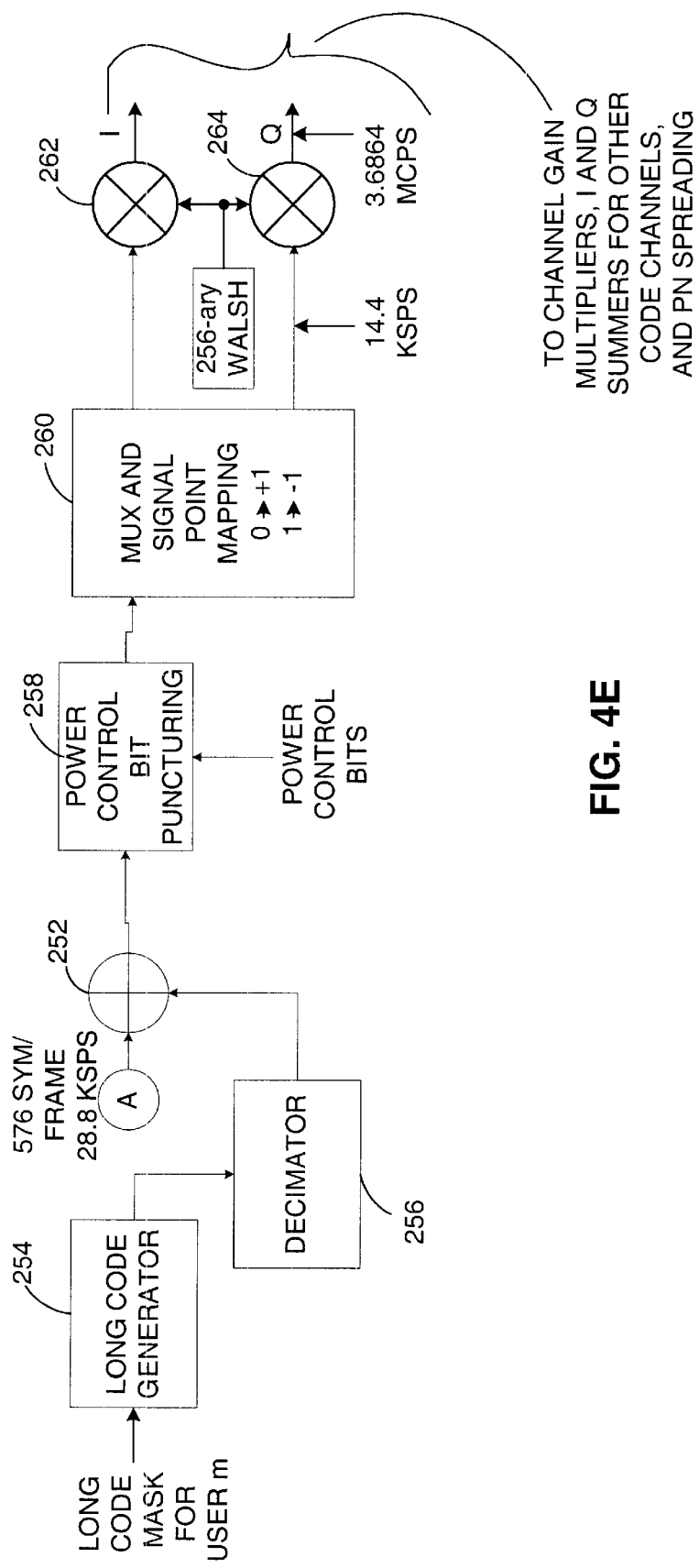

FIG. 4E illustrates the intermediate processing of the frame of data for transmission in accordance with the present invention. The output packets for full rate, half rate, quarter rate and eighth rate, as described with respect to FIGS. 4A, 4B, 4C and 4D respectively, are provided to a first input of exclusive-OR 252. Long code generator 254 generates a spreading code in accordance with a long code mask for the user to which the data is being transmitted. The design and implementation of long code generator 254 is well known in the art and is described in detail in the aforementioned IS-95 standard. Long code generator 254, in the exemplary embodiment, provides the long code at a rate of 1.2288 Mcps. Decimator 256 cuts down the rate of the PN sequence to 19.2 ksps. In the exemplary embodiment, decimator 256 performs this operation by selecting the first chip of each symbol period.

The reduced rate PN sequence from decimator 256 is provided to a second input of exclusive-OR means 252. The scrambled packet is then provided to power control bit puncturing element 258. Bits indicating adjustments for transmission power of remote station 106 are punctured into the scrambled packet by puncturing methods well known in the art. The packet is then provided to multiplexer/mapping means 260. In the exemplary embodiment, multiplexer/mapping means 260 maps a scrambled 0 symbol to a value of +1 and maps a scrambled 1 symbol to a value of −1. Multiplexer/mapping means 260 then alternative outputs the mapped symbols to the I and Q outputs.

The outputs from multiplexer/mapping means 260 are provided to first inputs of multipliers 262 and 264. The second input of multipliers 262 and 264 are provide a 256 bit Walsh sequence comprising values of +1. The Walsh sequence is orthogonal to all other Walsh covering sequences as is known in the art and is used by the mobile station to differentiate signals transmitted to it from signals transmitted to other remote stations in the area.

The final step of processing of the signal is performed as described with respect to FIG. 3 above.

V. Initial Processing Forward Link Data Rate Set Two for Transmission in a 1.2288 Mcps Band FIGS. 5A–5D illustrate the first embodiment of the initial processing of variable rate data of Rate set 2 variable rate data on a primary channel which is transmitted in a signal bandwidth of 1.2288 Mcps. The data rates of the variable rate data in the FIGS. 5A–5D correspond to the information data rates described in the appendix to the IS-95 standard as the multiplex 2 option. In the exemplary embodiment, there are four rates referred to herein as full rate, half rate, quarter rate and eighth rate.

Figure 5A:
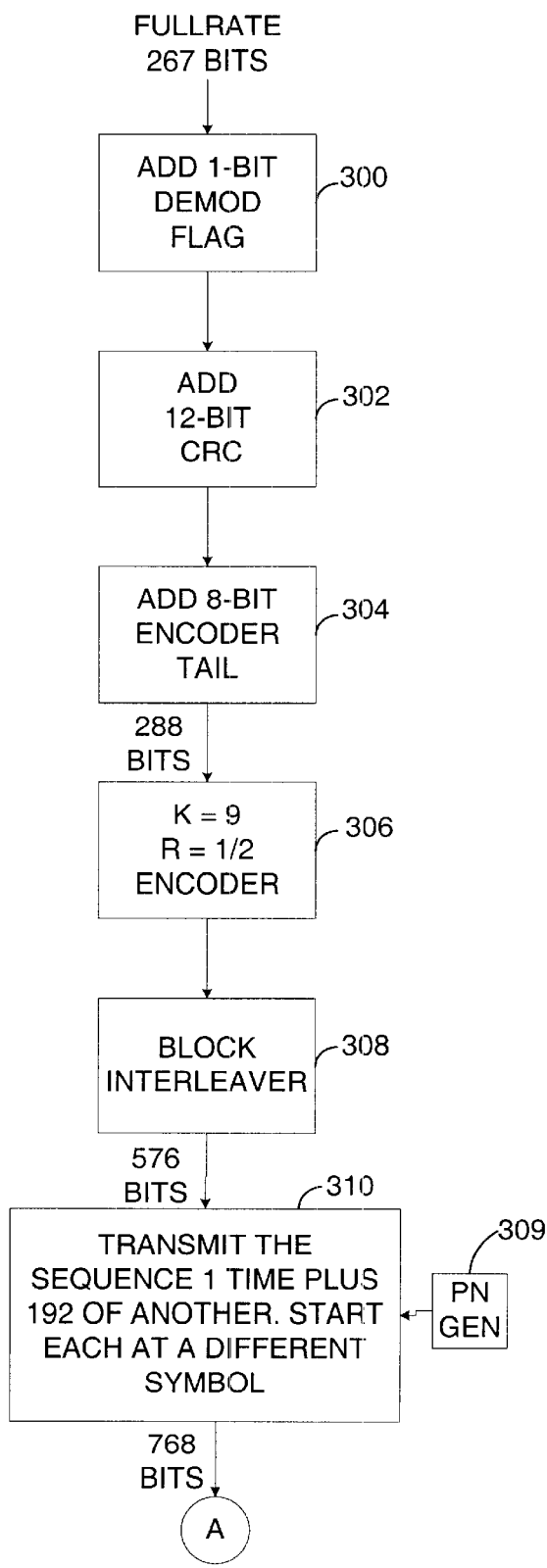

FIG. 5A illustrates the initial processing of full rate data for transmission on the primary channel. The data, in the exemplary embodiment, comprises 267 bits is provided to demodulation flag generator (DEMOD FLAG) 300. Demodulation flag generator 300 generates a flag that indicates whether a frame a predetermined number of frames in the future will include data transmitted on the supplemental channel or channels. In the exemplary embodiment, the demod flag bit indicates whether two frames in the future the base station 104 will transmit data to remote station 106 on a supplemental channel to be described further herein.

The 268 bits are then provided to cyclic redundancy check (CRC) generator 302 which generates a set of check bits in a manner similar to parity bits. The implementation of CRC bit check generators is well known in the art and an exemplary implementation is described in detail in the Telecommunications Industry Association Standard TIA/EIA/IS-95-A entitled *Mobile Station-Base Station Compatibility Standard for Dual Mode Wideband Spread Spectrum Cellular System*. In the exemplary embodiment, CRC generator 302 generates an 12-bit CRC for the frame. The frame is then provided to tail bit generator 304 which appends to the frame a set of tail bits. In the exemplary embodiment, tail bit generator 304 appends an eight bit all 0 tail to the frame.

The 288 bits (267 information bits, demod flag, 12 CRC bits and 8 tail bits) from tail bit generator 304 are provided to encoder 306. In the exemplary embodiment, encoder 306 is a rate ½ convolutional encoder. In alternative embodiments, encoder 306 could be a Reed Solomon encoder or other error correction/detection encoder. The encoded symbols are then provided to interleaver 308 which reorder the encoded symbols in accordance with a predetermined interleaving format. In the exemplary embodiment, interleaver 308 is a block interleaver in which data is read into a buffer in rows and read out of the buffer in columns. In alternative embodiments, interleaver 308 could be a bit reversal interleaver or a convolutional interleaver.

The output of interleaver 308 is provided to repetition generator 310. The function of repetition generator 310 is to assure that regardless of the number of information bits in the packet, the output rate remains constant. In FIGS. 5A–5D, the output of the initial processing contains 768 bits regardless of the input data rate.

The 576 encoded bits are provided from interleaver 308 to repetition generator 310. Repetition generator 310 generates a packet containing the one version of the original 576 encoded symbols and an additionally repeated 192 encoded symbols. In the exemplary embodiment, the repetition generator 310 selects the starting point of the repetitions in accordance with a pseudorandomly selected starting point provided by pseudorandom generator 309.

Figure 5B:
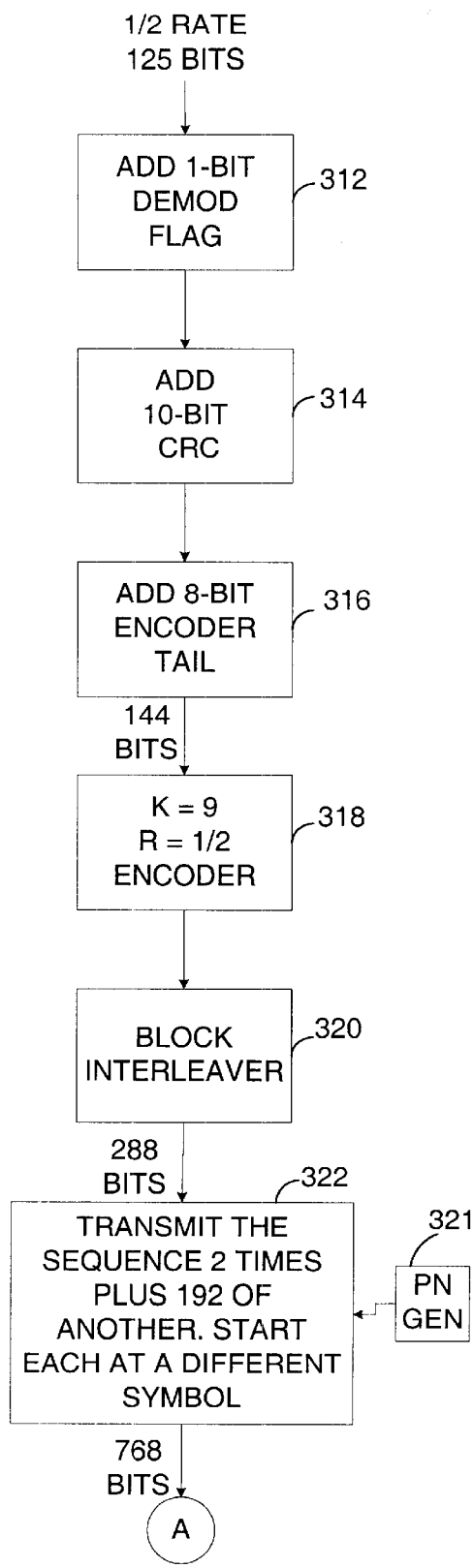

FIG. 5B illustrates the initial processing of half rate data of Rate set 2 for transmission on the primary channel in a 1.2288 Mcps band. The data packet comprises 125 bits is provided to demodulation flag generator (DEMOD FLAG) 312. As described with respect to demodulation flag generator 300, demodulation flag generator (DEMOD FLAG) 312 generates a flag that indicates whether a frame a predetermined number of frames in the future will include data transmitted on the supplemental channel or channels. In the exemplary embodiment, the demod flag bit indicates whether two frames in the future the base station 104 will transmit data to remote station 106 on the supplemental channel to be described further herein.

The 125 bits are then provided to cyclic redundancy check (CRC) generator 314 which generates a set of check bits in a manner similar to parity bits as described above with respect to CRC generator 302. In the exemplary embodiment, CRC generator 314 generates an 10-bit CRC for the frame. The frame is then provided to tail bit generator 316 which appends to the frame a set of tail bits. In the exemplary embodiment, the tail bit generator 316 appends an eight bit all 0 tail to the frame.

The 144 bits (125 information bits, demod flag, 10 CRC bits and 8 tail bits) from tail bit generator 316 are provided to encoder 318. In the exemplary embodiment, encoder 318 is a rate ½ convolutional encoder. In alternative embodiments, encoder 318 could be a Reed Solomon encoder or other error correction/detection encoder. The encoded symbols are then provided to interleaver 320 which reorders the encoded symbols in accordance with a predetermined interleaving format as described above with respect to interleaver 308.

The reordered symbol data is then provided to repetition generator 322. The function of repetition generator 322 is to assure that regardless of the rate of the data the output rate remains constant. The output of the initial processing contains 768 bits regardless of the input data rate. The 288 encoded bits are provided from interleaver 320 to repetition generator 322. Repetition generator 322 repeats the encoded symbols twice and repeats an additional 192 of the 288 encoded symbols. In the exemplary embodiment, repetition generator 322 selects the starting point of the repetitions in accordance with a pseudorandomly selected starting point. In the exemplary embodiment, pseudorandom generator 321 selects a starting point for the repetition process and provides that information to repetition generator 322.

FIG. 4C illustrates the initial processing of quarter rate data for transmission on the primary channel. The quarter rate data packet, in the exemplary embodiment, comprising 55 information bits is provided to demodulation flag generator (DEMOD FLAG) 324. As described with respect to demodulation flag generator 300, demodulation flag generator (DEMOD FLAG) 324 generates a flag that indicates whether a frame a predetermined number of frames in the future will include data transmitted on the supplemental channel or channels.

The 56 bit packet is then provided to cyclic redundancy check (CRC) generator 326 which generates a set of check bits in a manner similar to parity bits as described above with respect to CRC generator 302. In the exemplary embodiment, CRC generator 326 generates an 8-bit CRC for the frame. The frame is then provided to tail bit generator 328 which appends to the frame a set of tail bits. In the exemplary embodiment, the tail bit generator 328 appends an eight bit all 0 tail to the frame.

The 72 bits (55 information bits, demod flag, 8 CRC bits and 8 tail bits) from tail bit generator 328 are provided to encoder 330. In the exemplary embodiment, encoder 330 is a rate ½ convolutional encoder. In alternative embodiments, encoder 330 could be a Reed Solomon encoder or other error correction/detection encoder. The encoded symbols are then provided to interleaver 332 which reorders the encoded symbols in accordance with a predetermined interleaving format as described above with respect to interleaver 308.

The reordered symbol data is then provided to repetition generator 334. The function of repetition generator 334 as described with respect to repetition generator 310 is to assure that regardless of the rate of information bits the output rate remains constant. Repetition generator 334 repeats the 144 bits five times within the output packet and then repeats 48 of the encoded symbols. As described above, the 48 bits of the packet to be repeated are selected by a pseudorandomly selected starting point which is determined in accordance with a pseudorandom starting point provided by pseudonoise generator 333.

FIG. 5D illustrates the initial processing of eighth rate data for transmission on the primary channel. The eighth rate data packet, in the exemplary embodiment, comprising 21 information bits is provided to demodulation flag generator (DEMOD FLAG) 336. As described with respect to demodulation flag generator 300, demodulation flag generator (DEMOD FLAG) 336 generates a flag that indicates whether a frame a predetermined number of frames in the future will include data transmitted on the supplemental channel or channels. In the exemplary embodiment, the demod flag bit indicates whether two frames in the future the base station 104 will transmit data to remote station 106 on the supplemental channel.

The 22 bit packet is then provided to cyclic redundancy check (CRC) generator 338 which generates a set of check bits in a manner similar to parity bits as described above with respect to CRC generator 302. In the exemplary embodiment, CRC generator 338 generates a 6-bit CRC for the frame. The frame is then provided to tail bit generator 340 which appends to the frame a set of tail bits. In the exemplary embodiment, the tail bit generator 340 appends an eight bit all 0 tail to the frame.

The 36 bits (21 information bits, demod flag, 6 CRC bits and 8 tail bits) from tail bit generator 340 are provided to encoder 342. In the exemplary embodiment, encoder 342 is a rate ½ convolutional encoder. In alternative embodiments, encoder 342 could be a Reed Solomon encoder or other error correction/detection encoder. The encoded symbols are then provided to interleaver 344 which reorders the encoded symbols in accordance with a predetermined interleaving format as described above with respect to interleaver 308.

The reordered symbol data is then provided to repetition generator 346. The function of repetition generator 346 as described with respect to repetition generator 310 is to assure that regardless of the rate of information bits the output rate remains constant. Repetition generator 346 repeats the 72 bits ten time within the output packet and then repeats 48 of the encoded symbols. As described above, in the exemplary embodiment, the starting points of the repetitions are selected pseudorandomly by pseudonoise generator 345.

Figure 5E:
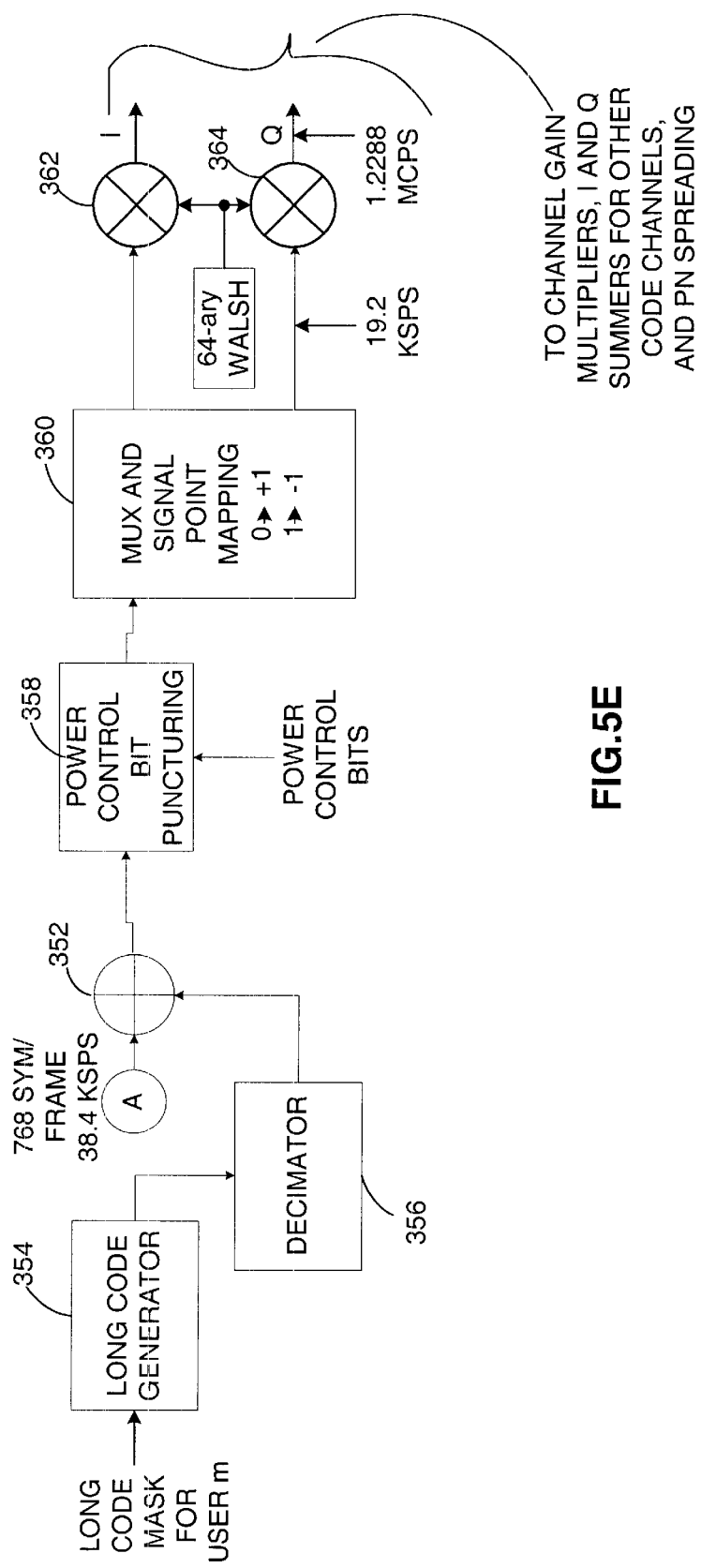

FIG. 5E illustrates the intermediate processing of the frame of data for transmission in accordance with the present invention. The output packets for full rate, half rate, quarter rate and eighth rate, as described with respect to FIGS. 5A, 5B, 5C and 5D respectively, are provided to a first input of exclusive-OR 352. Long code generator 354 generates a spreading code in accordance with a long code mask for the user to which the data is being transmitted. The design and implementation of long code generator 354 is well known in the art and is described in detail in the aforementioned IS-95 standard. Long code generator 354, in the exemplary embodiment, provides the long code at a rate of 1.2288 Mcps. Decimator 356 cuts down the rate of the PN sequence to 19.2 ksps. In the exemplary embodiment, decimator 356 performs this operation by selecting the first chip of each symbol period.

The reduced rate PN sequence from decimator 356 is provided to a second input of exclusive-OR means 352. The scrambled packet is then provided to power control bit puncturing element 358. Bits indicating adjustments for transmission power of remote station 106 are punctured into the scrambled packet by puncturing methods well known in the art. The packet is then provided to multiplexer/mapping means 360. In the exemplary embodiment, multiplexer/mapping means 360 maps a scrambled 0 symbol to a value of +1 and maps a scrambled 1 symbol to a value of −1. Multiplexer/mapping means 360, then alternative outputs the mapped symbols to the I and Q outputs.

The outputs from multiplexer/mapping means 360 are provided to first inputs of multipliers 362 and 364. The second input of multipliers 362 and 364 are provide a 64 bit Walsh sequence comprising values of +1 which is determined in accordance with the combination of two 128 bit Walsh sequences. The Walsh sequence is orthogonal to all other Walsh covering sequences as is known in the art and is used by the mobile station to differentiate signals transmitted to it from signals transmitted to other remote stations in the area.

The final step of processing of the signal is performed as described with respect to FIG. 3 above.

VI. Initial Processing Forward Link Data Rate Set Two for Transmission in a 1.2288 Mcps Band FIGS. 6A–6D illustrate the first embodiment of the initial processing of variable rate data of the second set of variable rate data on a primary channel which is transmitted in a signal bandwidth of 3.6864 Mcps. The data rates of the variable rate data in the FIGS. 6A–6D which correspond to the information data rates described in the appendix to the IS-95 standard as the multiplex 2 option. In the exemplary embodiment, there are four rates referred to herein as full rate, half rate, quarter rate and eighth rate. It should be noted that the present invention contemplates speech data or voice data or a combination of the two being carried on the primary channel.

Figures 6A, 6B:
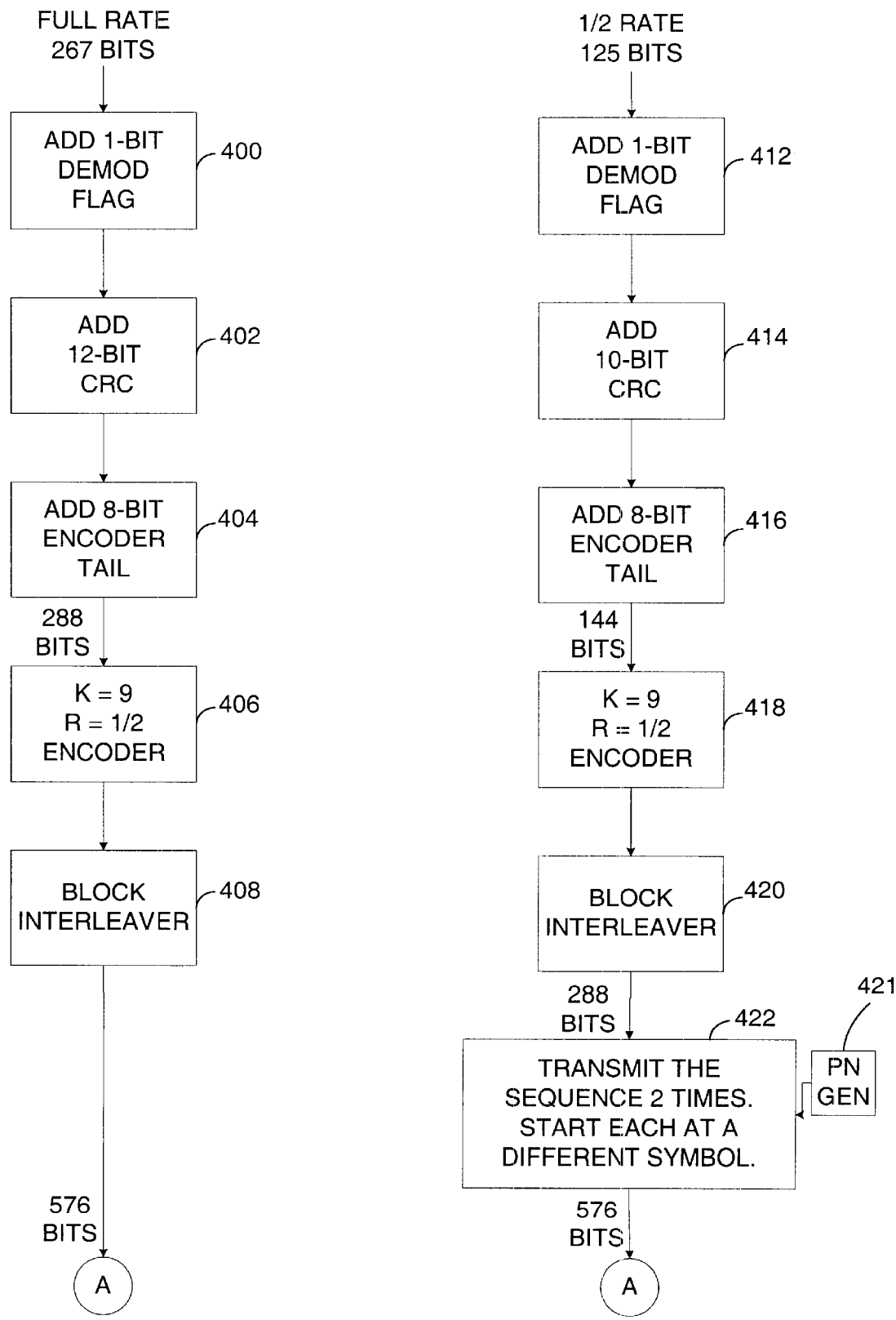

FIG. 6A illustrates the initial processing of full rate data for transmission on the primary channel. The data, in the exemplary embodiment, comprises 267 bits is provided to demodulation flag generator (DEMOD FLAG) 400. Demodulation flag generator 400 generates a flag that indicates whether a frame a predetermined number of frames in the future will include data transmitted on the supplemental channel or channels. In the exemplary embodiment, the demod flag bit indicates whether two frames in the future the base station 104 will transmit data to remote station 106 on a supplemental channel to be described further herein.

The 268 bits are then provided to cyclic redundancy check (CRC) generator 402 which generates a set of check bits in a manner similar to parity bits. The implementation of CRC bit check generators is well known in the art and an exemplary implementation is described in detail in the Telecommunications Industry Association Standard TIA/EIA/IS-95-A entitled *Mobile Station-Base Station Compatibility Standard for Dual Mode Wideband Spread Spectrum Cellular System*. In the exemplary embodiment, CRC generator 402 generates an 12-bit CRC for the frame. The frame is then provided to tail bit generator 404 which appends to the frame a set of tail bits. In the exemplary embodiment, tail bit generator 404 appends an eight bit all 0 tail to the frame.

The 288 bits (267 information bits, demod flag, 12 CRC bits and 8 tail bits) from tail bit generator 404 are provided to encoder 406. In the exemplary embodiment, encoder 406 is a rate ½ convolutional encoder. In alternative embodiments, encoder 406 could be a Reed Solomon encoder or other error correction/detection encoder. The encoded symbols are then provided to interleaver 408 which reorder the encoded symbols in accordance with a predetermined interleaving format. In the exemplary embodiment, interleaver 408 is a block interleaver in which data is read into a buffer in rows and read out of the buffer in columns. In alternative embodiments, interleaver 408 could be a bit reversal interleaver or a convolutional interleaver.

FIG. 5B illustrates the initial processing of half rate data for transmission on the primary channel in a 3.6864 Mcps band. The data, in the exemplary embodiment, comprises 125 bits is provided to demodulation flag generator (DEMOD FLAG) 412. As described with respect to demodulation flag generator 400, demodulation flag generator (DEMOD FLAG) 412 generates a flag that indicates whether a frame a predetermined number of frames in the future will include data transmitted on the supplemental channel or channels. In the exemplary embodiment, the demod flag bit indicates whether two frames in the future the base station 104 will transmit data to remote station 106 on the supplemental channel to be described further herein.

The 125 bits are then provided to cyclic redundancy check (CRC) generator 414 which generates a set of check bits in a manner similar to parity bits as described above with respect to CRC generator 402. In the exemplary embodiment, CRC generator 414 generates an 10-bit CRC for the frame. The frame is then provided to tail bit generator 416 which appends to the frame a set of tail bits. In the exemplary embodiment, the tail bit generator 416 appends an eight bit all 0 tail to the frame.

The 144 bits (125 information bits, demod flag, 10 CRC bits and 8 tail bits) from tail bit generator 416 are provided to encoder 418. In the exemplary embodiment, encoder 418 is a rate ½ convolutional encoder. In alternative embodiments, encoder 418 could be a Reed Solomon encoder or other error correction/detection encoder. The encoded symbols are then provided to interleaver 420 which reorders the encoded symbols in accordance with a predetermined interleaving format as described above with respect to interleaver 408.

The reordered symbol data is then provided to repetition generator 422. The function of repetition generator 422 is to assure that regardless of the rate of the data the output rate remains constant. The output of the initial processing contains 576 bits regardless of the input data rate. The 288 encoded bits are provided from interleaver 420 to repetition generator 422. Repetition generator 422 repeats the encoded symbols twice. In the exemplary embodiment, the starting place of each repetition is pseudorandomly selected in accordance with a starting place provided by PN generator 421.

FIG. 6C illustrates the initial processing of quarter rate data for transmission on the primary channel. The quarter rate data packet, in the exemplary embodiment, comprising 55 information bits is provided to demodulation flag generator (DEMOD FLAG) 424. As described with respect to demodulation flag generator 400, demodulation flag generator (DEMOD FLAG) 424 generates a flag that indicates whether a frame a predetermined number of frames in the future will include data transmitted on the supplemental channel or channels.

The 56 bit packet is then provided to cyclic redundancy check (CRC) generator 426 which generates a set of check bits in a manner similar to parity bits as described above with respect to CRC generator 402. In the exemplary embodiment, CRC generator 426 generates an 8-CRC for the frame. The frame is then provided to tail bit generator 428 which appends to the frame a set of tail bits. In the exemplary embodiment, the tail bit generator 428 appends an eight bit all 0 tail to the frame.

The 72 bits (55 information bits, demod flag, 8 CRC bits and 8 tail bits) from tail bit generator 428 are provided to encoder 430. In the exemplary embodiment, encoder 430 is a rate ½ convolutional encoder. In alternative embodiments, encoder 430 could be a Reed Solomon encoder or other error correction/detection encoder. The encoded symbols are then provided to interleaver 432 which reorders the encoded symbols in accordance with a predetermined interleaving format as described above with respect to interleaver 408.

The reordered symbol data is then provided to repetition generator 434. The function of repetition generator 434 as described with respect to repetition generator 410 is to provide that regardless of the rate of information bits the output rate remains constant. Repetition generator 434 repeats the 144 bits four times within the output packet. As described above, in the exemplary embodiment, the repetitions are provided in accordance with a pseudorandomly selected starting point which is determined by pseudonoise generator 433.

FIG. 5D illustrates the initial processing of eighth rate data for transmission on the primary channel. The eighth rate data packet, in the exemplary embodiment, comprising 21 information bits is provided to demodulation flag generator (DEMOD FLAG) 436. As described with respect to demodulation flag generator 400, demodulation flag generator (DEMOD FLAG) 436 generates a flag that indicates whether a frame a predetermined number of frames in the future will include data transmitted on the supplemental channel or channels. In the exemplary embodiment, the demod flag bit indicates whether two frames in the future the base station 104 will transmit data to remote station 106 on the supplemental channel.

The 22 bit packet is then provided to cyclic redundancy check (CRC) generator 438 which generates a set of check bits in a manner similar to parity bits as described above with respect to CRC generator 402. In the exemplary embodiment, CRC generator 438 generates a 6-bit CRC for the frame. The frame is then provided to tail bit generator 440 which appends to the frame a set of tail bits. In the exemplary embodiment, the tail bit generator 440 appends an eight bit all 0 tail to the frame.

The 36 bits (21 information bits, demod flag, 6 CRC bits and 8 tail bits) from tail bit generator 440 are provided to encoder 442. In the exemplary embodiment, encoder 442 is a rate ½ convolutional encoder. In alternative embodiments, encoder 442 could be a Reed Solomon encoder or other error correction/detection encoder. The encoded symbols are then provided to interleaver 444 which reorders the encoded symbols in accordance with a predetermined interleaving format as described above with respect to interleaver 408.

The reordered symbol data is then provided to repetition generator 446. The function of repetition generator 446 as described with respect to repetition generator 422 is to assure that regardless of the rate of information bits the output rate remains constant. Repetition generator 446 repeats the 72 bits eight time within the output packet. As described above, in the exemplary embodiment, the starting points of the repetitions are selected in accordance with a pseudorandom starting point provided by pseudonoise generator 445.

Figure 6E:
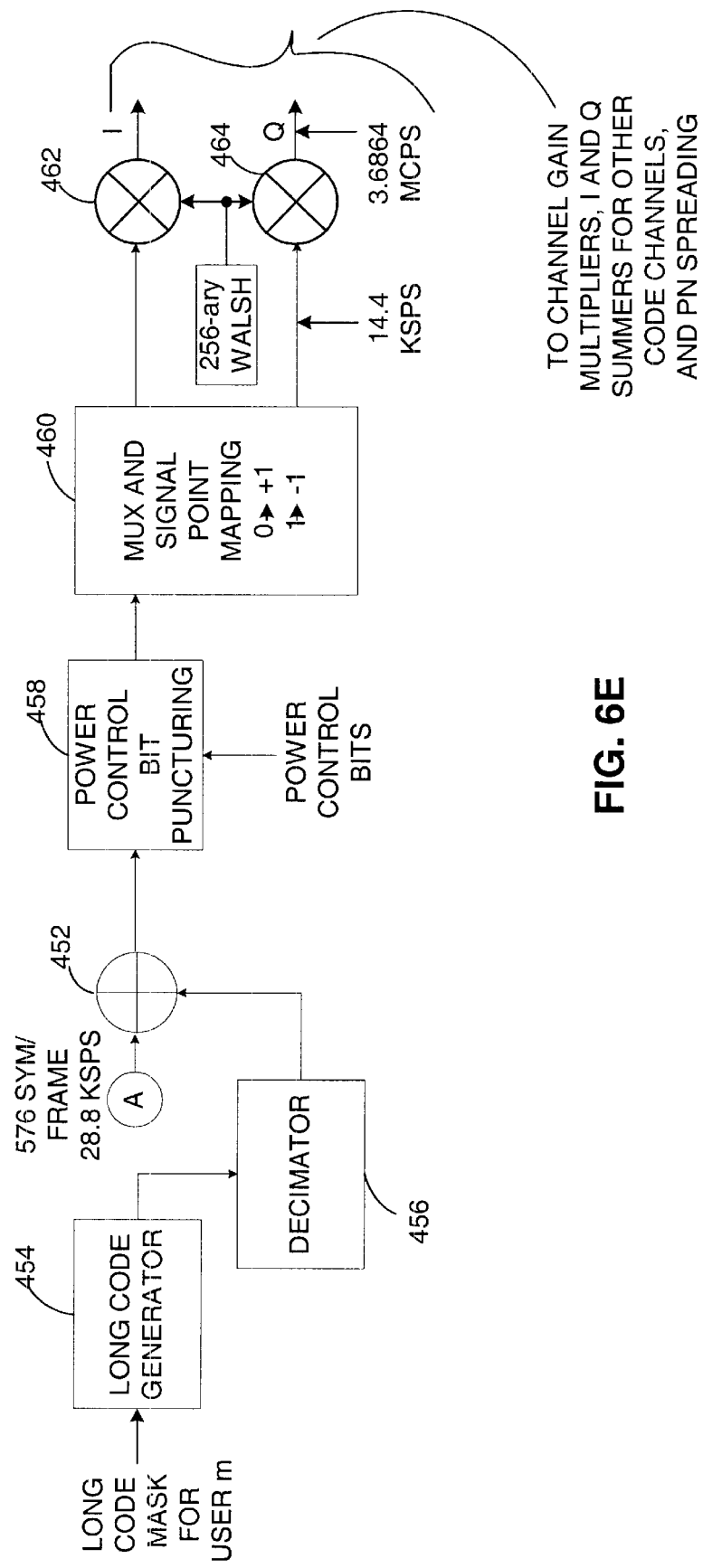

FIG. 6E illustrates the intermediate processing of the frame of data for transmission in accordance with the present invention. The output packets for full rate, half rate, quarter rate and eighth rate, as described with respect to FIGS. 6A, 6B, 6C and 6D respectively, are provided to a first input of exclusive-OR 452. Long code generator 454 generates a spreading code in accordance with a long code mask for the user to which the data is being transmitted. The design and implementation of long code generator 454 is well known in the art and is described in detail in the aforementioned IS-95 standard. Long code generator 454, in the exemplary embodiment, provides the long code at a rate of 1.2288 Mcps. Decimator 456 cuts down the rate of the PN sequence to 19.2 ksps. In the exemplary embodiment, decimator 456 performs this operation by selecting the first chip of each symbol period.

The reduced rate PN sequence from decimator 456 is provided to a second input of exclusive-OR means 452. The scrambled packet is then provided to power control bit puncturing element 458. Bits indicating adjustments for transmission power of remote station 106 are punctured into the scrambled packet by puncturing methods well known in the art. The packet is then provided to multiplexer/mapping means 460. In the exemplary embodiment, multiplexer/mapping means 460 maps a scrambled 0 symbol to a value of +1 and maps a scrambled 1 symbol to a value of −1. Multiplexer/mapping means 460 then alternative outputs the mapped symbols to the I and Q outputs.

The outputs from multiplexer/mapping means 460 are provided to first inputs of multipliers 462 and 464. The second input of multipliers 462 and 464 are provide a 64 bit Walsh sequence comprising values of +1 which is determined in accordance with the combination of two 256 bit Walsh sequences. The Walsh sequence is orthogonal to all other Walsh covering sequences as is known in the art and is used by the mobile station to differentiate signals transmitted to it from signals transmitted to other remote stations in the area.

The final step of processing of the signal is performed as described with respect to FIG. 3 above.

Figure 7:
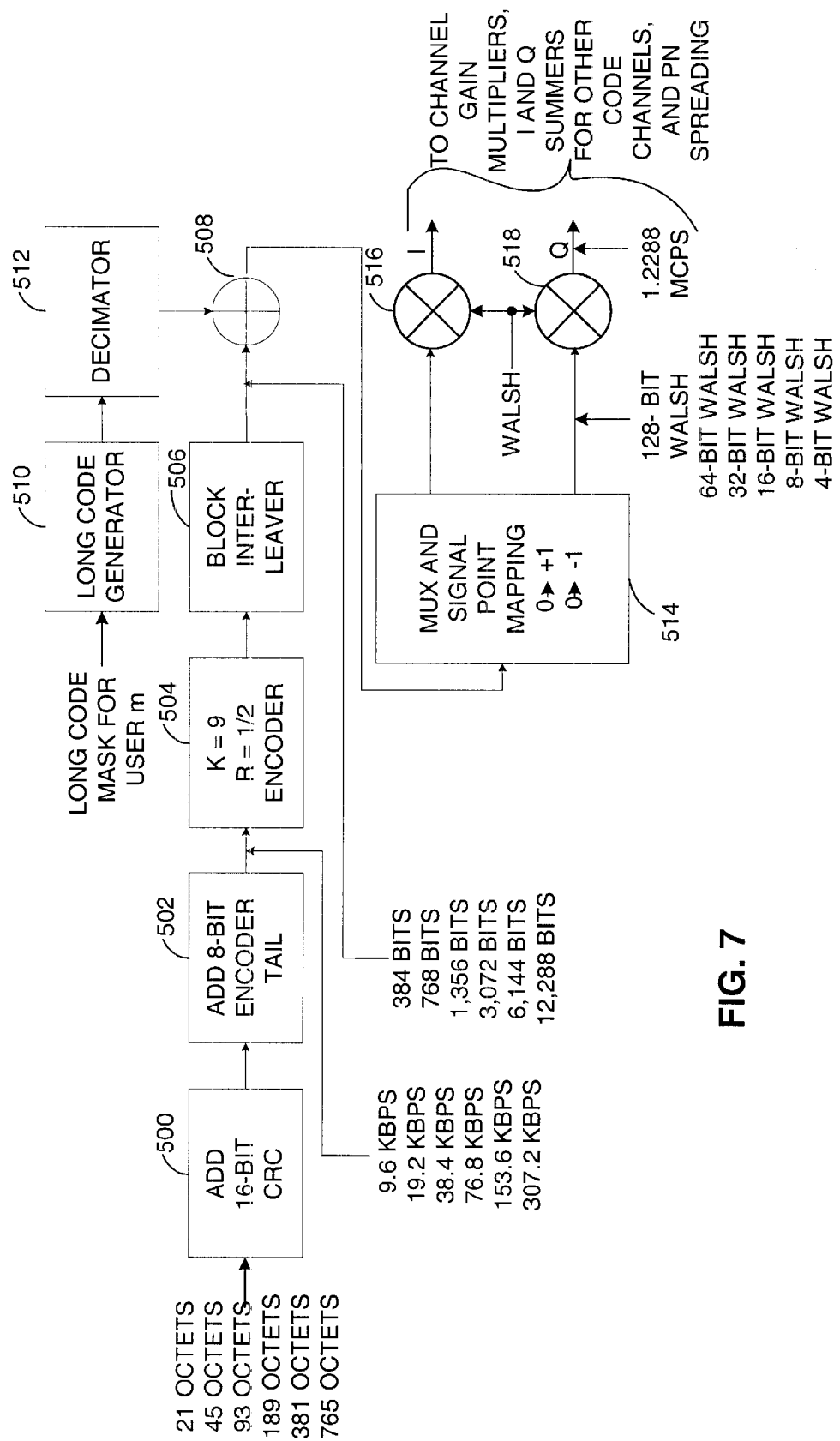
FIG. 7 illustrates the initial and intermediate processing of forward link digital data for transmission on the supplemental channel in a 1.2288 Mcps band.

VII. Processing Forward Link Supplemental Channel for Transmission in a 1.2288 Mcps Band FIG. 7 illustrates the exemplary embodiment of the supplemental channel of the present invention. Packets of digital data are provided to the input of CRC generator 500. In the exemplary embodiment, packets are provided at a rate of 1 every 20 ms. The packets of information bits contain 21, 45, 93, 189, 381 or 765 octets (8 bit groupings) of data. CRC generator 500 generates a set of 16 cyclic redundancy check bits and appends them to the packet. The output of CRC generator 500 is provided to tail bit generator 502. In the exemplary embodiment, tail bit generator appends an 8-bit all zero tail to the packet.

The output of tail bit generator 502 is provides data to encoder 504. Encoder 504 encodes the data to provide error detection and correction. In the exemplary embodiment, encoder 504 is a rate ½ convolutional encoder with constraint length 9. In alternative embodiments, encoder 504 could be a different encoder such as a Reed Solomon encoder. The encoded symbols from encoder 504 are provided to interleaver 506 which reorders the encoded symbols in accordance with a predetermined ordering format. In the exemplary embodiment, interleaver 506 is a block interleaver, though a convolutional or bit reversal interleaver is equally applicable to the present invention.

The output interleaver 506 is provided to a first input of exclusive-OR 508. Long code generator 510 generates along PN spreading code as described previously which serves to scramble the data. The long PN code is provided at a rate of 1.2288 Mcps to decimator 512 which reduces the rate of the sequence to the rate of the encoded symbols provided to the first input of the exclusive-OR 508.

The output of exclusive-OR 508 is provided to multiplexer/mapping means 514. In the exemplary embodiment, multiplexer/mapping means 514 maps a scrambled 0 symbol to a value of +1 and maps a scrambled 1 symbol to a value of −1. Multiplexer/mapping means 514 then alternative outputs the mapped symbols to the I and Q outputs.

The outputs from multiplexer/mapping means 514 are provided to first inputs of multipliers 516 and 518. The second input of multipliers 516 and 518 are provide a variable length Walsh sequence comprising values of +1 which is determined in accordance with combination of a plurality 256 bit Walsh sequences as described in aformentioned U.S. patent application Ser. No. 08/784,281, filed Jan. 15, 1997, entitled "HIGH DATA RATE SUPPLEMENTAL CHANNEL FOR CDMA TELECOMMUNICATIONS SYSTEM". When the input frame consists of 21, 45, 93, 189, 381, and 765 octets, the spreading sequence comprises 128, 64, 32, 16, 8 and 4 bit Walsh sequences respectively.

The final step of processing of the signal is performed as described with respect to FIG. 3 above.

Figure 8:
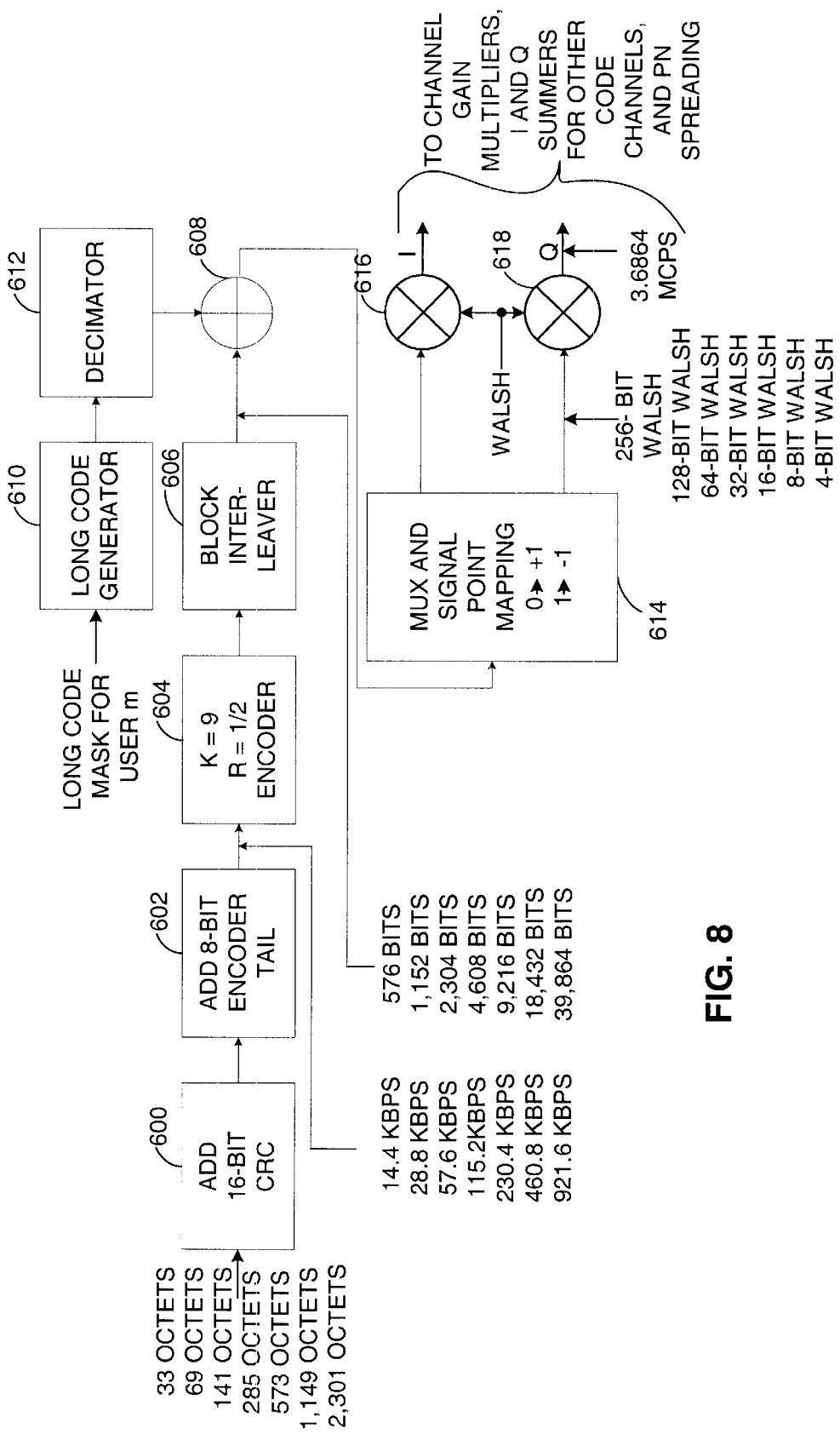
FIG. 8 illustrates the initial and intermediate processing of forward link digital data for transmission on the supplemental channel in a 3.6864 Mcps band.

VIII. Initial Processing Forward Link Data Rate Set Two for Transmission in a 1.2288 Mcps Band FIG. 8 illustrates the exemplary embodiment of the supplemental channel of the present invention in a 3.3864 Mcps band. Packets of digital data are provided to the input of CRC generator 600. In the exemplary embodiment, packets are provided at a rate of 1 every 20 ms. The packets of information bits contain 33, 69, 141, 285, 573, 1149 or 2301 octets. CRC generator 600 generates a set of 16 cyclic redundancy check bits and appends them to the packet. The output of CRC generator 600 is provided to tail bit generator 602. In the exemplary embodiment, tail bit generator appends an 8-bit all zero tail to the packet.

The output of tail bit generator 602 is provides data to encoder 604. Encoder 604 encodes the data to provide error detection and correction. In the exemplary embodiment, encoder 604 is a rate ½ convolutional encoder with constraint length 9. In alternative embodiments, encoder 604 could be a different encoder such as a Reed Solomon encoder. The encoded symbols from encoder 604 are provided to interleaver 606 which reorders the encoded symbols in accordance with a predetermined ordering format. In the exemplary embodiment, interleaver 606 is a block interleaver, though a convolutional or bit reversal interleaver is equally applicable to the present invention.

The output interleaver 606 is provided to a first input of exclusive-OR 608. Long code generator 610 generates along PN spreading code as described previously which serves to scramble the data. The long PN code is provided at a rate of 3.6864 Mcps to decimator 612 which reduces the rate of the sequence to the rate of the encoded symbols provided to the first input of the exclusive-OR 508.

The output of exclusive-OR 608 is provided to multiplexer/mapping means 614. In the exemplary embodiment, multiplexer/mapping means 614 maps a scrambled 0 symbol to a value of +1 and maps a scrambled 1 symbol to a value of −1. Multiplexer/mapping means 614 then alternative outputs the mapped symbols to the I and Q outputs.

The outputs from multiplexer/mapping means 614 are provided to first inputs of multipliers 616 and 618. The second input of multipliers 616 and 618 are provide a variable length Walsh sequence comprising values of +1 which is determined in accordance with combination of a plurality 256 bit Walsh sequences. When the input frame consists of 33, 69, 141, 285, 573, 1149 and 2301 octets, the spreading sequence comprises 256, 128, 64, 32, 16, 8 and 4 bit Walsh sequences respectively.

The final step of processing of the signal is performed as described with respect to FIG. 3 above.

Figure 9:
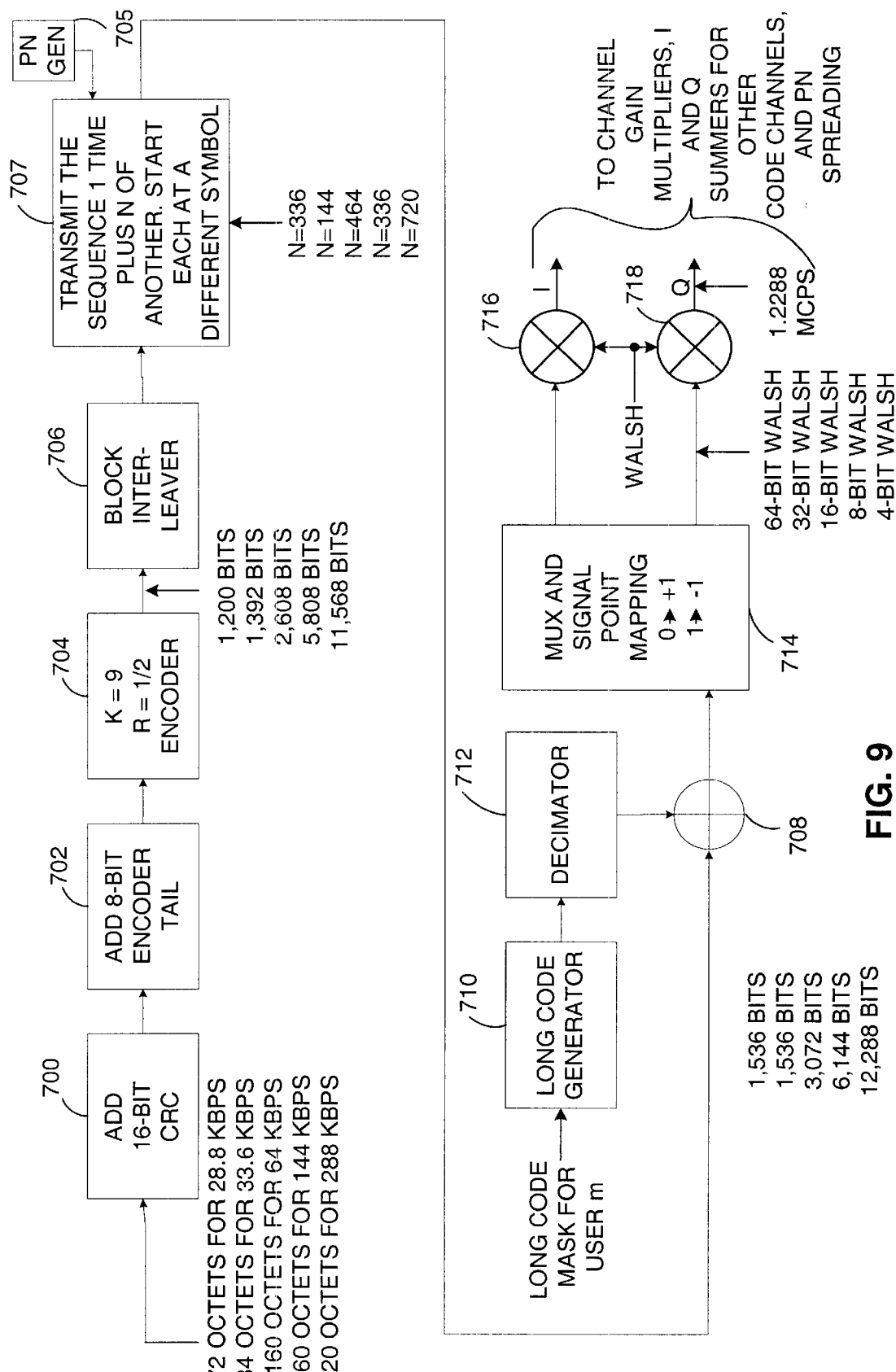
FIG. 9 illustrates the initial and intermediate processing of forward link digital data for transmission on the supplemental channel in a 1.2288 Mcps band for circuit switched applications.

IX. Initial Processing Forward Link Supplemental Channel for Transmission in a 1.2288 Mcps Band in a Circuit Switched Mode FIG. 9 illustrates an alternative embodiment of the forward link supplemental channel in a 1.2288 Mcps band, wherein the data rates are over the air are at fixed standard rates. This is accomplished by providing a repetition generator to fill the packets for over the air transfer. Packets of digital data are provided to the input of CRC generator 700. In the exemplary embodiment, packets are provided at a rate of 1 every 20 ms. The packets of information bits contain 72, 84, 160, 360 or 720 octets. CRC generator 700 generates a set of 16 cyclic redundancy check bits and appends them to the packet. The output of CRC generator 700 is provided to tail bit generator 702. In the exemplary embodiment, tail bit generator appends an 8-bit all zero tail to the packet.

The output of tail bit generator 702 is, provides data to encoder 704. Encoder 704 encodes the data to provide error detection and correction. In the exemplary embodiment, encoder 704 is a rate ½ convolutional encoder with constraint length 9. In alternative embodiments, encoder 704 could be a different encoder such as a Reed Solomon encoder. The encoded symbols from encoder 704 are provided to interleaver 706 which reorders the encoded symbols in accordance with a predetermined ordering format. In the exemplary embodiment, interleaver 706 is a block interleaver, though a convolutional or bit reversal interleaver is equally applicable to the present invention.

The output interleaver 706 is provided to repetition generator 707. Repetition generator 707 generates a packet containing a first version of the reordered encoded symbols and a second version of a subset of those symbols so as to fill the frame. In the exemplary embodiment repetition generator 707 adds a repeated subset of the encoded symbols containing 336 symbols when the input packet contained 72 octets, 144 symbols when the input packet contained 84 octets, 464 symbols when the input packet contained 160 octets, 336 symbols when the input packet contained 360 octets and 720 symbols when the input packet contained 720 octets. In the exemplary embodiment, the repeated subset of symbols is selected in accordance with a pseudorandomly selected starting point provided by PN generator 705.

The output from repetition generator 707 is provided to a first input of exclusive-OR 708. Long code generator 710 generates along PN spreading code as described previously which serves to scramble the data. The long PN code is provided at a rate of 1.2288 Mcps to decimator 712 which reduces the rate of the sequence to the rate of the encoded symbols provided to the first input of the exclusive-OR 508.

The output of exclusive-OR 708 is provided to multiplexer/mapping means 714. In the exemplary embodiment, multiplexer/mapping means 614 maps a scrambled 0 symbol to a value of +1 and maps a scrambled 1 symbol to a value of −1. Multiplexer/mapping means 714 then alternatively outputs the mapped symbols to the I and Q outputs.

The outputs from multiplexer/mapping means 714 are provided to first inputs of multipliers 716 and 718. The second input of multipliers 716 and 718 are provide a variable length Walsh sequence comprising values of +1 which is determined in accordance with combination of a plurality 256 bit Walsh sequences. When the input frame consists of 72, 84, 160, 360 and 720 octets, the spreading sequence comprises 64, 32, 16, 8 and 4 bit Walsh sequences respectively.

The final step of processing of the signal is performed as described with respect to FIG. 3 above.

Figure 10:
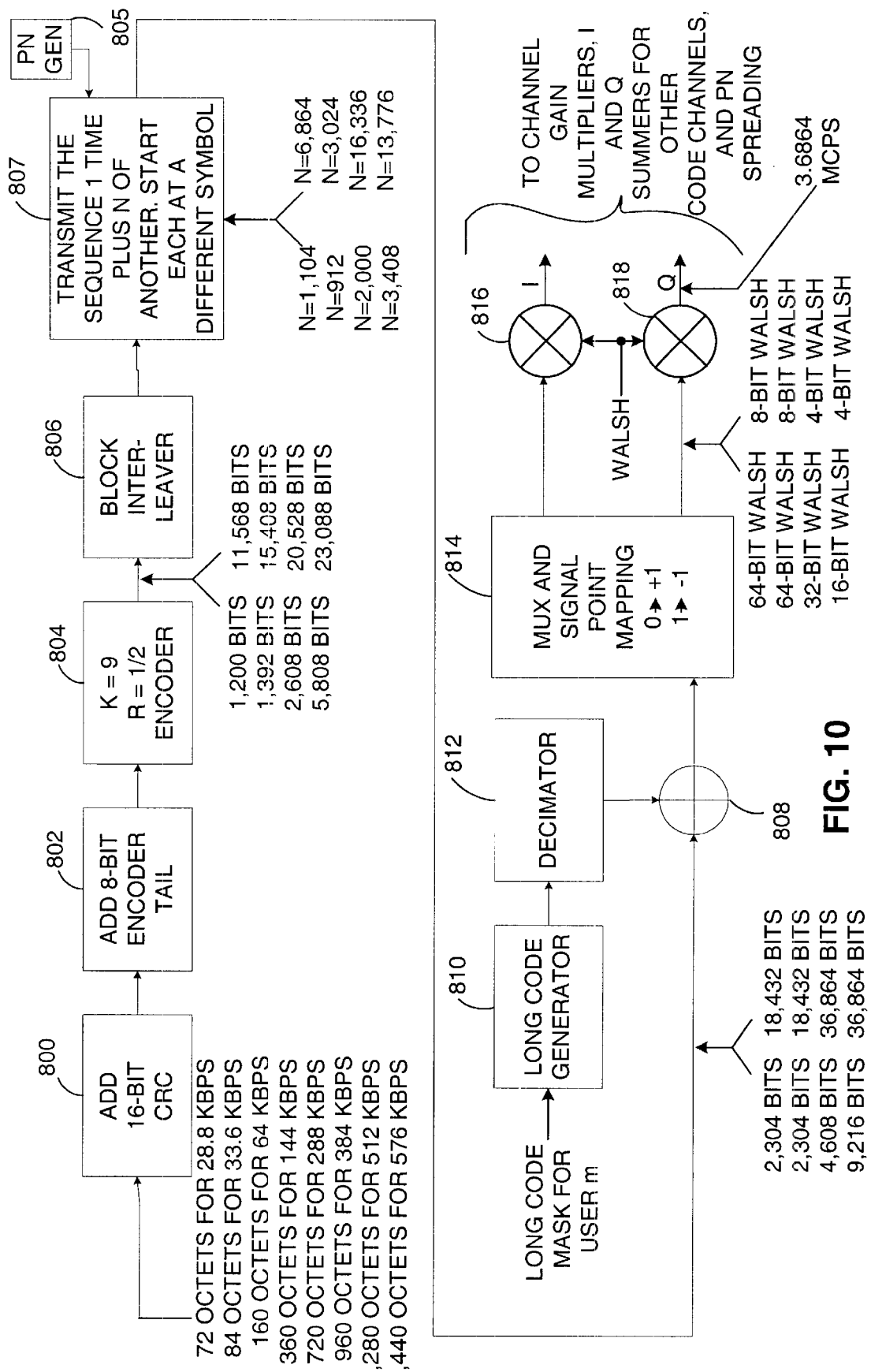
FIG. 10 illustrates the initial and intermediate processing of forward link digital data for transmission on the supplemental channel in a 3.6864 Mcps band for circuit switched applications.

X. Initial Processing Forward Link Supplemental Channel for Transmission in a 1.2288 Mcps Band in a Circuit Switched Mode FIG. 10 illustrates an alternative embodiment of the forward link supplemental channel in a 3.6864 Mcps band, wherein the data rates are over the air are at fixed standard rates. This is accomplished by providing a repetition generator to fill the packets for over the air transfer. Packets of digital data are provided to the input of CRC generator 800. In the exemplary embodiment, packets are provided at a rate of 1 every 20 ms. The packets of information bits contain 72, 84, 160, 360, 720, 960, 1280 or 1440 octets. CRC generator 800 generates a set of 16 cyclic redundancy check bits and appends them to the packet. The output of CRC generator 800 is provided to tail bit generator 802. In the exemplary embodiment, tail bit generator 802 appends an 8-bit all zero tail to the packet.

The output of tail bit generator 802 is provides data to encoder 804. Encoder 804 encodes the data to provide error detection and correction. In the exemplary embodiment, encoder 804 is a rate ½ convolutional encoder with constraint length 9. In alternative embodiments, encoder 804 could be a different encoder such as a Reed Solomon encoder. The encoded symbols from encoder 804 are provided to interleaver 806 which reorders the encoded symbols in accordance with a predetermined ordering format. In the exemplary embodiment, interleaver 806 is a block interleaver, though a convolutional or bit reversal interleaver is equally applicable to the present invention.

The output interleaver 806 is provided to repetition generator 807. Repetition generator 807 generates a packet containing a first version of the reordered encoded symbols and a second version of a subset of those symbols so as to fill the frame. In the exemplary embodiment repetition generator 807 adds a repeated subset of the encoded symbols containing 1,104 symbols when the input packet contained 72 octets, 912 symbols when the input packet contained 84 octets, 2000 symbols when the input packet contained 160 octets, 3408 symbols when the input packet contained 360 octets, 6864 symbols when the input packet contained 720 octets, 3024 symbols when the input packet contained 960octets, 16336 symbols when the input packet contained 1280 octets and 13776 symbols when the input packet contained 1440 octets. In the exemplary embodiment, the repeated subset of symbols is selected in accordance with a pseudorandomly selected starting point provided by PN generator 805.

The output from repetition generator 807 is provided to a first input of exclusive-OR 808. Long code generator 810 generates along PN spreading code as described previously which serves to scramble the data. The long PN code is provided at a rate of 1.2288 Mcps to decimator 812 which reduces the rate of the sequence to the rate of the encoded symbols provided to the first input of the exclusive-OR 808.

The output of exclusive-OR 808 is provided to multiplexer/mapping means 814. In the exemplary embodiment, multiplexer/mapping means 814 maps a scrambled 0 symbol to a value of +1 and maps a scrambled 1 symbol to a value of −1. Multiplexer/mapping means 814 then alternatively outputs the mapped symbols to the I and Q outputs.

The outputs from multiplexer/mapping means 814 are provided to first inputs of multipliers 816 and 818. The second input of multipliers 816 and 818 are provide a variable length Walsh sequence comprising values of +1 which is determined in accordance with combination of a plurality 256 bit Walsh sequences. When the input frame consists of 72, 84, 160, 360, 720, 960, 1,280, 1,440 octets, the spreading sequence comprises 64, 64, 32, 16, 8, 8, 4 and 4 bit Walsh sequences, respectively.

The final step of processing of the signal is performed as described with respect to FIG. 3 above.

XI. Reverse Link Walsh Covering and PN Spreading

Figure 11:
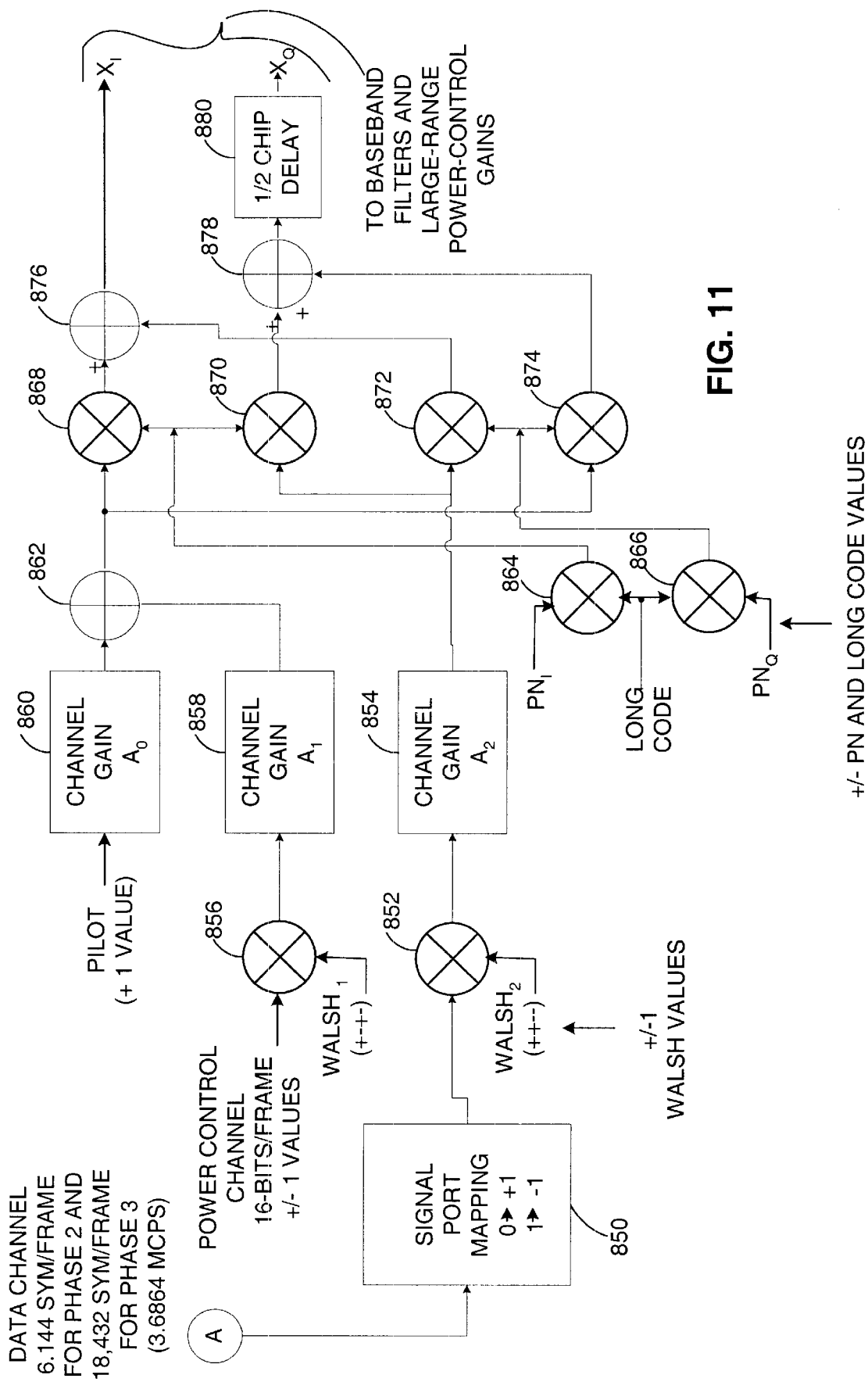
FIG. 11 illustrates the final processing of reverse link digital data.

FIG. 11 illustrates the intermediate signal processing for the reverse link of the present invention. The signal processing of FIG. 11 is described in detail in aforementioned copending U.S. patent application Ser. Nos. 08/654,443 and 08/660,438, which is assigned to the assignee of the present invention and incorporated by reference herein. In the exemplary embodiment, the remote station transmits data to the base station on three separate subchannels which are differentiated from one another by a short orthogonal code. The transmissions from different remote stations are separated from one another by means of pseudonoise codes unique to each remote station as is known in the art.

The high speed digital data is provided to mapping means 850 which in the exemplary embodiment maps a binary "0" t a value of +1 and maps a binary "1" to the value −1. The mapped stream of data is then provided to first input of multiplier 852. The second input of multiplier 852 is provided with a four bit Walsh sequence (++−−) that provides for differentiating the data channel from other channels of information transmitted by the remote station.

The output of multiplier 852 is provided to channel gain adjustment means 854. In the exemplary embodiment, each channel's gain is separately controlled by a corresponding gain adjustment means (854, 858 and 860) to allow for difference in permissible received signal quality. The output of channel gain adjustment means is provided to a first input of multipliers 870 and 872. The second input of multiplier 870 is provided by the output of multiplier 864. Multiplier 864 multiplies the long PN code as described earlier with a short quadrature PN code ($PN_I$). The second input of multiplier 872 is provide with the output of multiplier 866. Multiplier 864 multiplies the long PN code as described earlier with a short quadrature PN code ($PN_Q$).

A pilot channel signal, the generation of which is well known in the art, is provided to allow for coherent demodulation of the power control and data channels. The pilot channel consisting of +1 values is provide to gain adjustment means 860, which as described before adjusts the gain of the pilot channel. The output of gain adjustment means 860 is provided to a first input of exclusive-OR 862.

The power control bits consist of +1 values which indicate a request for the base station to increase or decrease its transmission power for transmissions to the remote station. The power control bits are provided to gain adjustment means 858 which adjusts the gain of the power control signal. The gain adjusted signal from gain adjustment means 858 is provided to the second input of exclusive-OR means 862. The output of exclusive-OR means 862 is provided to a first input of multipliers 868 and 874. The second input of multipliers 868 and 874 are provided with the outputs of multipliers 864 and 866 respectively.

The output of multiplier 868 is provide to a first input of subtraction means 876. The subtracting input of subtraction means 876 is provided with the output of multiplier 872. The output of subtraction means 876 is provided for amplification, upconversion and filtering for transmission. The output of multiplier 870 is provided to a first input to summing means 878. The second input of summing means 878 is provided with the output of multiplier 874. The resultant sum signal from summing means 878 is provided to delay element 880 which provide a half chip delay that is intended to reduce the number of zero crossings in the combined output I and Q, thereby reducing the non linearities in amplification that result therefrom.

XII. Initial Processing Reverse Link for Transmission in a 1.2288 Mcps Band

FIGS. 12A–12D illustrate the initial processing of variable rate data of the initial processing of digital data for transmission on the reverse link in a 1.2288 Mcps band. As described previously with respect to the forward link, in the exemplary embodiment, there are four rates referred to herein as full rate, half rate, quarter rate and eighth rate.

Figure 12A:
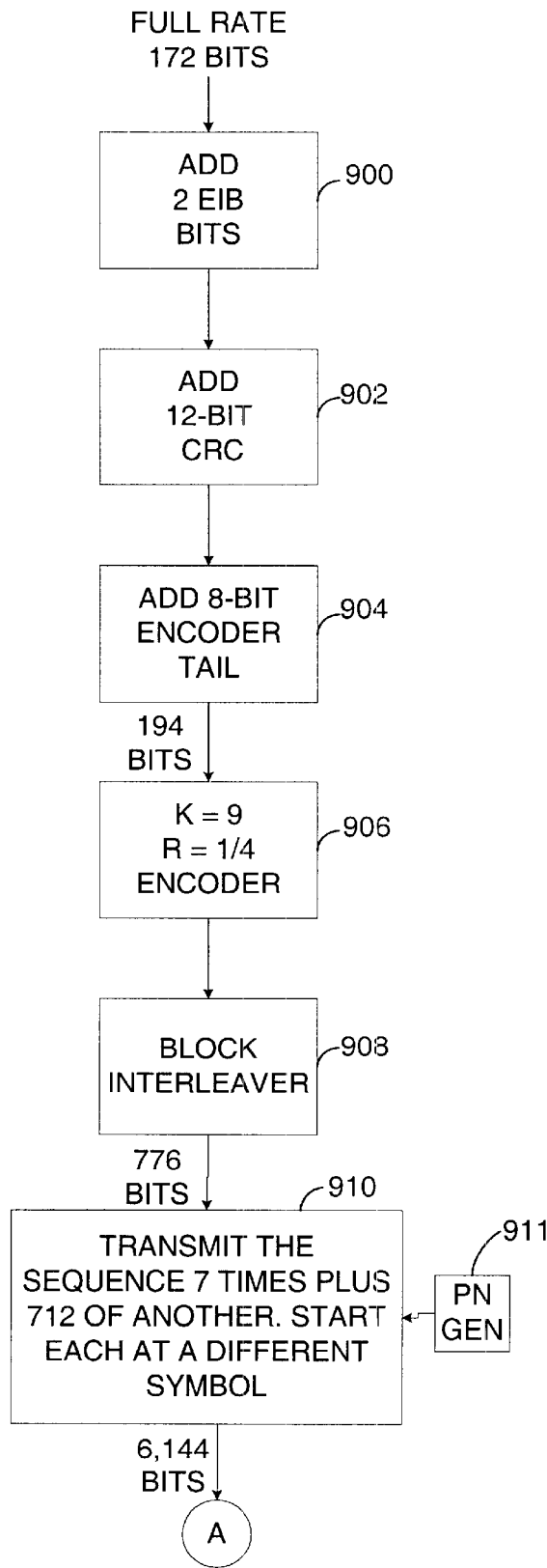
Figure 12B:
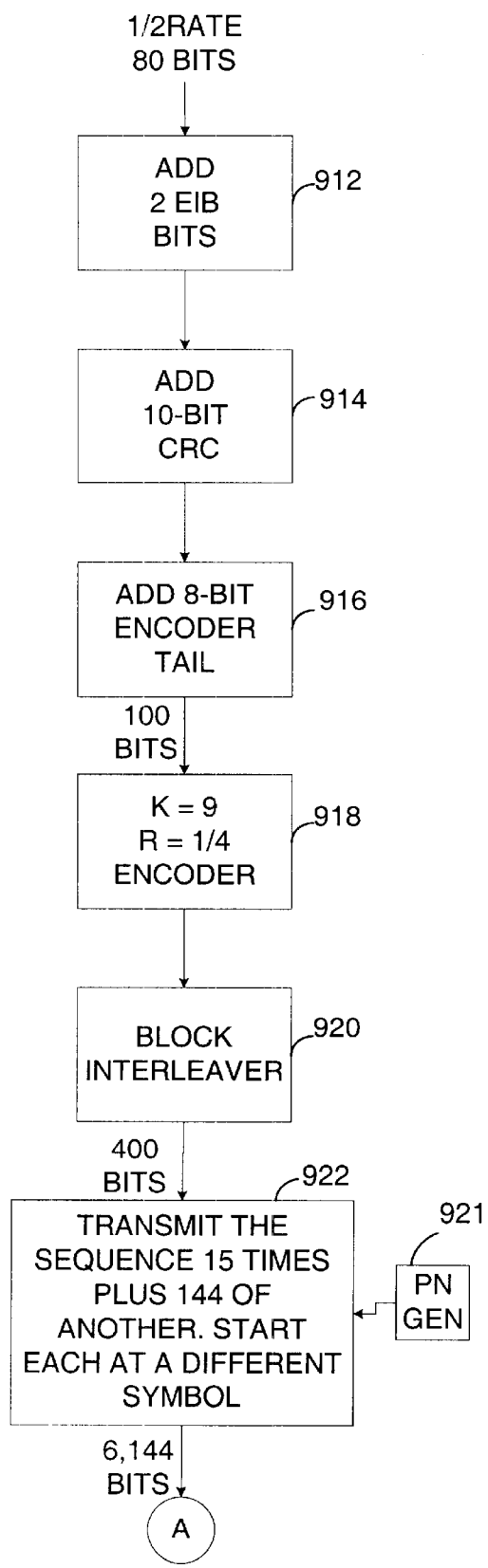

FIG. 12A illustrates the initial processing of full rate data for transmission on the reverse link. The full rate data packet comprising 172 bits is provided to error indicator bit (EIB) generator 900. Error indicator bit (EIB) generator 900 generates a two bit message. The first EIB indicates whether the last packet transmitted on the forward link primary channel was received correctly by the remote station. The second EIB indicates whether the last packet transmitted on the forward link supplemental channel was received correctly by the remote station.

The 174 bits are then provided to cyclic redundancy check (CRC) generator 902 which generates a set of check bits in a manner similar to parity bits. In the exemplary embodiment, CRC generator 902 generates an 12-bit CRC for the frame. The frame is then provided to tail bit generator 904 which appends to the frame a set of tail bits. In the exemplary embodiment, tail bit generator 904 appends an eight bit all 0 tail to the frame.

The 194 bits (172 information bits, 2 EIBs, 12 CRC bits and 8 tail bits) from tail bit generator 904 are provided to encoder 906. In the exemplary embodiment, encoder 906 is a rate ¼ convolutional encoder. In alternative embodiments, encoder 906 could be a Reed Solomon encoder or other error correction/detection encoder. The encoded symbols are then provided to interleaver 908 which reorders the encoded symbols in accordance with a predetermined interleaving format. In the exemplary embodiment, interleaver 908 is a block interleaver in which data is read into a buffer in rows and read out of the buffer in columns. In alternative embodiments, interleaver 908 could be a bit reversal interleaver or a convolutional interleaver.

The reordered symbol data is then provided to repetition generator 910. The function of repetition generator 910 is to assure that regardless of the rate of the data the output rate remains constant. The output of the initial processing contains 6144 bits regardless of the input data rate. The 776 encoded bits provided from interleaver 908 to repetition generator 910. Repetition generator 422 repeats the encoded symbols 7 times then repeats 712 symbols of the 776 encoded symbols. As described previously the repetition is provided in accordance with a pseudorandomly selected starting place provided by pseudonoise generator 911.

FIG. 5B illustrates the initial processing of half rate data for transmission on the reverse link. The data, in the exemplary embodiment, comprises 80 bits is provided to EIB generator 902. As described with respect to EIB generator 900, EIB generator 912 generates provides a tow bit signal indicating whether the last packets received and decoded on the primary and supplemental channels were received correctly.

The 82 bits are then provided to cyclic redundancy check (CRC) generator 914 which generates a set of check bits in a manner similar to parity bits as described above with respect to CRC generator 902. In the exemplary embodiment, CRC generator 914 generates an 10-bit CRC for the frame. The frame is then provided to tail bit generator 916 which appends to the frame a set of tail bits. In the exemplary embodiment, the tail bit generator 916 appends an eight bit all 0 tail to the frame.

The 100 bits (80 information bits, 2 EIBs, 10 CRC bits and 8 tail bits) from tail bit generator 916 are provided to encoder 918. In the exemplary embodiment, encoder 918 is a rate ¼ convolutional encoder. In alternative embodiments, encoder 918 could be a Reed Solomon encoder or other error correction/detection encoder. The encoded symbols are then provided to interleaver 920 which reorders the encoded symbols in accordance with a predetermined interleaving format as described above with respect to interleaver 908.

The reordered symbol data is then provided to repetition generator 922. The function of repetition generator 922 is to assure that regardless of the rate of the data the output rate remains constant. The output of the initial processing contains 6144 bits regardless of the input data rate. The 400 encoded bits are provided from interleaver 920 to repetition generator 922. Repetition generator 922 repeats the encoded symbols 15 times and repeats 144 of the 400 encoded symbols. As described the starting points of the repetitions are selected in accordance with pseudorandomly selected starting points provided by PN generator 921.

FIG. 6C illustrates the initial processing of quarter rate data for transmission on the reverse link. The quarter rate data packet comprising 40 information bits is provided to EIB generator 924. As described with respect to EIB generator 900, EIB generator 924 generates a two bit message indicating whether the last frame decoded by the remote station was decoded correctly.

The 42 bit packet is then provided to cyclic redundancy check (CRC) generator 926 which generates a set of check bits in a manner similar to parity bits as described above with respect to CRC generator 902. In the exemplary embodiment, CRC generator 926 generates an 8-bit CRC for the frame. The frame is then provided to tail bit generator 928 which appends to the frame a set of tail bits. In the exemplary embodiment, the tail bit generator 928 appends an eight bit all 0 tail to the frame.

The 58 bits (40 information bits, 2 EIBs, 8 CRC bits and 8 tail bits) from tail bit generator 928 are provided to encoder 930. In the exemplary embodiment, encoder 930 is a rate ¼ convolutional encoder. In alternative embodiments, encoder 930 could be a Reed Solomon encoder or other error correction/detection encoder. The encoded symbols are then provided to interleaver 932 which reorders the encoded symbols in accordance with a predetermined interleaving format as described above with respect to interleaver 908.

The reordered symbol data is then provided to repetition generator 934. The function of repetition generator 934 as described with respect to repetition generator 910 is to assure that regardless of the rate of information bits the output rate remains constant. Repetition generator 934 repeats the 232 bits 26 times within the output packet and repeats a selected 112 of the 232 encoded symbols. As described above, in the exemplary embodiment, the repetitions are provided in accordance with a pseudorandomly selected starting point which is determined by pseudonoise generator 933.

FIG. 12D illustrates the initial processing of eighth rate data for transmission on the reverse link. The eighth rate data packet, in the exemplary embodiment, comprising 16 information bits is provided to EIB generator 936. As described with respect to EIB generator 900, EIB generator 936 appends a two bit message indicating whether frames received on the forward link primary and supplemental channels were received properly.

The 18 bit packet is then provided to cyclic redundancy check (CRC) generator 938 which generates a set of check bits in a manner similar to parity bits as described above with respect to CRC generator 902. In the exemplary embodiment, CRC generator 938 generates a 6-bit CRC for the frame. The frame is then provided to tail bit generator 940 which appends to the frame a set of tail bits. In the exemplary embodiment, the tail bit generator 940 appends an eight bit all 0 tail to the frame.

The 32 bits (16 information bits, 2 EIBs, 6 CRC bits and 8 tail bits) from tail bit generator 940 are provided to encoder 942. In the exemplary embodiment, encoder 942 is a rate ¼ convolutional encoder. In alternative embodiments, encoder 942 could be a Reed Solomon encoder or other error correction/detection encoder. The encoded symbols are then provided to interleaver 944 which reorders the encoded symbols in accordance with a predetermined interleaving format as described above with respect to interleaver 908.

The reordered symbol data is then provided to repetition generator 946. Repetition generator 946 repeats the 128 bits 48 times within the output packet. As described above, in the exemplary embodiment, the starting points of the repetitions are selected in accordance with a pseudorandom starting point provided by pseudonoise generator 945.

XIII. Initial Processing Forward Link Supplemental Channel for Transmission in a 1.2288 Mcps Band in a Circuit Switched Mode FIGS. 13A–13D illustrate the initial processing of variable rate data of the rate set 1 of the rate set 1 for transmission on the reverse link in a 3.6864 Mcps band. As described previously with respect to the forward link, in the exemplary embodiment, there are four rates referred to herein as full rate, half rate, quarter rate and eighth rate.

Figures 13A, 13B:
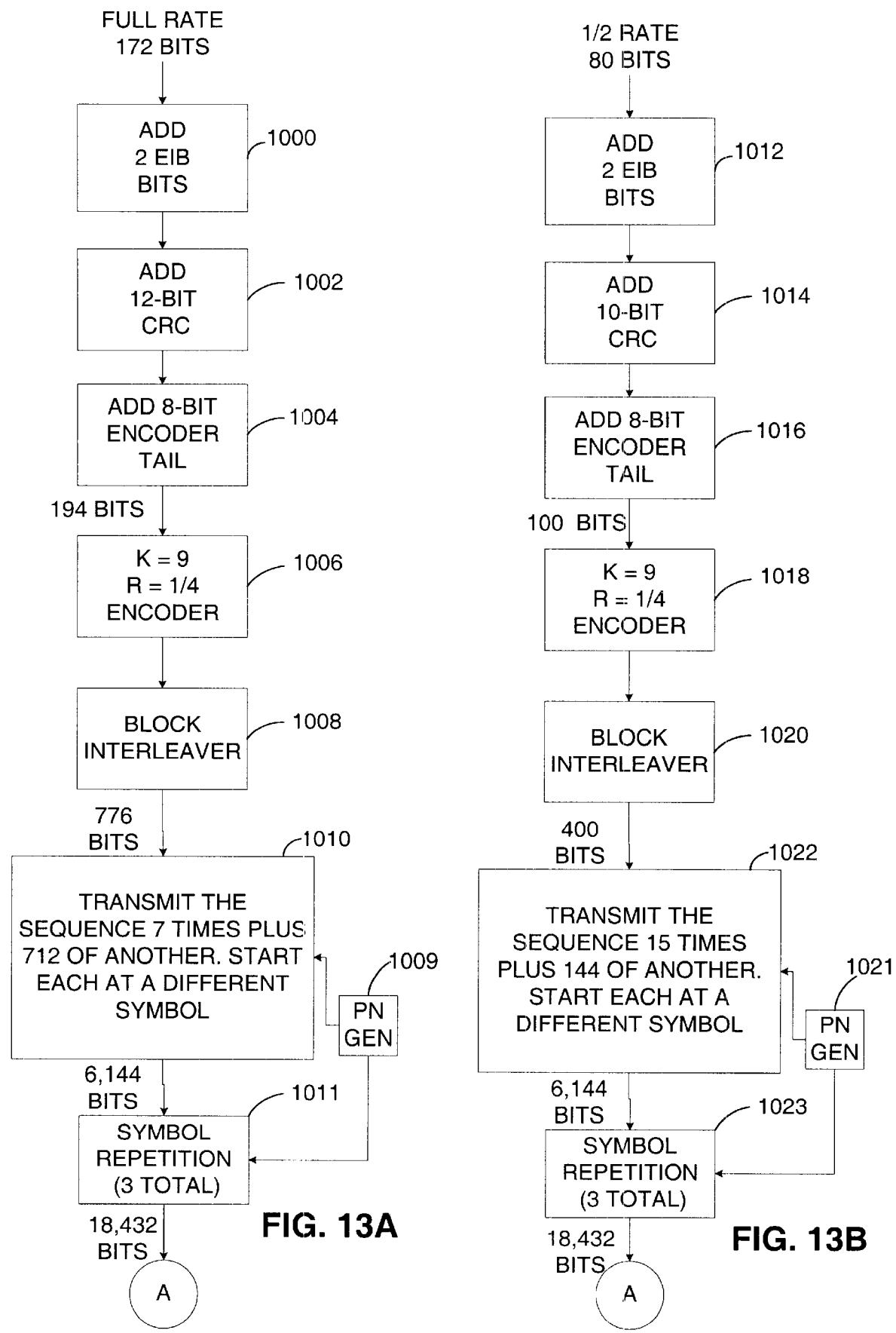

FIG. 13A illustrates the initial processing of full rate data for transmission on the reverse link. The full rate data packet comprising 172 bits is provided to error indicator bit (EIB) generator 1000. Error indicator bit (EIB) generator 1000 generates a two bit message. The first EIB indicates whether the last packet transmitted on the forward link primary channel was received correctly by the remote station. The second EIB indicates whether the last packet transmitted on the forward link supplemental channel was received correctly by the remote station.

The 174 bits are then provided to cyclic redundancy check (CRC) generator 1002 which generates a set of check bits in a manner similar to parity bits. In the exemplary embodiment, CRC generator 1002 generates an 12-bit CRC for the frame. The frame is then provided to tail bit generator 1004 which appends to the frame a set of tail bits. In the exemplary embodiment, tail bit generator 1004 appends an eight bit all 0 tail to the frame.

The 194 bits (172 information bits, 2 EIBs, 12 CRC bits and 8 tail bits) from tail bit generator 1004 are provided to encoder 1006. In the exemplary embodiment, encoder 1006 is a rate ¼ convolutional encoder. In alternative embodiments, encoder 1006 could be a Reed Solomon encoder or other error correction/detection encoder. The encoded symbols are then provided to interleaver 1008 which reorders the encoded symbols in accordance with a predetermined interleaving format. In the exemplary embodiment, interleaver 1008 is a block interleaver in which data is read into a buffer in rows and read out of the buffer in columns. In alternative embodiments, interleaver 1008 could be a bit reversal interleaver or a convolutional interleaver.

The reordered symbol data is then provided to repetition generator 1010. The function of repetition generator 1010 is to assure that regardless of the rate of the data the output rate remains constant. The output of the initial processing contains 6144 bits regardless of the input data rate. The 776 encoded bits provided from interleaver 1008 to repetition generator 1010. Repetition generator 1010 repeats the encoded symbols 7 times. As described previously the repetition is provided in accordance with a pseudorandomly selected starting place provided by pseudonoise generator 1009. The output from repetition generator 1010 is provided to repetition generator 1011 which repeats the packet three times. In the exemplary embodiment the repetitions start at new starting points pseudorandomly selected by PN generator 1009.

FIG. 13B illustrates the initial processing of half rate data for transmission on the reverse link. The data, in the exemplary embodiment, comprises 80 bits is provided to EIB generator 1012. As described with respect to EIB generator 1000, EIB generator 1012 generates provides a two bit signal indicating whether the last packets received and decoded on the primary and supplemental channels were received correctly.

The 82 bits are then provided to cyclic redundancy check (CRC) generator 1014 which generates a set of check bits in a manner similar to parity bits as described above with respect to CRC generator 1002. In the exemplary embodiment, CRC generator 1014 generates an 10-bit CRC for the frame. The frame is then provided to tail bit generator 1016 which appends to the frame a set of tail bits. In the exemplary embodiment, the tail bit generator 1016 appends an eight bit all 0 tail to the frame.

The 100 bits (80 information bits, 2 EIBs, 10 CRC bits and 8 tail bits) from tail bit generator 1016 are provided to encoder 1118. In the exemplary embodiment, encoder 1018 is a rate ¼ convolutional encoder. In alternative embodiments, encoder 1018 could be a Reed Solomon encoder or other error correction/detection encoder. The encoded symbols are then provided to interleaver 1020 which reorders the encoded symbols in accordance with a predetermined interleaving format as described above with respect to interleaver 1008.

The reordered symbol data is then provided to repetition generator 1022. Repetition generator 1022 repeats the encoded symbols 15 times and repeats 144 of the 400 encoded symbols. As described the starting points of the repetitions are selected in accordance with pseudorandomly selected starting points provided by PN generator 1021. The output of repetition generator 1022 is provided to repetition generator 1023 which repeats the packet three times. In the exemplary embodiment each repetition starts at a pseudorandomly selected starting point provided by PN generator 1021.

FIG. 13C illustrates the initial processing of quarter rate data for transmission on the reverse link. The quarter rate data packet comprising 40 information bits is provided to EIB generator 1024. As described with respect to EIB generator 1000, EIB generator 1024 generates a two bit message indicating whether the last frame decoded by the remote station was decoded correctly.

The 42 bit packet is then provided to cyclic redundancy check (CRC) generator 1026 which generates a set of check bits in a manner similar to parity bits as described above with respect to CRC generator 1002. In the exemplary embodiment, CRC generator 1026 generates an 8-bit CRC for the frame. The frame is then provided to tail bit generator 1028 which appends to the frame a set of tail bits. In the exemplary embodiment, the tail bit generator 1028 appends an eight bit all 0 tail to the frame.

The 58 bits (40 information bits, 2 EIBs, 8 CRC bits and 8 tail bits) from tail bit generator 1028 are provided to encoder 1030. In the exemplary embodiment, encoder 1030 is a rate ¼ convolutional encoder. In alternative embodiments, encoder 1030 could be a Reed Solomon encoder or other error correction/detection encoder. The encoded symbols are then provided to interleaver 1032 which reorders the encoded symbols in accordance with a predetermined interleaving format as described above with respect to interleaver 1008.

The reordered symbol data is then provided to repetition generator 1034. Repetition generator 1034 repeats the 232 bits 26 times within the output packet and repeats a selected 112 of the 232 encoded symbols. As described above, in the exemplary embodiment, the repetitions are provided in accordance with a pseudorandomly selected starting point which is determined by pseudonoise generator 1033. The output of repetition generator 1033 is provided to repetition generator 1035 which repeats the frame three times. In the exemplary embodiment the repetition starting points are pseudorandomly selected in accordance with a starting point selected by PN generator 1033.

FIG. 13D illustrates the initial processing of eighth rate data for transmission on the reverse link. The eighth rate data packet, in the exemplary embodiment, comprising 16 information bits is provided to EIB generator 1036. As described with respect to EIB generator 1000, EIB generator 1036 appends a two bit message indicating whether frames received on the forward link primary and supplemental channels were received properly.

The 18 bit packet is then provided to cyclic redundancy check (CRC) generator 1038 which generates a set of check bits in a manner similar to parity bits as described above with respect to CRC generator 1002. In the exemplary embodiment, CRC generator 1038 generates a 6-bit CRC for the frame. The frame is then provided to tail bit generator 1040 which appends to the frame a set of tail bits. In the exemplary embodiment, the tail bit generator 1040 appends an eight bit all 0 tail to the frame.

The 32 bits (16 information bits, 2 EIBs, 6 CRC bits and 8 tail bits) from tail bit generator 1040 are provided to encoder 1042. In the exemplary embodiment, encoder 1042 is a rate ¼ convolutional encoder. In alternative embodiments, encoder 1042 could be a Reed Solomon encoder or other error correction/detection encoder. The encoded symbols are then provided to interleaver 1044 which reorders the encoded symbols in accordance with a predetermined interleaving format as described above with respect to interleaver 1008.

The reordered symbol data is then provided to repetition generator 1046. Repetition generator 1046 repeats the encoded symbols 48 times within the output packet. As described above, in the exemplary embodiment, the starting points of the repetitions are selected in accordance with a pseudorandom starting point provided by pseudonoise generator 1045. The output of repetition generator 1046 is provided to repetition generator 1047 which repeats the packet three times. In the exemplary embodiment each repetition starts at a pseudorandomly selected starting point provided by PN generator 1045.

XIV. Initial Processing of Rate Set 2 Data for Reverse Link Transmission in a 1.2288 Mcps Band FIGS. 14A–14D illustrate the initial processing of variable rate data of the initial processing of digital data of the second rate set for transmission on the reverse link in a 1.2288 Mcps band. As described previously with respect to the forward link, in the exemplary embodiment, there are four rates referred to herein as full rate, half rate, quarter rate and eighth rate.

FIG. 14A illustrates the initial processing of full rate data for transmission on the reverse link. The full rate data packet comprising 267 bits is provided to error indicator bit (EIB) generator 1100. Error indicator bit (EIB) generator 1100 generates a two bit message. The first EIB indicates whether the last packet transmitted on the forward link primary channel was received correctly by the remote station. The second EIB indicates whether the last packet transmitted on the forward link supplemental channel was received correctly by the remote station.

The 269 bits are then provided to cyclic redundancy check (CRC) generator 1102 which generates a set of check bits in a manner similar to parity bits. In the exemplary embodiment, CRC generator 1102 generates an 12-bit CRC for the frame. The frame is then provided to tail bit generator 1104 which appends to the frame a set of tail bits. In the exemplary embodiment, tail bit generator 1104 appends an eight bit all 0 tail to the frame.

The 289 bits (267 information bits, 2 EIBs, 12 CRC bits and 8 tail bits) from tail bit generator 1104 are provided to encoder 1106. In the exemplary embodiment, encoder 1106 is a rate ¼ convolutional encoder. In alternative embodiments, encoder 1106 could be a Reed Solomon encoder or other error correction/detection encoder. The encoded symbols are then provided to interleaver 1108 which reorders the encoded symbols in accordance with a predetermined interleaving format. In the exemplary embodiment, interleaver 1108 is a block interleaver in which data is read into a buffer in rows and read out of the buffer in columns. In alternative embodiments, interleaver 1108 could be a bit reversal interleaver or a convolutional interleaver.

The reordered symbol data is then provided to repetition generator 1110. The function of repetition generator 1110 is to assure that regardless of the rate of the data the output rate remains constant. The output of the initial processing contains 6144 bits regardless of the input data rate. The 1156 encoded bits provided from interleaver 1108 to repetition generator 1110. Repetition generator 1110 repeats the encoded symbols 5 times then repeats 364 symbols of the 1156 encoded symbols. As described previously the repetition is provided in accordance with a pseudorandomly selected starting place provided by pseudonoise generator 1109.

FIG. 14B illustrates the initial processing of half rate data for transmission on the reverse link. The data, in the exemplary embodiment, comprises 125 bits is provided to EIB generator 1102. As described with respect to EIB generator 1100, EIB generator 1112 generates provides a two bit signal indicating whether the last packets received and decoded on the primary and supplemental channels were received correctly.

The 127 bits are then provided to cyclic redundancy check (CRC) generator 1114 which generates a set of check bits in a manner similar to parity bits as described above with respect to CRC generator 1102. In the exemplary embodiment, CRC generator 1114 generates an 10-bit CRC for the frame. The frame is then provided to tail bit generator 1116 which appends to the frame a set of tail bits. In the exemplary embodiment, the tail bit generator 1116 appends an eight bit all 0 tail to the frame.

The 145 bits (125 information bits, 2 EIBs, 10 CRC bits and 8 tail bits) from tail bit generator 1116 are provided to encoder 1118. In the exemplary embodiment, encoder 1118 is a rate ¼ convolutional encoder. In alternative embodiments, encoder 1118 could be a Reed Solomon encoder or other error correction/detection encoder. The encoded symbols are then provided to interleaver 1120 which reorders the encoded symbols in accordance with a predetermined interleaving format as described above with respect to interleaver 1108.

The reordered symbol data is then provided to repetition generator 1122. Repetition generator 1122 repeats the encoded symbols 10 times and repeats 344 of the 580 encoded symbols. As described the starting points of the repetitions are selected in accordance with pseudorandomly selected starting points provided by PN generator 1121.

Figure 14C:
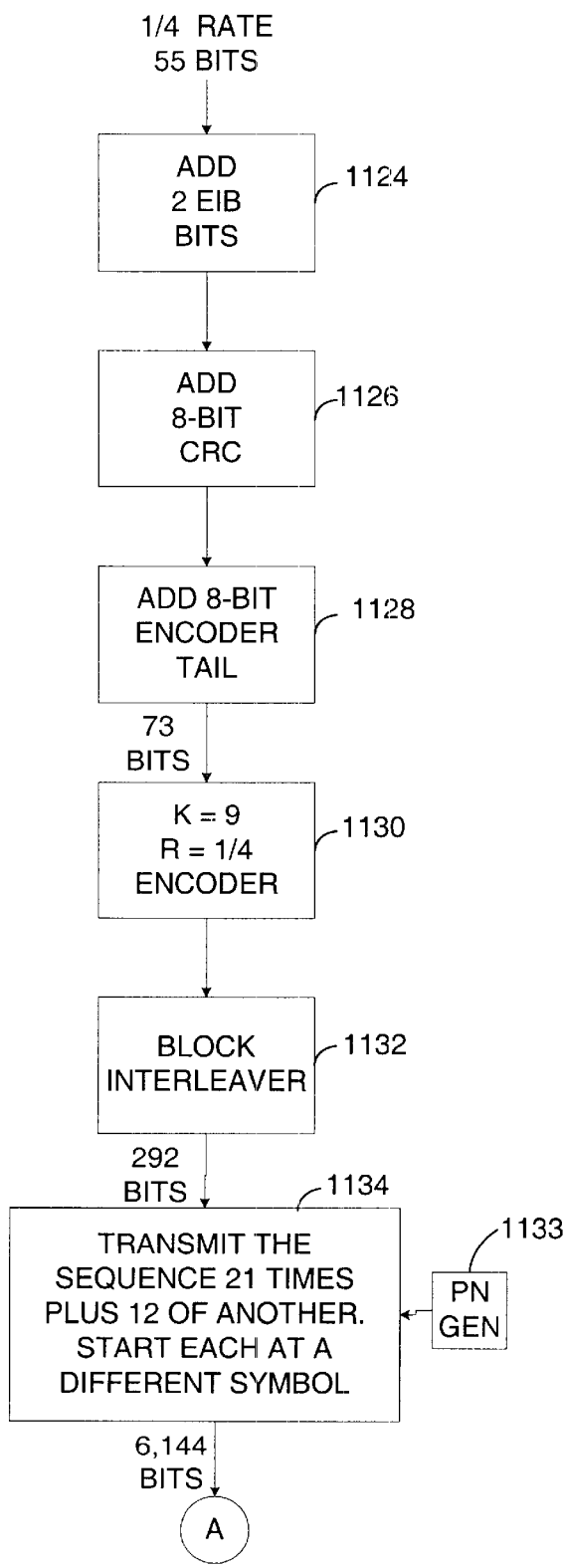
Figure 14D:
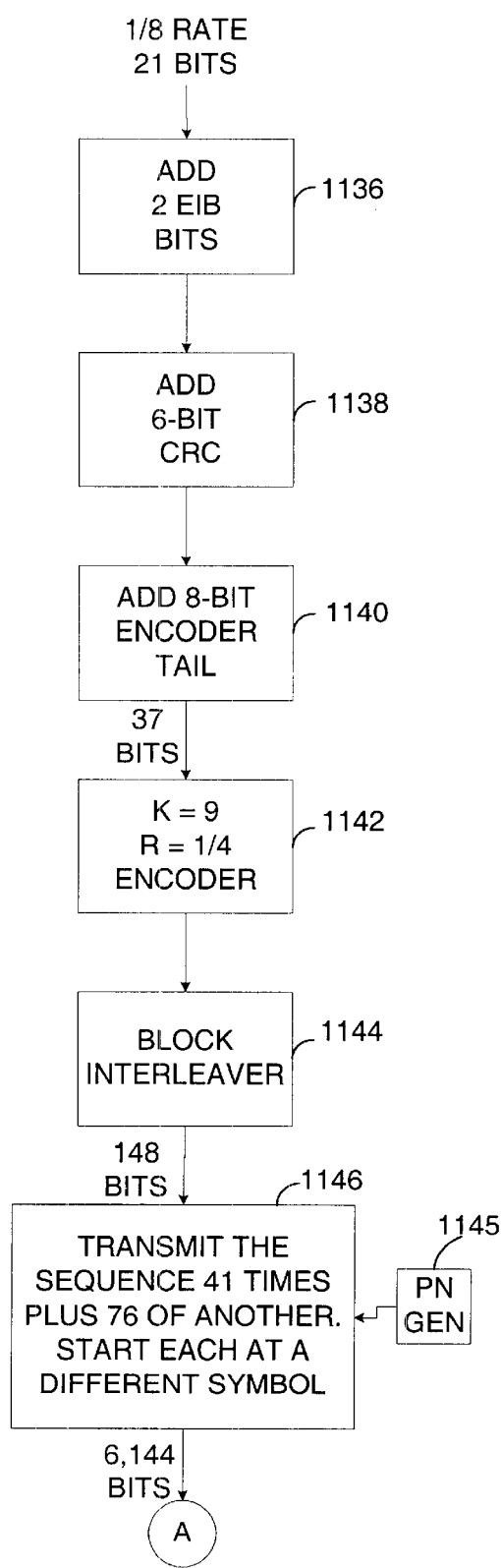

FIG. 14C illustrates the initial processing of quarter rate data for transmission on the reverse link. The quarter rate data packet comprising information bits is provided to EIB generator 1124. As described with respect to EIB generator 1100, EIB generator 1124 generates a two bit message indicating whether the last frame decoded by the remote station was decoded correctly.

The 57 bit packet is then provided to cyclic redundancy check (CRC) generator 1126 which generates a set of check bits in a manner similar to parity bits as described above with respect to CRC generator 1102. In the exemplary embodiment, CRC generator 1126 generates an 8-bit CRC for the frame. The frame is then provided to tail bit generator 1128 which appends to the frame a set of tail bits. In the exemplary embodiment, the tail bit generator 1128 appends an eight bit all 0 tail to the frame.

The 73 bits (55 information bits, 2 EIBs, 8 CRC bits and 8 tail bits) from tail bit generator 1128 are provided to encoder 1130. In the exemplary embodiment, encoder 1130 is a rate ¼ convolutional encoder. In alternative embodiments, encoder 1130 could be a Reed Solomon encoder or other error correction/detection encoder. The encoded symbols are then provided to interleaver 1132 which reorders the encoded symbols in accordance with a predetermined interleaving format as described above with respect to interleaver 1108.

The reordered symbol data is then provided to repetition generator 1134. Repetition generator 1134 repeats the 292 bits 21 times within the output packet and repeats a selected 12 of the 292 encoded symbols. As described above, in the exemplary embodiment, the repetitions are provided in accordance with a pseudorandomly selected starting point which is determined by pseudonoise generator 1133.

FIG. 12D illustrates the initial processing of eighth rate data for transmission on the reverse link. The eighth rate data packet, in the exemplary embodiment, comprising 21 information bits is provided to EIB generator 1136. As described with respect to EIB generator 1100, EIB generator 1136 appends a two bit message indicating whether frames received on the forward link primary and supplemental channels were received properly.

The 23 bit packet is then provided to cyclic redundancy check (CRC) generator 1138 which generates a set of check bits in a manner similar to parity bits as described above with respect to CRC generator 1102. In the exemplary embodiment, CRC generator 1138 generates a 6-bit CRC for the frame. The frame is then provided to tail bit generator 1140 which appends to the frame a set of tail bits. In the exemplary embodiment, the tail bit generator 1140 appends an eight bit all 0 tail to the frame.

The 37 bits (21 information bits, 2 EIBs, 6 CRC bits and 8 tail bits) from tail bit generator 1140 are provided to encoder 1142. In the exemplary embodiment, encoder 1142 is a rate ¼ convolutional encoder. In alternative embodiments, encoder 1142 could be a Reed Solomon encoder or other error correction/detection encoder. The encoded symbols are then provided to interleaver 1144 which reorders the encoded symbols in accordance with a predetermined interleaving format as described above with respect to interleaver 1408.

The reordered symbol data is then provided to repetition generator 1446. Repetition generator 1446 repeats the encoded symbols 41 times within the output packet and then repeats a selected 76 of the 148 encoded symbols. As described above, in the exemplary embodiment, the starting points of the repetitions are selected in accordance with a pseudorandom starting point provided by pseudonoise generator 1145.

XV. Initial Processing of Rate Set 2 Data for Reverse Link Transmission in a 3.6864 Mcps Band FIGS. 15A–15D illustrate the initial processing of variable rate data of the initial processing of digital data of the second rate set for transmission on the reverse link in a 3.6864 Mcps band. The only difference in the initial processing of the data for transmission in the 3.6864 band and that of the initial processing in the 1.2288 Mcps band is that each resultant packet is repeated three time. As described previously with respect to the forward link, in the exemplary embodiment, there are four rates referred to herein as full rate, half rate, quarter rate and eighth rate.

FIG. 15A illustrates the initial processing of full rate data for transmission on the reverse link. The full rate data packet comprising 267 bits is provided to error indicator bit (EIB) generator 1200. Error indicator bit (EIB) generator 1200 generates a two bit message. The first EIB indicates whether the last packet transmitted on the forward link primary channel was received correctly by the remote station. The second EIB indicates whether the last packet transmitted on the forward link supplemental channel was received correctly by the remote station.

The 269 bits are then provided to cyclic redundancy check (CRC) generator 1202 which generates a set of check bits in a manner similar to parity bits. In the exemplary embodiment, CRC generator 1202 generates an 12-bit CRC for the frame. The frame is then provided to tail bit generator 1204 which appends to the frame a set of tail bits. In the exemplary embodiment, tail bit generator 1204 appends an eight bit all 0 tail to the frame.

The 289 bits (267 information bits, 2 EIBs, 12 CRC bits and 8 tail bits) from tail bit generator 1204 are provided to encoder 1206. In the exemplary embodiment, encoder 1206 is a rate ¼ convolutional encoder. In alternative embodiments, encoder 1206 could be a Reed Solomon encoder or other error correction/detection encoder. The encoded symbols are then provided to interleaver 1208 which reorders the encoded symbols in accordance with a predetermined interleaving format. In the exemplary embodiment, interleaver 1208 is a block interleaver in which data is read into a buffer in rows and read out of the buffer in columns. In alternative embodiments, interleaver 1208 could be a bit reversal interleaver or a convolutional interleaver.

The reordered symbol data is then provided to repetition generator 1210. The function of repetition generator 1210 is to assure that regardless of the rate of the data the output rate remains constant. The output of the initial processing contains 6144 bits regardless of the input data rate. The 1,156 encoded bits provided from interleaver 1208 to repetition generator 1210. Repetition generator 1210 repeats the encoded symbols 5 times then repeats 364 symbols of the 1156 encoded symbols. As described previously the repetition is provided in accordance with a pseudorandomly selected starting place provided by pseudonoise generator 1209.

The output of repetition generator 1210 is provided to symbol repetitions generator 1211 which repeats the data in the packet 3 times. In the exemplary embodiment, the repetitions are repeated in accordance with pseudorandomly selected starting points provided by PN generator 1209.

FIG. 13B illustrates the initial processing of half rate data for transmission on the reverse link. The data, in the exemplary embodiment, comprises 125 bits is provided to EIB generator 1212. As described with respect to EIB generator 1200, EIB generator 1212 generates provides a tow bit signal indicating whether the last packets received and decoded on the primary and supplemental channels were received correctly.

The 127 bits are then provided to cyclic redundancy check (CRC) generator 1214 which generates a set of check bits in a manner similar to parity bits as described above with respect to CRC generator 1202. In the exemplary embodiment, CRC generator 1214 generates an 10-bit CRC for the frame. The frame is then provided to tail bit generator 1216 which appends to the frame a set of tail bits. In the exemplary embodiment, the tail bit generator 1216 appends an eight bit all 0 tail to the frame.

The 145bits (125 information bits, 2 EIBs, 10 CRC bits and 8 tail bits) from tail bit generator 1216 are provided to encoder 1218. In the exemplary embodiment, encoder 1218 is a rate ¼ convolutional encoder. In alternative embodiments, encoder 1218 could be a Reed Solomon encoder or other error correction/detection encoder. The encoded symbols are then provided to interleaver 1220 which reorders the encoded symbols in accordance with a predetermined interleaving format as described above with respect to interleaver 1208.

The reordered symbol data is then provided to repetition generator 1222. The 580 encoded bits are provided from interleaver 1220 to repetition generator 1222. Repetition generator 1222 repeats the encoded symbols 10 times and repeats 344 of the 580 encoded symbols. As described the starting points of the repetitions are selected in accordance with pseudorandomly selected starting points provided by PN generator 1221.

The output of repetition generator 1222 is provided to symbol repetitions generator 1223 which repeats the data in the packet 3 times. In the exemplary embodiment, the repetitions are repeated in accordance with pseudorandomly selected starting points provided by PN generator 1221.

FIG. 13C illustrates the initial processing of quarter rate data for transmission on the reverse link. The quarter rate data packet comprising 55 information bits is provided to EIB generator 1224. As described with respect to EIB generator 1200, EIB generator 1224 generates a two bit message indicating whether the last frame decoded by the remote station was decoded correctly.

The 57 bit packet is then provided to cyclic redundancy check (CRC) generator 1226 which generates a set of check bits in a manner similar to parity bits as described above with respect to CRC generator 1202. In the exemplary embodiment, CRC generator 1226 generates an 8-bit CRC for the frame. The frame is then provided to tail bit generator 1228 which appends to the frame a set of tail bits. In the exemplary embodiment, the tail bit generator 1228 appends an eight bit all 0 tail to the frame.

The 73 bits (55 information bits, 2 EIBs, 8 CRC bits and 8 tail bits) from tail bit generator 1228 are provided to encoder 1230. In the exemplary 30 embodiment, encoder 1230 is a rate ¼ convolutional encoder. In alternative embodiments, encoder 1230 could be a Reed Solomon encoder or other error correction/detection encoder. The encoded symbols are then provided to interleaver 1232 which reorders the encoded symbols in accordance with a predetermined interleaving format as described above with respect to interleaver 1208.

The reordered symbol data is then provided to repetition generator 1234. The function of repetition generator 1234 as described with respect to repetition generator 1210 is to assure that regardless of the rate of information bits the output rate remains constant. Repetition generator 1234 repeats the 292 bits 21 times within the output packet and repeats a selected 12 of the 292 encoded symbols. As described above, in the exemplary embodiment, the repetitions are provided in accordance with a pseudorandomly selected starting point which is determined by pseudonoise generator 1233.

The output of repetition generator 1233 is provided to symbol repetitions generator 1235 which repeats the data in the packet 3 times. In the exemplary embodiment, the repetitions are repeated in accordance with pseudorandomly selected starting points provided by PN generator 1233.

Figure 15C:
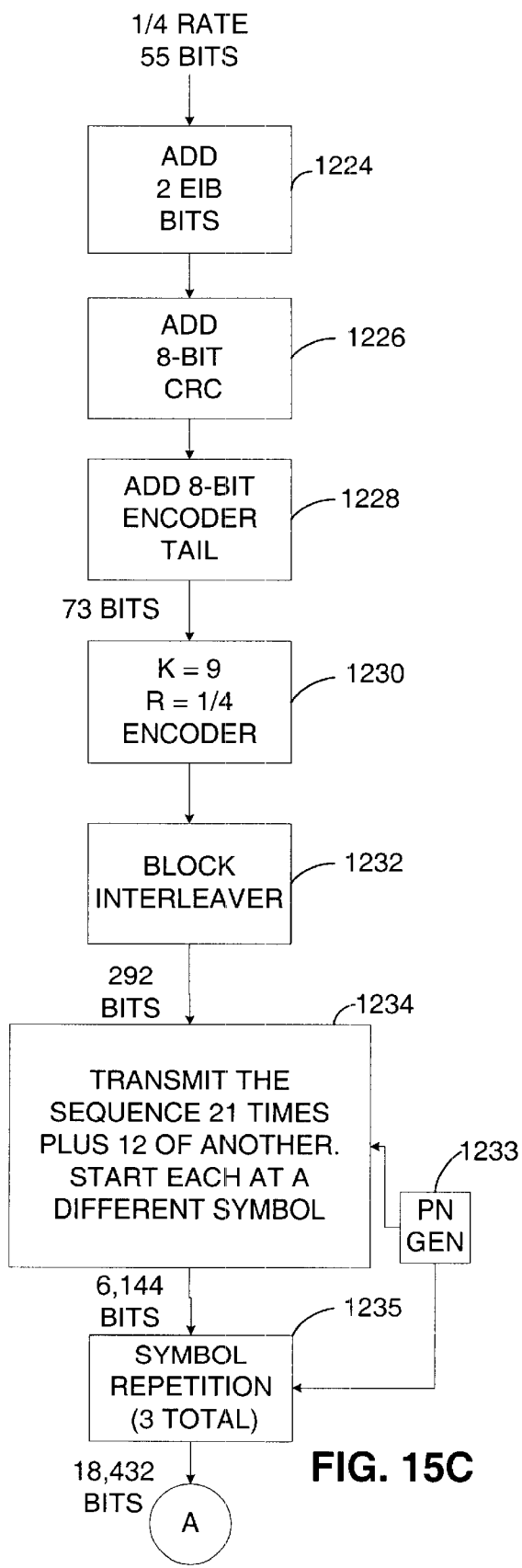
Figure 15D:
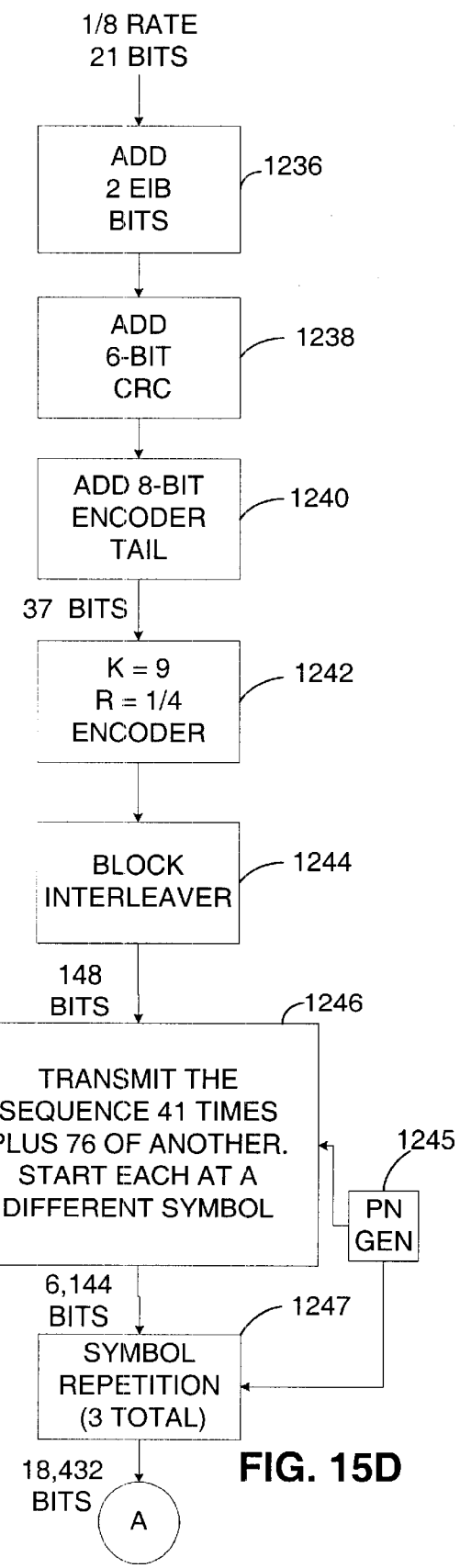

FIG. 15D illustrates the initial processing of eighth rate data for transmission on the reverse link. The eighth rate data packet, in the exemplary embodiment, comprising 21 information bits is provided to EIB generator 1236. As described with respect to EIB generator 1200, EIB generator 1236 appends a two bit message indicating whether frames received on the forward link primary and supplemental channels were received properly.

The 23 bit packet is then provided to cyclic redundancy check (CRC) generator 1238 which generates a set of check bits in a manner similar to parity bits as described above with respect to CRC generator 1202. In the exemplary embodiment, CRC generator 1238 generates a 6-bit CRC for the frame. The frame is then provided to tail bit generator 1240 which appends to the frame a set of tail bits. In the exemplary embodiment, the tail bit generator 1240 appends an eight bit all 0 tail to the frame.

The 37 bits (21 information bits, 2 EIBs, 6 CRC bits and 8 tail bits) from tail bit generator 1240 are provided to encoder 1242. In the exemplary embodiment, encoder 1242 is a rate ¼ convolutional encoder. In alternative embodiments, encoder 1242 could be a Reed Solomon encoder or other error correction/detection encoder. The encoded symbols are then provided to interleaver 1244 which reorders the encoded symbols in accordance with a predetermined interleaving format as described above with respect to interleaver 1208.

The reordered symbol data is then provided to repetition generator 1246. Repetition generator 1246 repeats the 148 bits 41 times and additionally repeats 12 of encoded symbols and additional time. As described above, in the exemplary embodiment, the starting points of the repetitions are selected in accordance with a pseudorandom starting point provided by pseudonoise generator 1245.

The output of repetition generator 1246 is provided to symbol repetitions generator 1247 which repeats the data in the packet 3 times. In the exemplary embodiment, the repetitions are repeated in accordance with pseudorandomly selected starting points provided by PN generator 1245.

Figures 16A, 16B:
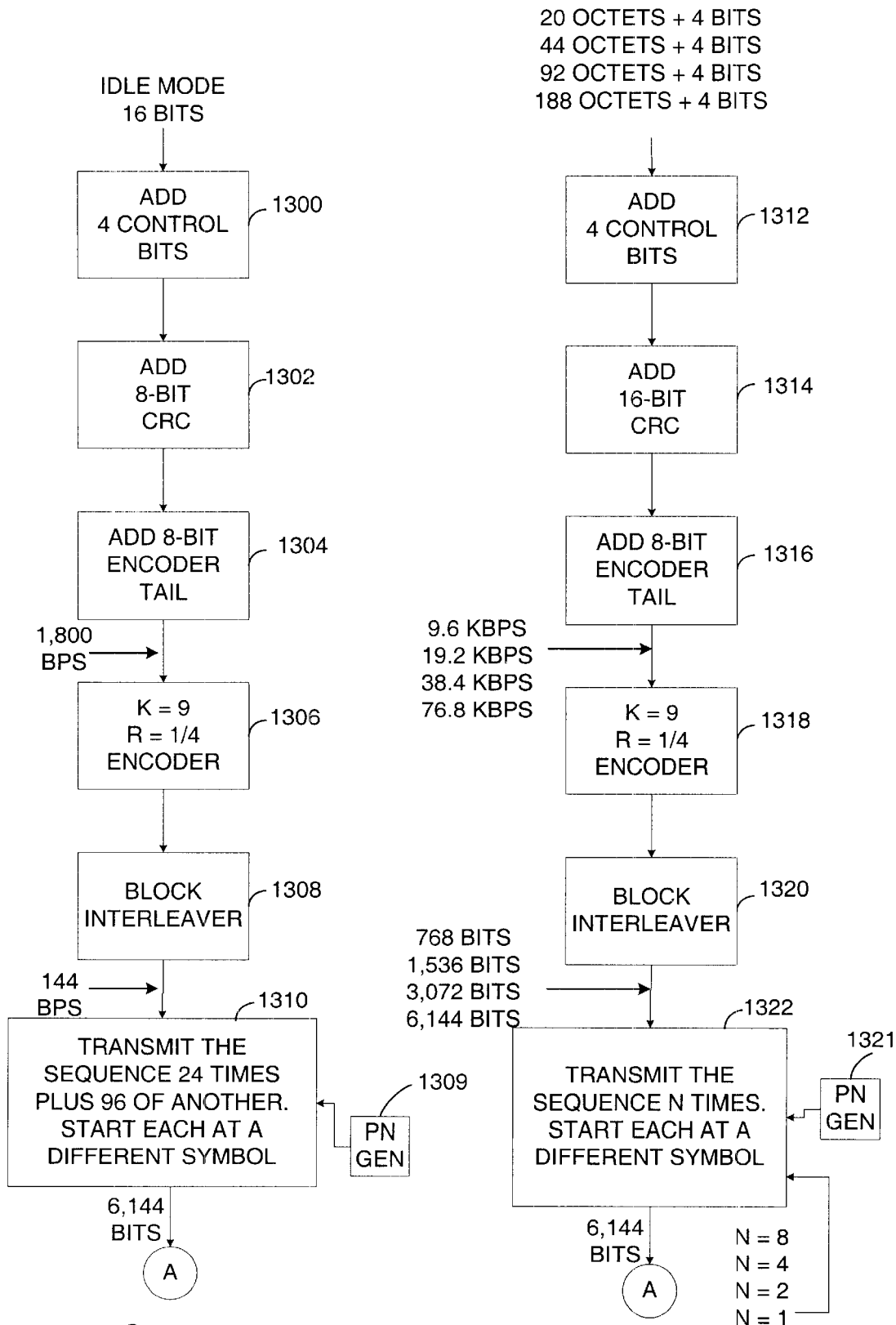

XVI. Initial Processing of Reverse Link Data for Transmission in a 1.2288 Mcps Band in a Packet Mode FIGS. 16A–16C illustrate the initial processing of data in packet modes for transmission in a 1.2288 Mcps band. FIG. 16A illustrates the initial processing of data in idle mode where the amount of data being transmitted by the remote station is a minimum. FIG. 16B illustrates the initial processing of data in standard variable rate transmission mode. FIG. 16C illustrates the initial processing of data for data transmission at a maximum rate.

Referring to FIG. 16A packets of data consisting of 16 bits (or two octets) is provided to control bit generator 1302. Control bit generator 1300 appends 4 control bits to the packet. In the exemplary embodiment the four control bits consist of two EIBs (as described earlier) and two mode bits. In a first exemplary embodiment, the 2 mode bits indicate the rate at which the remote station will be transmitting some number of frames in the future. In an alternative embodiment, the mode bits may represent the contents of the present frame or frames forthcoming. That is to say, the mode bits may indicate that the frame contains speech data, or digital data or a combination of speech and digital data.

The packet is then provided to CRC bit generator 1302 which generates an 8-bit CRC as described previously and appends the CRC bits to the packet. The packet is then provided to tail bit generator 1304 which appends 8 tail bits as described previously. The packet is then provided to encoder 1306 which convolutionally encodes the bits at rate ¼ constraint length 9. In alternative embodiments, encoder 1306 could be a different form of encoder such as the Reed-Solomon encoder.

The encoded symbols are then provided to interleaver 1308. In the exemplary embodiment, interleaver 1308 is a block interleaver, thought other forms of interleavers may be selected based on the application. The reordered symbols are then provided to repetition generator 1310. Repetition generator 1310 repeats the packet 42 times and then adds another repeated version of 96 of the encoded. As described previously the starting points of the repetitions are pseudo-randomly selected in accordance with a signal provided by PN generator 1309.

Referring to FIG. 16B, packets of data consisting of 164 bits (20 octets plus 4 bits), 356 bits (44 octets plus 4 bits), 740 bits (92 octets plus 4 bits) or 1508 bits (188 octets plus 4 bits) is provided to control bit generator 1312. Control bit generator 1312 appends 4 control bits to the packet, which function as described with respect to the control bits provided by control bit generator 1300.

The packet is then provided to CRC bit generator 1314 which generates an 8-bit CRC as described previously and appends the CRC bits to the packet. The packet is then provided to tail bit generator 1316 which appends 8 tail bits as described previously. The packet is then provided to encoder 1318 which convolutionally encodes the bits at rate ¼ constraint length 9. In alternative embodiments, encoder 1318 could be a different form of encoder such as the Reed-Solomon encoder.

The encoded symbols are then provided to interleaver 1320 which reorders the encoded symbols in accordance with a predetermined interleaver format. The reordered symbols are then provided to repetition generator 1322. Repetition generator 1322 repeats the packet 8 times when the input packet consisted of 20 octets plus 4 bits, 4 times when the input packet consisted of 44 octets plus 4 bits, 2 times when the input packet consisted of 92 octets plus 4 bits and provides no repetition when the input packet consisted of 188 octets plus four bits. As described previously the starting points of the repetitions are pseudorandomly selected in accordance with a signal provided by PN generator 1321.

Referring to FIG. 16c packets of data consisting of 3044 bits (380 octets plus 4 bits are provided to control bit generator 1324. Control bit generator 1324 appends 4 control bits to the packet, which function as described with respect to the control bits provided by control bit generator 1300.

The packet is then provided to CRC bit generator 1326 which generates an 16-bit CRC as described previously and appends the CRC bits to the packet. The packet is then provided to tail bit generator 1328 which appends 8 tail bits as described previously. The packet is then provided to encoder 1330 which convolutionally encodes the bits at rate ½ constraint length 9. In alternative embodiments, encoder 1330 could be a different form of encoder such as the Reed-Solomon encoder.

The encoded symbols are then provided to interleaver 1332 which reorders the encoded symbols in accordance with a predetermined interleaver format.

XVII. Initial Processing of Reverse Link Data for Transmission in a 3.6864 Mcps Band in a Packet Mode FIGS. 17A–17C illustrate the initial processing of data in packet modes for transmission in a 3.6864 Mcps band. FIG. 17A illustrates the initial processing of data in idle mode where the amount of data being transmitted by the remote station is a minimum. FIG. 17B illustrates the initial processing of data in standard variable rate transmission mode. FIG. 17C illustrates the initial processing of data for data transmission at a maximum rate.

Referring to FIG. 17A packets of data consisting of 16 bits (or two octets) is provided to control bit generator 1400. Control bit generator 1400 appends 4 control bits to the packet. In the exemplary embodiment the four control bits consist of two EIBs (as described earlier) and two mode bits. In a first exemplary embodiment, the 2 mode bits indicate the rate at which the remote station will be transmitting some number of frames in the future. In an alternative embodiment, the mode bits may represent the contents of the present frame or frames forthcoming. That is to say, the mode bits may indicate that the frame contains speech data, or digital data or a combination of speech and digital data.

The packet is then provided to CRC bit generator 1402 which generates an 8-bit CRC as described previously and appends the CRC bits to the packet. The packet is then provided to tail bit generator 1404 which appends 8 tail bits as described previously. The packet is then provided to encoder 1406 which convolutionally encodes the bits at rate ¼ constraint length 9. In alternative embodiments, encoder 1406 could be a different form of encoder such as the Reed-Solomon encoder.

The encoded symbols are then provided to interleaver 1408. In the exemplary embodiment, interleaver 1408 is a block interleaver, thought other forms of interleavers may be selected based on the application. The reordered symbols are then provided to repetition generator 1410. Repetition generator 1410 repeats the packet 128 times. As described previously the starting points of the repetitions are pseudo-randomly selected in accordance with a signal provided by PN generator 1409.

Referring to FIG. 16B packets of data consisting of 164 bits (20 octets plus 4 bits), of 260 bits (32 octets plus 4 bits), 356 bits (44 octets plus 4 bits), 548 bits (68 octets plus 4 bits), 740 bits (92 octets plus 4 bits), 1124 bits (140 octets plus 4 bits), 1508 bits (188 octets plus 4 bits), 2276 bits (284 octets plus 4 bits) or 4580 bits (572 octets plus 4 bits) are provided to control bit generator 1412. Control bit generator 1412 appends 4 control bits to the packet, which function as described with respect to the control bits provided by control bit generator 1400.

The packet is then provided to CRC bit generator 1414 which generates an 8-bit CRC as described previously and appends the CRC bits to the packet. The packet is then provided to tail bit generator 1416 which appends 8 tail bits as described previously. The packet is then provided to encoder 1418 which convolutionally encodes the bits at rate ¼ constraint length 9. In alternative embodiments, encoder 1418 could be a different form of encoder such as the Reed-Solomon encoder.

The encoded symbols are then provided to interleaver 1420 which reorders the encoded symbols in accordance with a predetermined interleaver format. The reordered symbols are then provided to repetition generator 1422. Repetition generator 1422 repeats the packet 24 times when that packet consists of 164 bits (20 octets plus 4 bits), 16 times when that packet consists of 260 bits (32 octets plus 4 bits), 12 times when that packet consists of 356 bits (44 octets plus 4 bits), 8 times when that packet consists of 548 bits (68 octets plus 4 bits), 6 times when that packet consists of 740 bits (92 octets plus 4 bits), 4 times when that packet consists of 1124 bits (140 octets plus 4 bits), 3 times when that packet consists of 1508 bits (188 octets plus 4 bits), 2 times when that packet consists of 2276 bits (284 octets plus 4 bits) or 4580 bits (572 octets plus 4 bits) and provides no repetition when the input packet consisted of or 4580 bits (572 octets plus 4 bits). As described previously the starting points of the repetitions are pseudorandomly selected in accordance with a signal provided by PN generator 1421.

Referring to FIG. 16c packets of data consisting of 9188 bits (1148 octets plus 4 bits) are provided to control bit generator 1424. Control bit generator 1424 appends 4 control bits to the packet, which function as described with respect to the control bits provided by control bit generator 1400.

The packet is then provided to CRC bit generator 1426 which generates an 16-bit CRC as described previously and appends the CRC bits to the packet. The packet is then provided to tail bit generator 1428 which appends 8 tail bits as described previously. The packet is then provided to encoder 1430 which convolutionally encodes the bits at rate ½ constraint length 9. In alternative embodiments, encoder 1430 could be a different form of encoder such as the Reed-Solomon encoder. The encoded symbols are then provided to interleaver 1432 which reorders the encoded symbols in accordance with a predetermined interleaver format.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for processing a frame of data on a primary channel, comprising the steps of:
    (a) determining whether or not at least one additional future frame of data will be transmitted on a supplemental channel from a first station to a second station; and
    (b) transmitting a demod flag bit from the first station to the second station on the primary channel if a determination is made that at least one additional future frame of data will be transmitted on the supplemental channel from the first station to the second station.

2. The method as in claim 1, further comprising:
    adding the demod flag bit to a frame of data; and
    encoding the frame of data with the demod flag bit.

3. The method as in claim 2, further comprising:
    encoding the frame of data at a first data rate to form an encoded sequence;
    interleaving the encoded sequence to form an interleaved sequence; and
    transmitting a non-integer portion of the interleaved sequence.

4. An apparatus for processing a frame of data on a primary channel, comprising:
    means for determining that at least one additional future frame of data will be transmitted on a supplemental channel from a first station to a second station; and
    means for transmitting a demod flag bit from the first station to the second station on the primary channel if a determination is made that at least one additional future frame of data will be transmitted on a supplemental channel from the first station to the second station.

5. The apparatus as in claim 4, further comprising:
    means for adding the demod flag bit to a frame of data; and
    means for encoding the frame of data with the demod flag bit.

6. The apparatus as in claim 5, further comprising:
    means for encoding the frame of data at a first data rate to form an encoded sequence;
    means for interleaving the encoded sequence to form an interleaved sequence; and
    means for transmitting a non-integer portion of the interleaved sequence.

7. A method for processing data, comprising the steps of:
    determining whether a frame of data will be transmitted on a supplemental channel from a first station to a second station; and transmitting a demod flag bit from the first station to the second station on the primary channel if a determination is made that the frame of data will be transmitted on the supplemental channel from the first station to the second station.

8. An apparatus for processing data, comprising:

means for determining whether a frame of data will be transmitted on a supplemental channel from a first station to a second station; and means for transmitting a demod flag bit from the first station to the second station on the primary channel if a determination is made that the frame of data will be transmitted on the supplemental channel from the first station to the second station.

9. An apparatus for processing a frame of data on a primary channel, comprising:

a demodulator flag generator configured to generate a demod flag if a determination is made that at least one frame of data will be transmitted on a supplemental channel from a first station to a second station; and a transmitter configured to transmit the demod flag.

10. The apparatus as in claim 9, further comprising:

an encoder configured to encode data and the demod flag to form an encoded sequence.

11. The apparatus as in claim 10, further comprising:

interleaver configured to interleave the encoded sequence to form an interleaved sequence.

12. The apparatus as in claim 11, wherein the transmitter configured to transmit the demod flag comprises:

the transmitter configured to transmit a non-integer portion of the interleaved sequence.

* * * * *